United States Patent Office 3,436,478
Patented Apr. 1, 1969

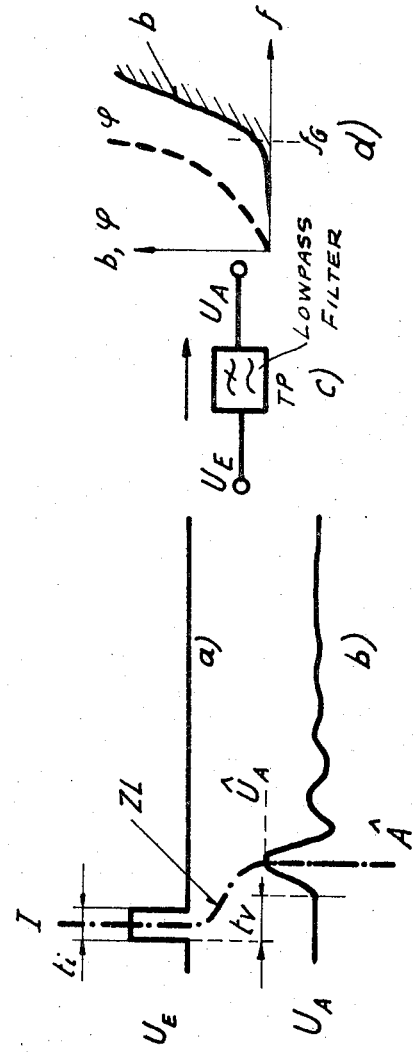
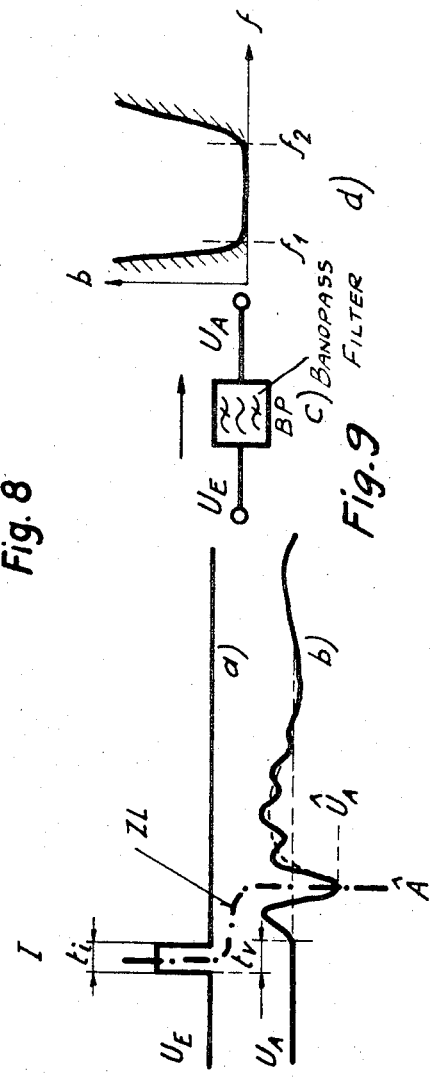
Fig. 8
Fig. 9

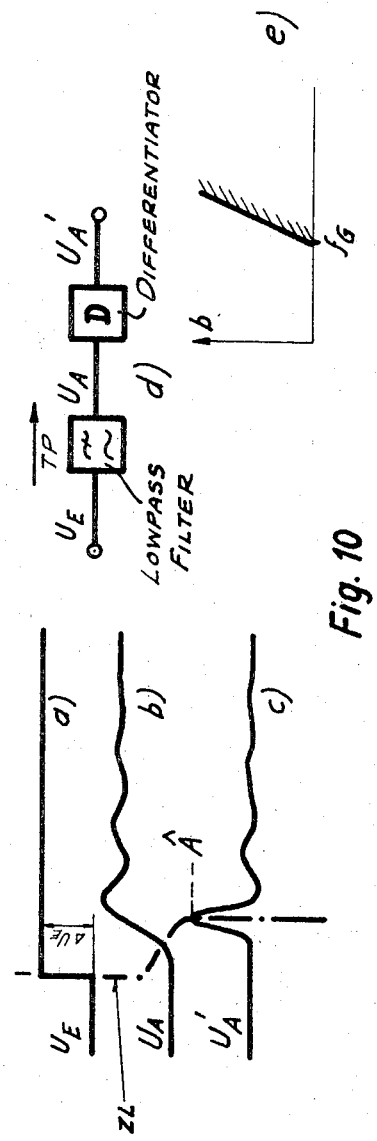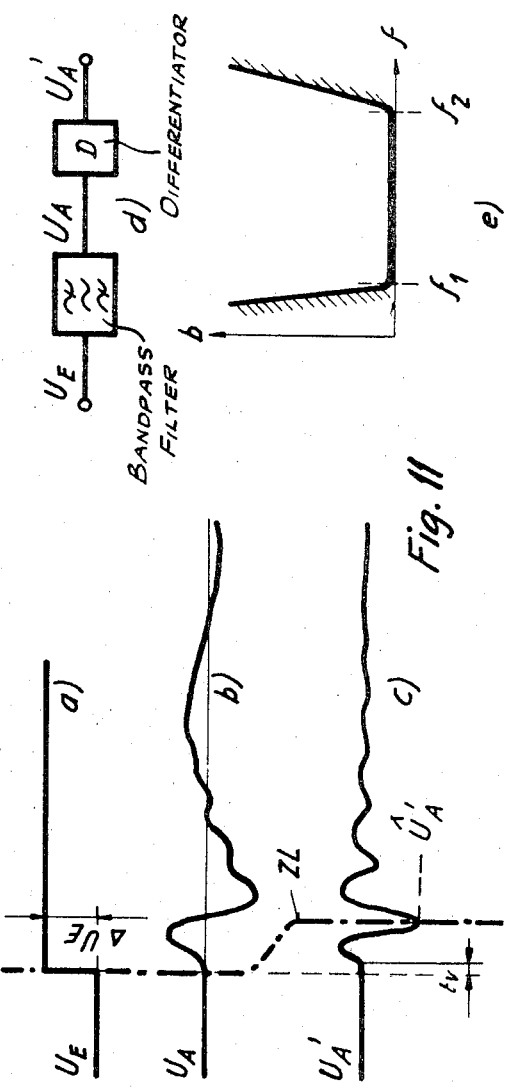
Fig. 10
Fig. 11

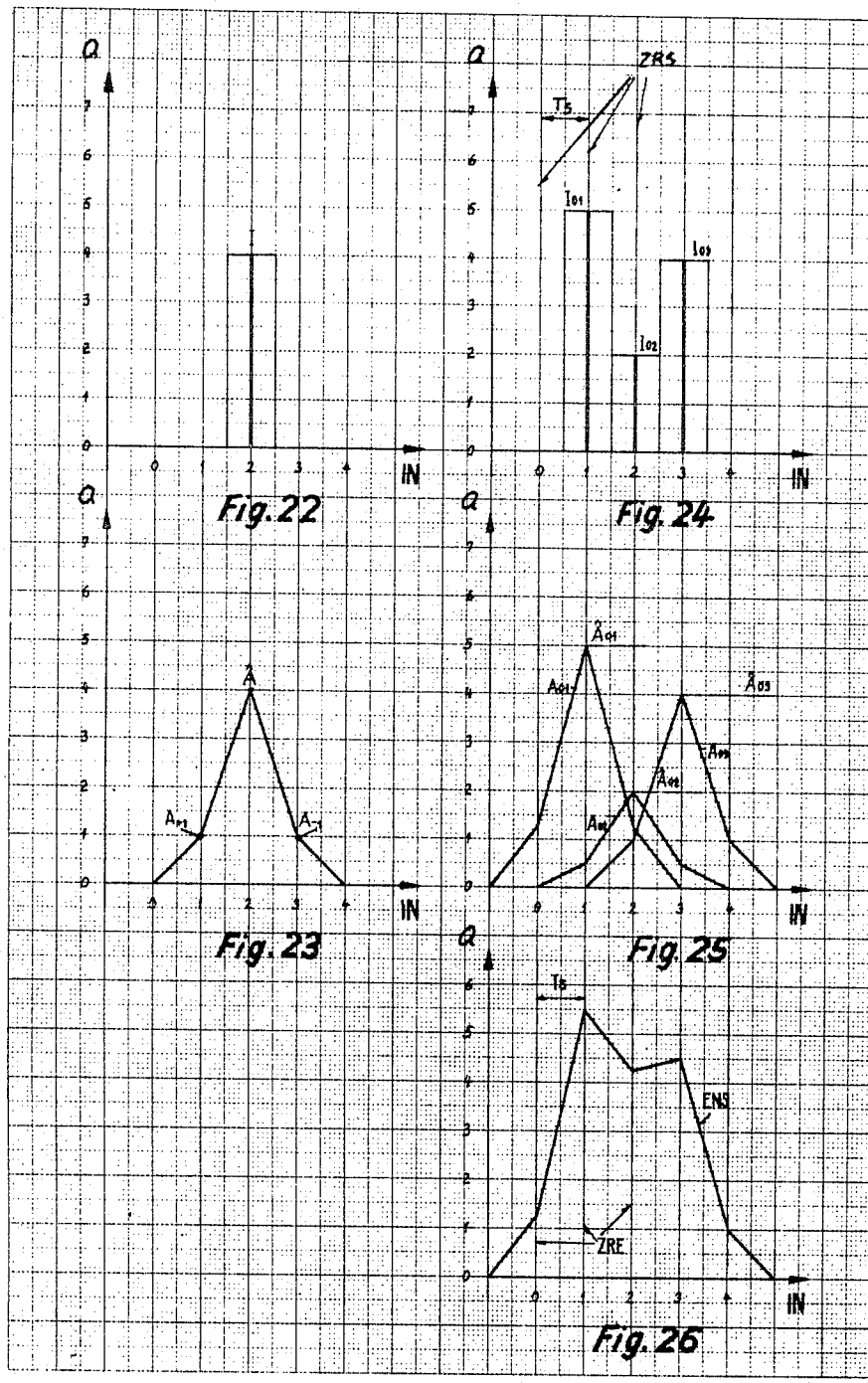

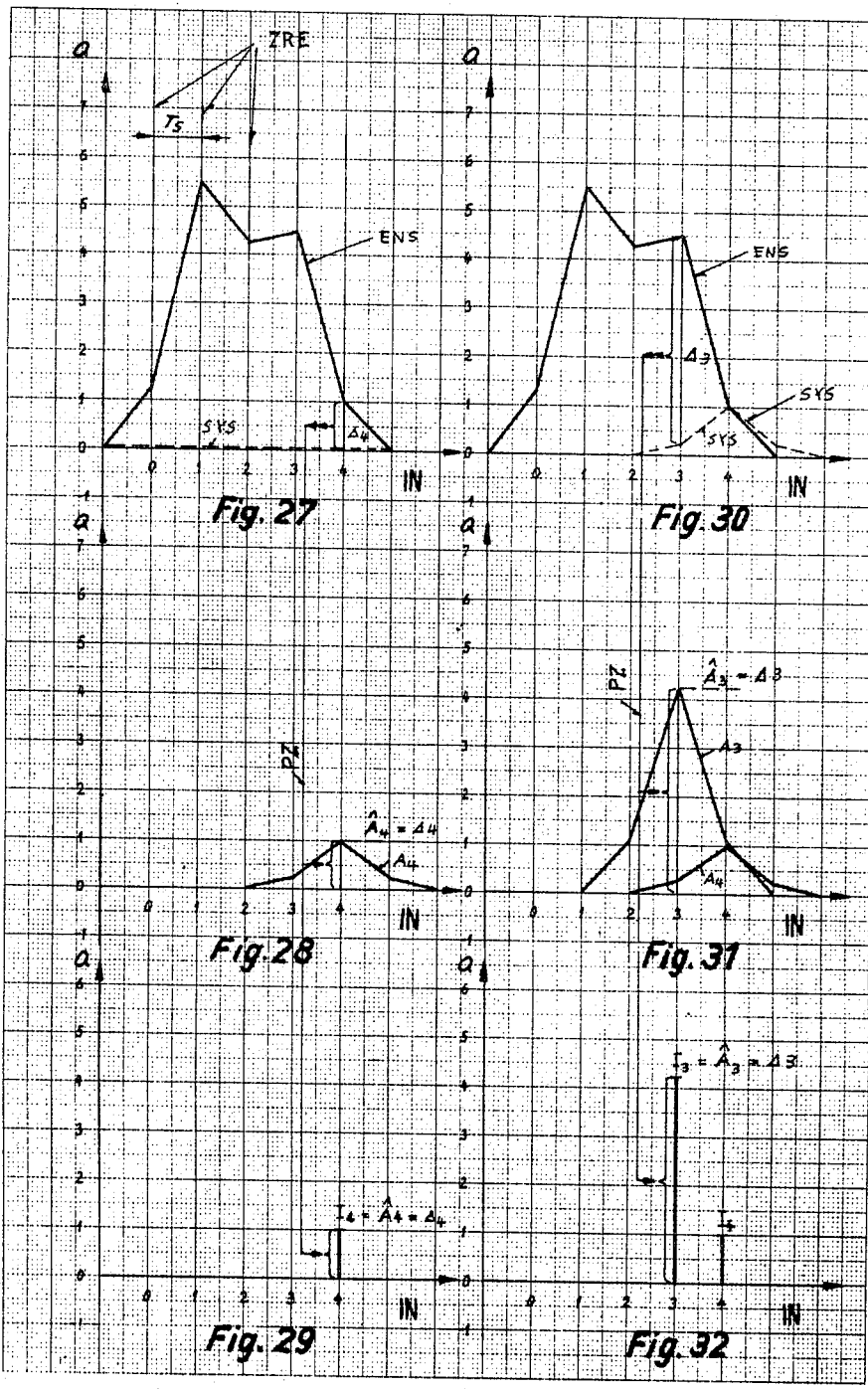

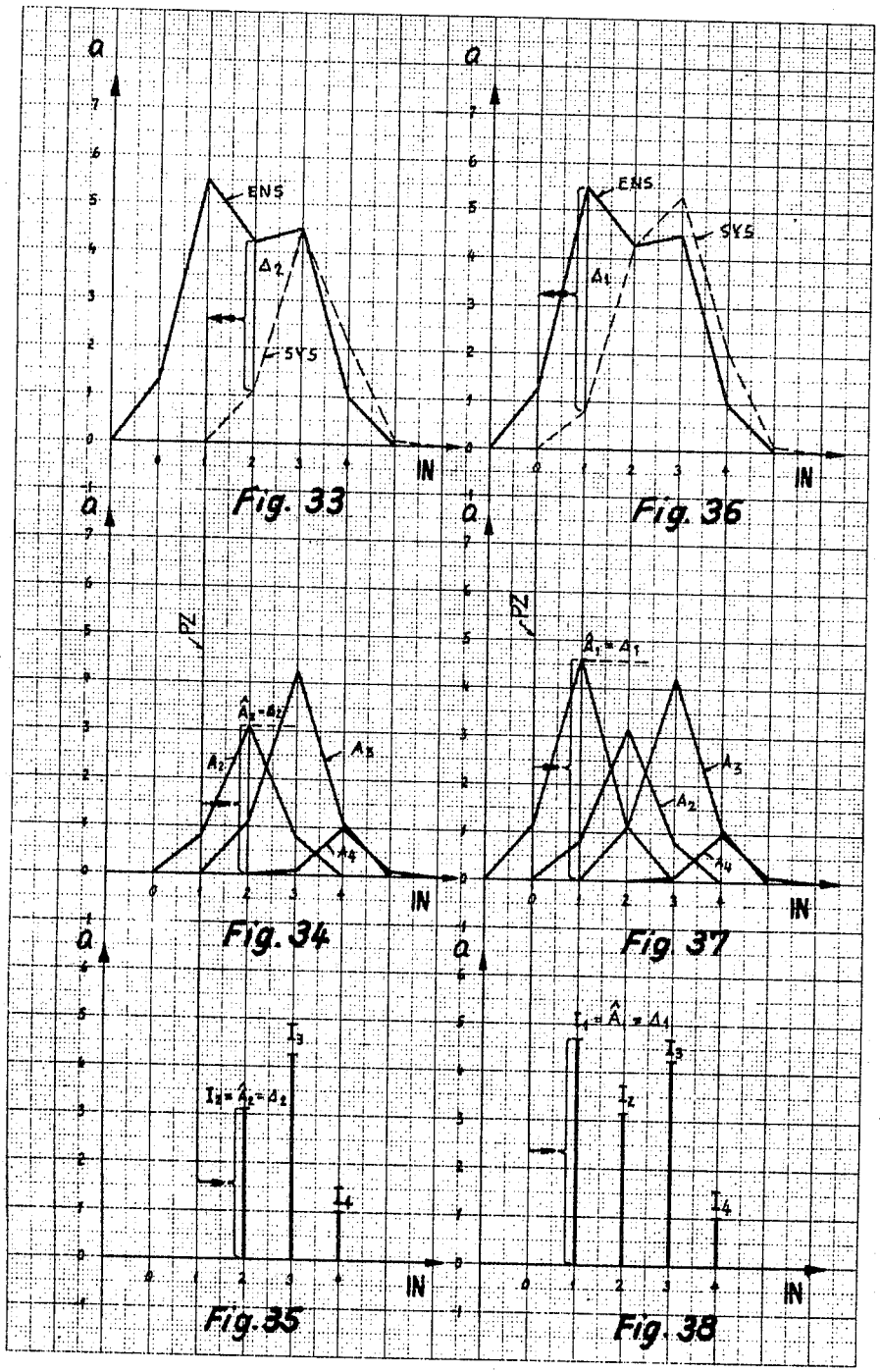

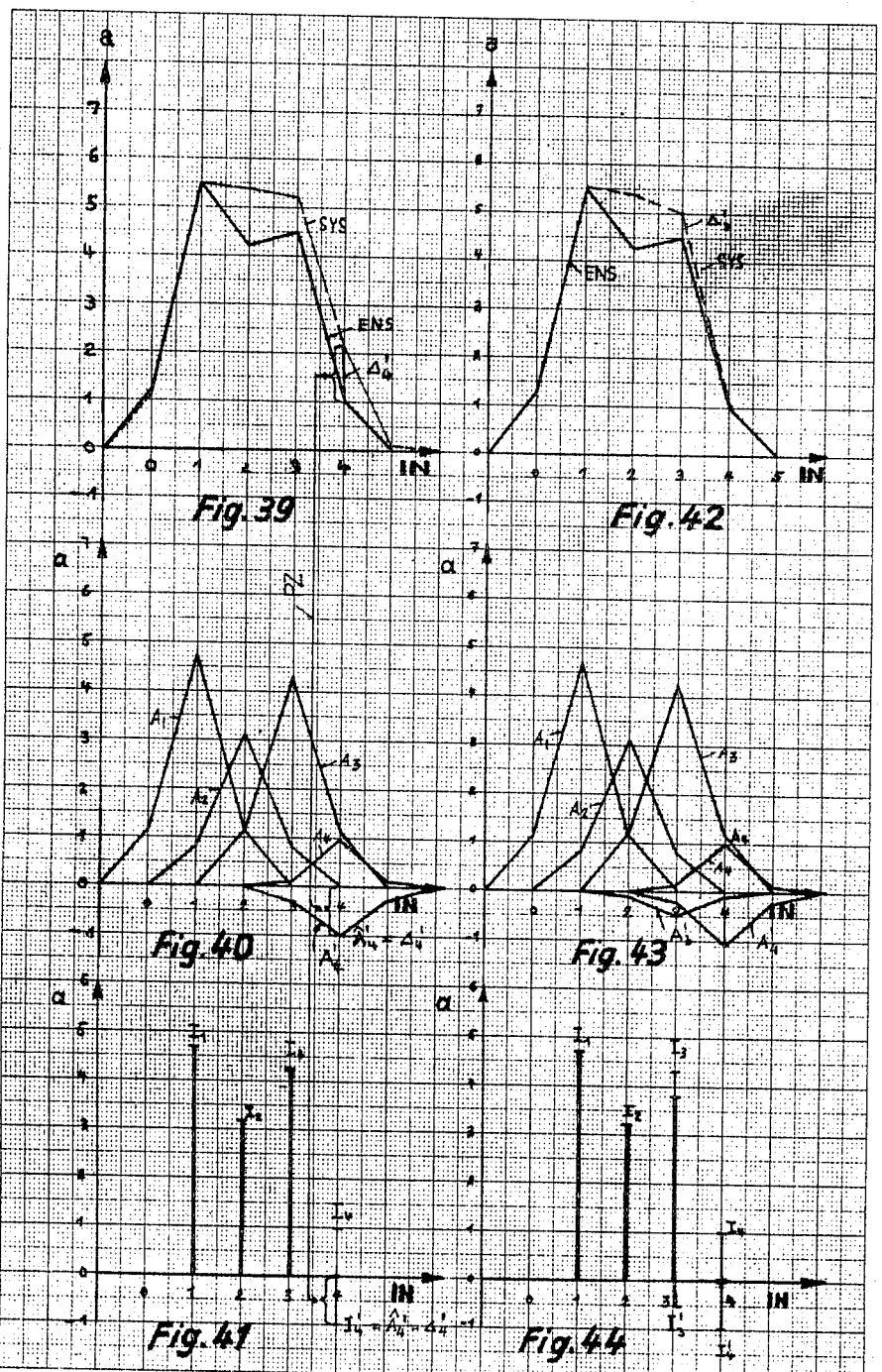

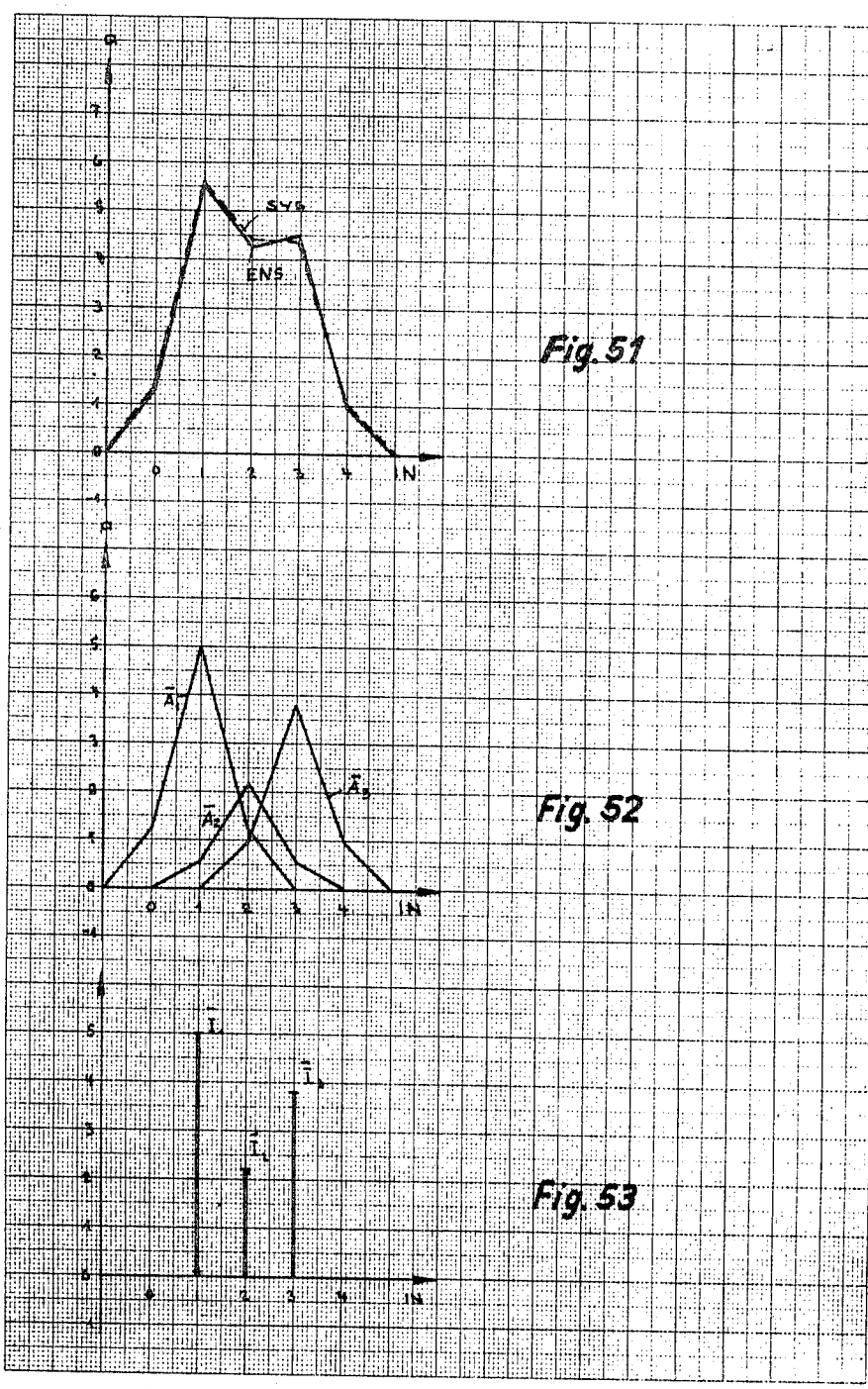

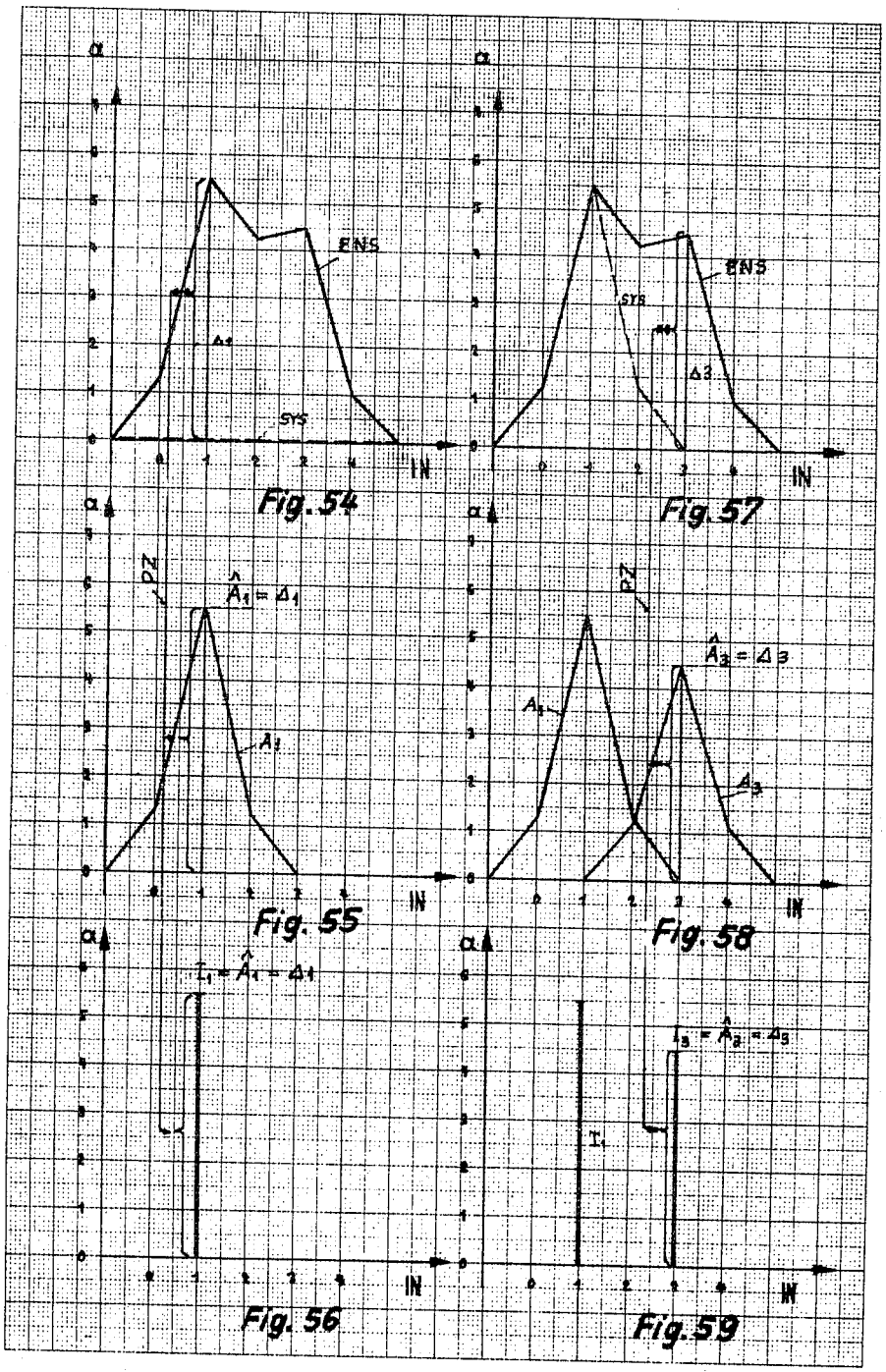

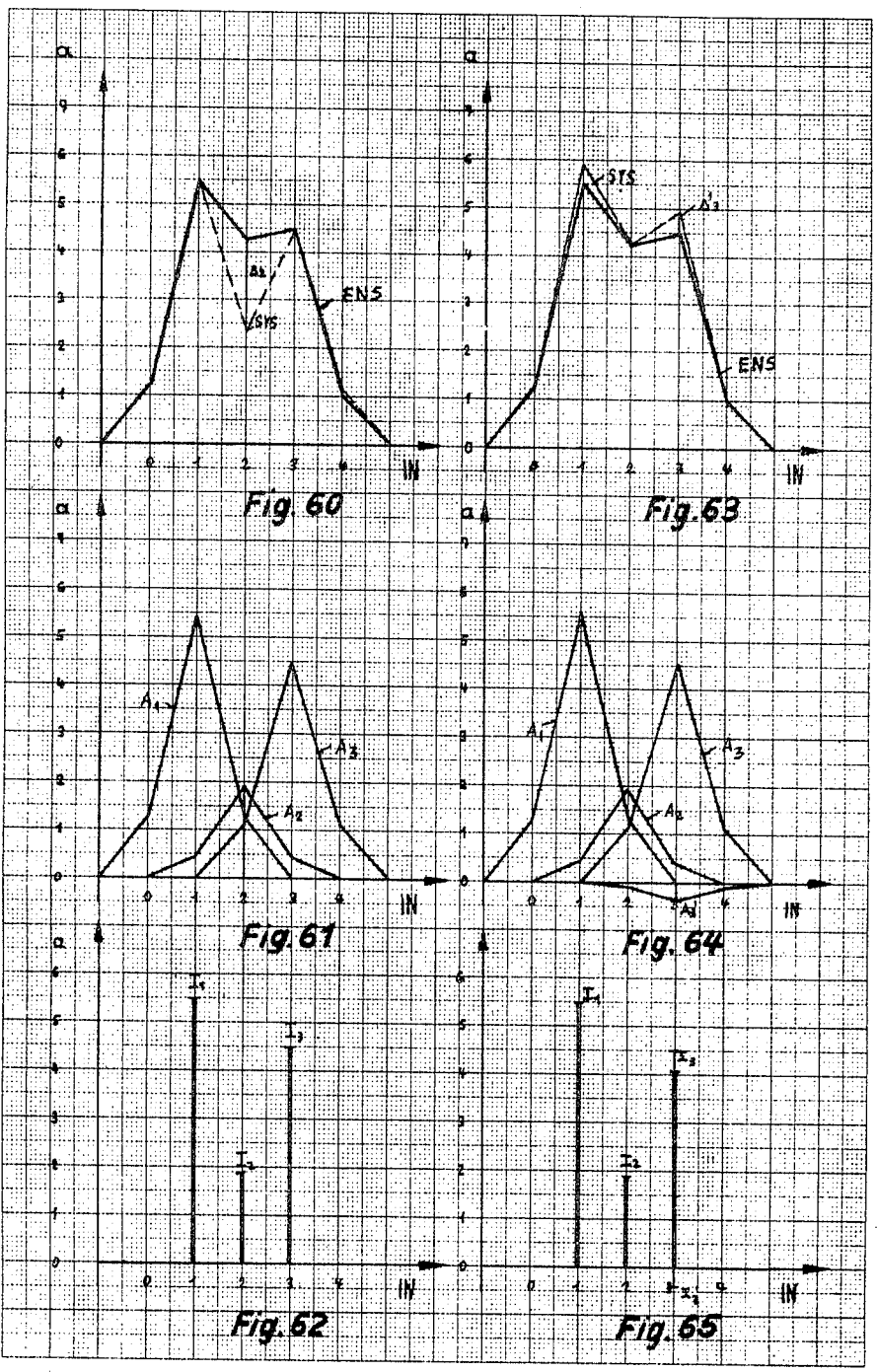

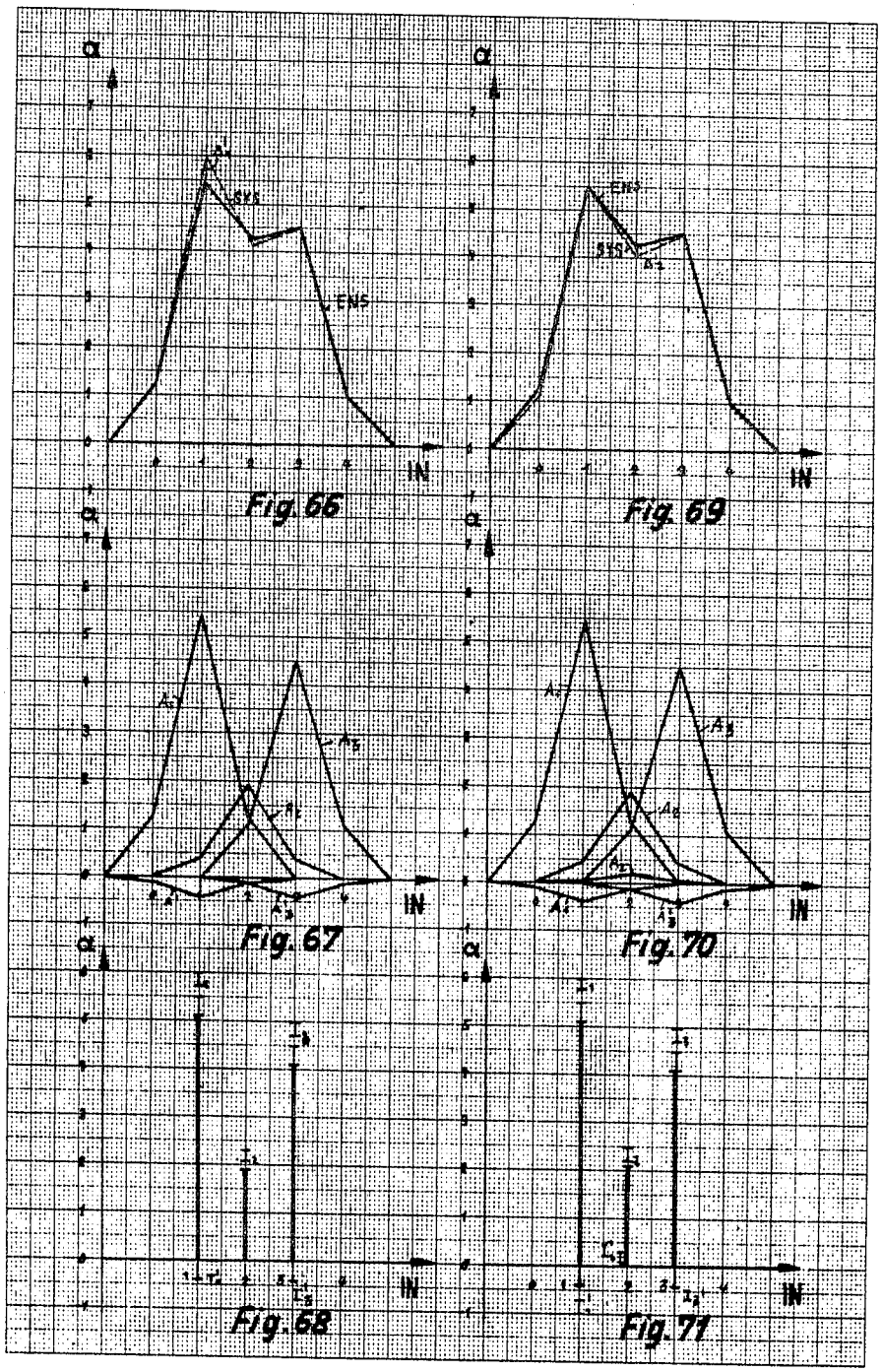

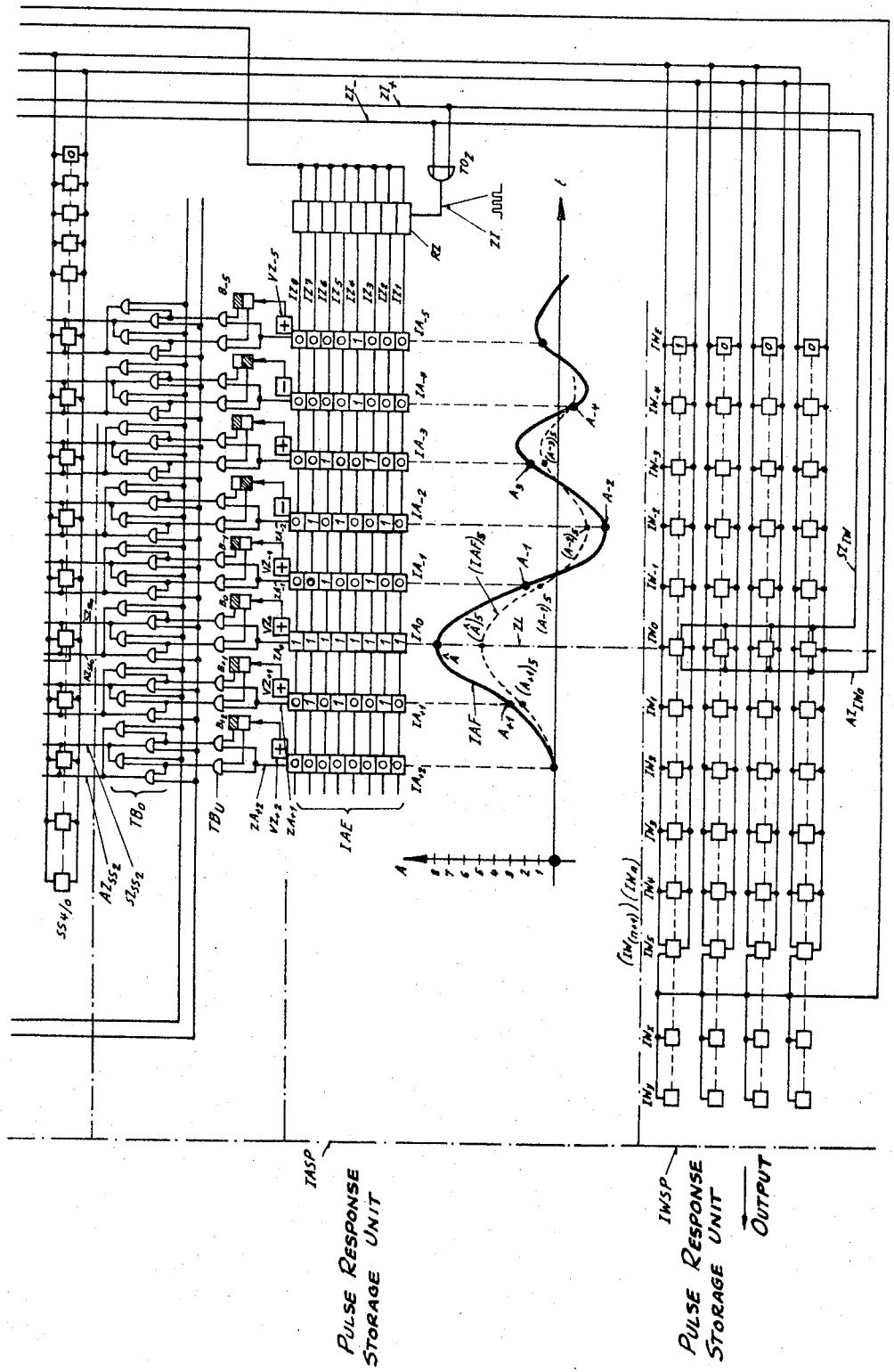
Fig. 83 (1)

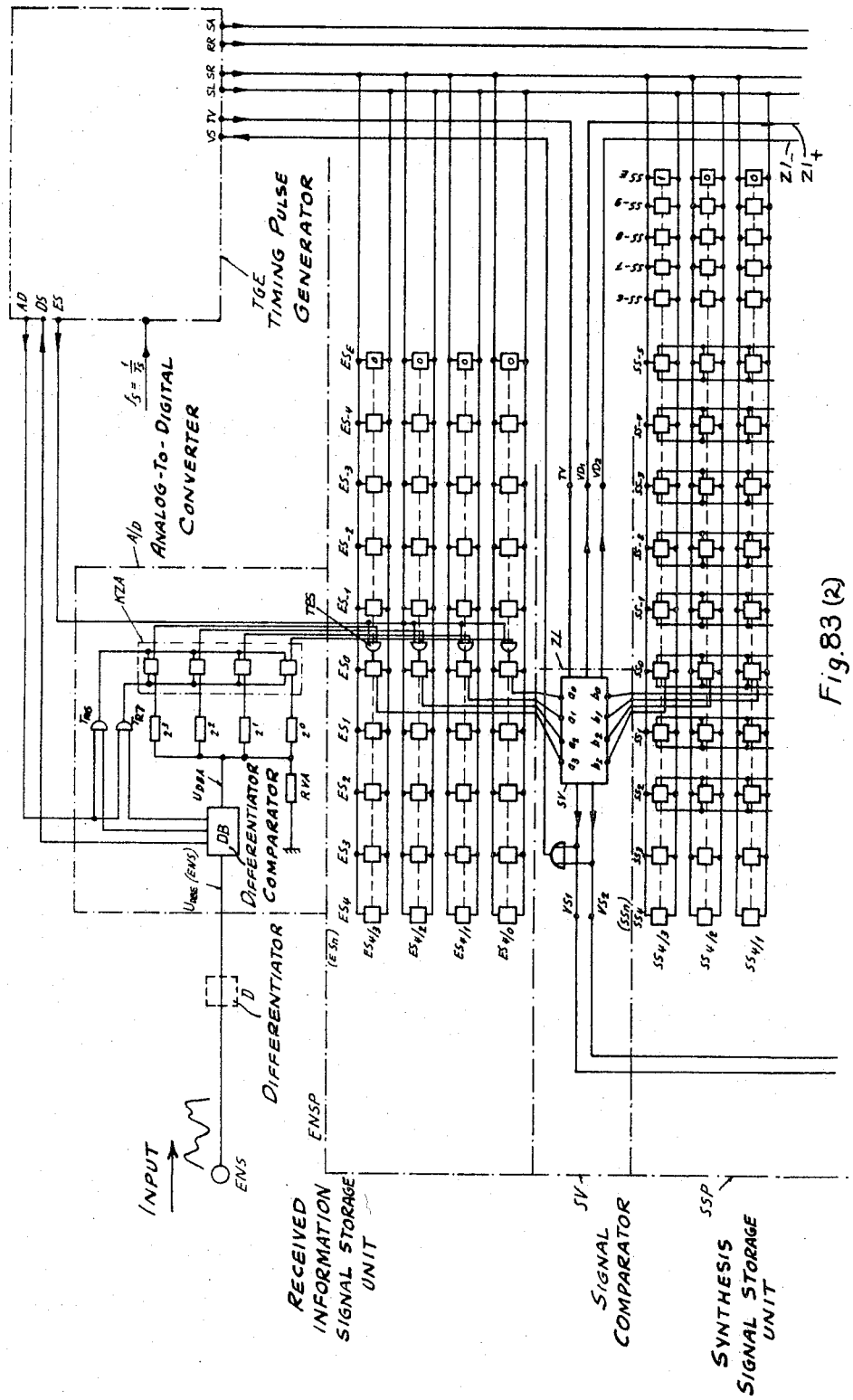

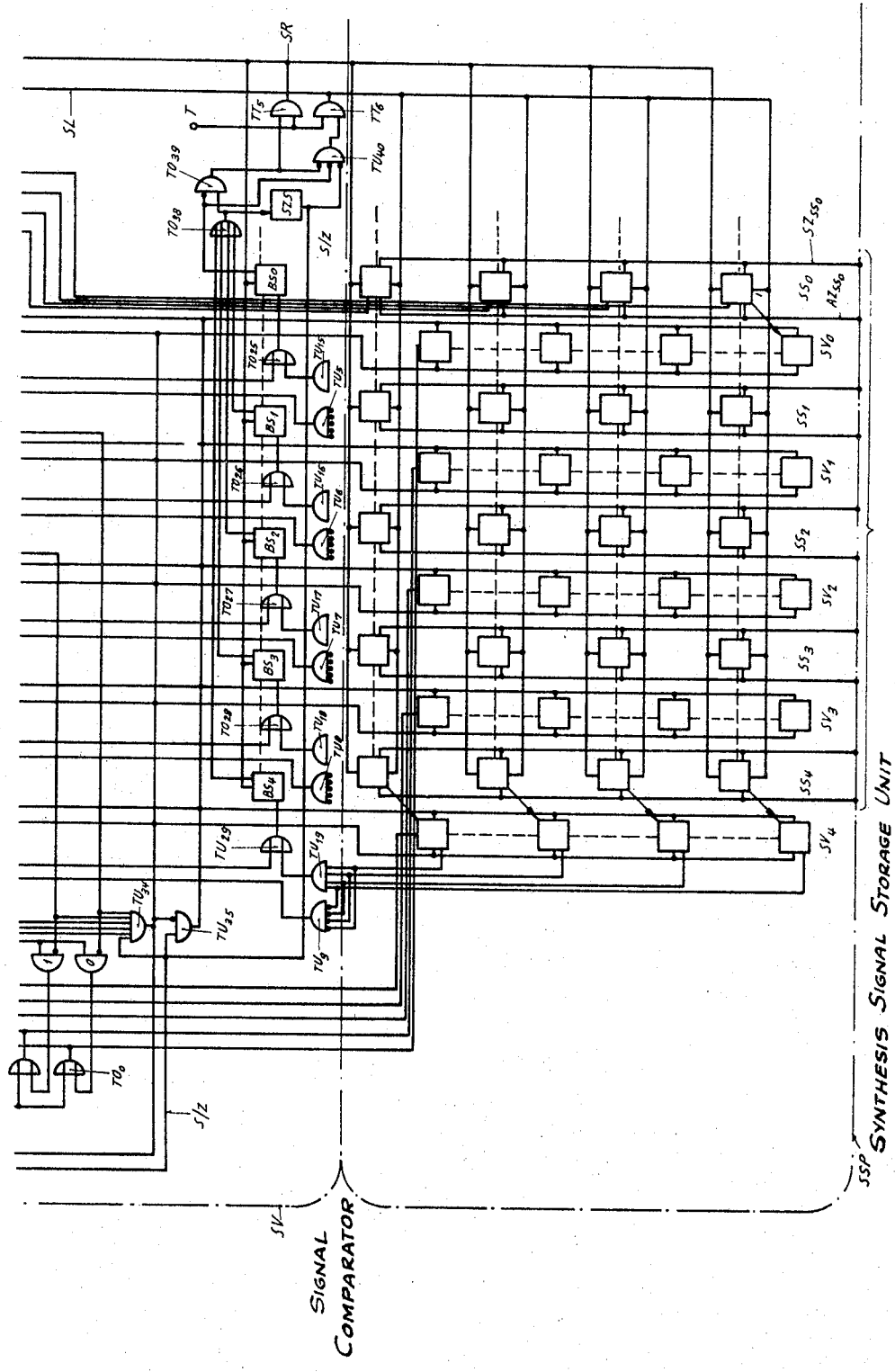
Fig. 93 (1)

3,436,478
DISTORTION CORRECTION APPARATUS FOR USE WITH TRANSMISSION CHANNELS OF LIMITED BANDWIDTH
Kurt Ehrat, Zurich, Switzerland, assignor to Gretag Aktiengesellschaft, Regensdorf, Switzerland
Filed July 19, 1965, Ser. No. 472,766
Claims priority, application Switzerland, July 23, 1964, 9,640/64
Int. Cl. H04l 25/06; H04b 1/10
U.S. Cl. 178—69                    8 Claims

ABSTRACT OF THE DISCLOSURE

Receiver or series of information pulses distorted by the characteristics of a transmission channel of limited bandwidth, in which the series of information pulses is recovered by storing a reference pulse as distorted by the transmission channel as a reference pulse response function, storing the distorted information signal, forming a synthesis signal by superimposing a series of individual pulse response functions each proportional to the stored pulse response function, matching said synthesis signal to the stored information signal by adjusting the individual pulse response functions and deriving from said adjustments the series of information pulses.

The invention relates to a method and apparatus for transmitting information signals at high information densities over transmission channels of limited bandwidth.

In theory a transmission channel with ideal lowpass or bandpass characteristics is capable of transmitting in a unit of time a number of amplitude values or amplitude differences which are independent of each other and in theory these values can be identified again at the receiver end, whereby the number of these values which can be thus transmitted and identified is at most equal to double the limiting frequency or double the bandwidth of the transmission channel. However, when using non-ideal transmission channels the attainable maximum of the information density is considerably lower than this, and so far as is known by me this attainable maximum can only be increased by means of artificial phase correction of the channel. Quite a large number of phase correctors of this kind are already known, and they can be divided up into two groups, a passive group and a second group using active circuits. The first of these groups, using passive circuits, is unsuitable where the requirements are high and in what follows there will therefore be considered only the group of phase correctors which use active circuits. With this kind of phase corrector the information signal which has been received in distorted form is artificially corrected, or the phase positions of the individual frequency portions of the information signal are put back into their correct relationships with each other by mixing-in a complementary correction signal. The chief difficulty involved in this method is to obtain the correct adaptation or matching of the correction circuits to the channel characteristics, and this difficulty is of course particularly acute if these channel characteristics are for any reason variable.

It is an object, therefore, of the present invention to provide a method whereby signals transmitted over a transmission channel can be recovered at a receiver from the distorted received information signals.

Accordingly, there is provided a method of receiving information signals transmitted over a transmission channel of limited bandwidth comprising:
(a) Storing a transmitted signal in sections,
(b) Forming individual pulse response functions each having a maximum value correlated to a different section of the stored information signal and approximately proportional to a reference pulse response function and superimposing the pulse response functions so formed to provide a synthesis signal,
(c) Matching the synthesis signal to the stored information signal by adjusting the maximum values of each of the individually formed pulse response functions, and
(d) From the adjustments made to the individually formed pulse response functions deriving a series of signal values which closely correspond to those forming the transmitted information signal.

According to a further feature of the present invention the adaption or matching of the synthesis signal to the distorted received information signal is effected for each stored section thereof by iteration, whereby first of all a first pulse response function is matched by changing its value at a point near its maximum to a section of the received and stored information signal with the result that there is formed a first synthesis signal, whereupon there is determined the difference between this preliminary synthesis signal and another section of the received information signal and then a second pulse response function correlated to this other section is adjusted in its value to minimize the difference, with the result that there is formed a second synthesis signal formed by the superposition of the two pulse response functions which have up to now been adjusted, whereupon the same process is repeated to adjust a third pulse response function and the process is repeated on further sections of the stored information and on those already matched until, by repeating the matching process as often as may be required a synthesis signal is produced which is at least approximately the same as the stored section of the received information signal, the pulse values attributed to the individual pulse response functions being also changed in proportion to the value of the pulse response functions with the result that this succession of pulse values thus formed at the receiver end represents the distortion corrected information signal.

There is further provided apparatus for performing the above defined method and comprises:
(a) A first store for storing a transmitted reference pulse as modified by the characteristics of the transmission channel as a reference pulse response function,
(b) A second store for storing the transmitted signal in sections; and
(c) a device for forming pulse response functions each having a maximum value correlated to a different section of the stored information signal and proportional to the stored pulse response function and superimposing the pulse response functions so formed to provide a synthesis signal, said device including a comparator for comparing the synthesis signal with the stored information signal and adjusting the maximum values of each of the individually formed pulse response functions so that the former corresponds within predetermined limits to the latter and providing a series of signal values closely corresponding to those forming the transmitted information signal from the adjustments made to the individually formed pulse response functions.

In what follows, one suitable embodiment of the invention will be described in detail with reference to the accompanying drawings in which FIGS. 1 to 21 serve to clarify the basic requirements of the present invention and FIGS. 22 to 74 illustrate steps in a method according to a preferred embodiment of the invention. FIGS. 75 to 108 show apparatus for realizing the method described with reference to the aforementioned figures and also show diagrams to clarify the manner in which the apparatus functions.

FIG. 8 shows the pulse response function $b$ of a non-ideal lowpass filter $c$, $d$ resulting from a rectangular pulse $a$.

FIG. 9 shows the pulse response function $b$ of a non-ideal bandpass filter $c$, $d$ resulting from a rectangular pulse $a$.

FIG. 10 shows the pulse response function $b$ of a non-ideal lowpass filter $d$, $e$ resulting from a jump pulse $a$, and also shows the differential derivative $c$ of this pulse response function.

FIG. 11 shows the pulse response function $b$ of a non-ideal bandpass $d$, $e$ resulting from a jump function $a$, and also shows the differential derivative $c$ of this pulse response function.

FIGS. 22 to 53 are a graphical representation of the process according to the invention, whereby the iteration is done in the sequence of pulses, one after the other.

FIGS. 54 to 74 represent the same iteration process as shown in FIGS. 22 to 53, but in this case the iteration is performed in the sequence of the values of the differences in the stored range.

FIG. 83 shows the block circuit of a digital iteration receiver for realising the method according to the invention.

To begin with there will now be described with the help of the drawings a number of characteristic and partly idealised pulse response functions, which will also be discussed.

Figure 1:
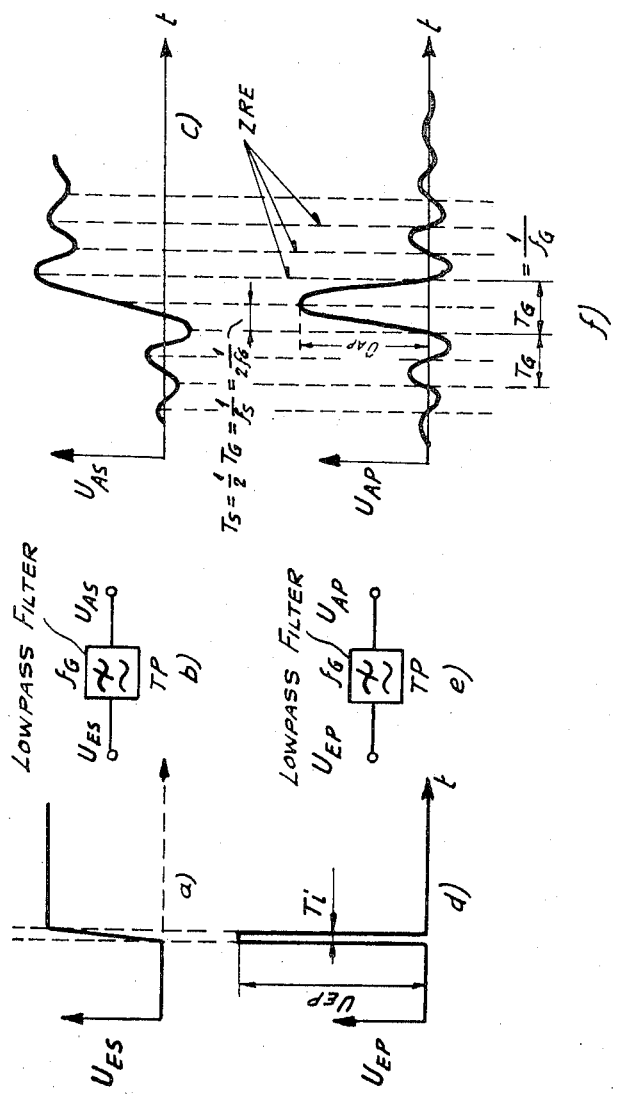
FIG. 1 shows the pulse response function $c$ of an ideal lowpass filter $b$ resulting from a jump pulse $a$, and also shows the pulse response function $f$ of an ideal lowpass filter $e$ resulting from a rectangular pulse $d$.

In FIG. 1, the diagram $a$ represents a jump-pulse which is fed to the input $U_{ES}$ of an ideal lowpass filter TP, represented symbolically in the diagram $b$, with the limiting frequency $f_G$. At the output $U_{AS}$ of the lowpass filter there will appear the response function $U_{AS}$ (diagram $c$) as the effect of the jump pulse supplied to the input. In what follows every kind of response function, that is to say resulting from a jump-pulse, a Dirac pulse, or a rectangular pulse will be called a pulse response function.

In FIG. 1 the diagram $d$ represents a short rectangular pulse $U_{EP}$ of duration $T_1$, which is supplied to the input $U_{EP}$ of an ideal lowpass filter TP, represented symbolically in the diagram $e$. As one has here an ideal lowpass, the shape of the pulse response function resulting from the input pulse $U_{EP}$ can be calculated in the usual way:

$$U_{AP} = \hat{U}_{AP} \frac{\text{sine } \frac{2\pi}{T_G} t}{\frac{2\pi}{T_G} t}$$

where $\hat{U}_{AP}$ is the maximal value of the pulse response function, $t$ is the time and $T_G$ is the period of the limiting frequency $f_G$ of the lowpass filter ($T_G = 1/f_G$). This shape of pulse response function results when the pulse duration $T_i$ of the input pulse $U_{EP}$ is small compared to the period $T_G$ of the limiting frequency. In practice it is enough if the pulse duration $T_i$ is smaller than half the period $T_G$ of the limiting frequency, or at most equal to it. That is to say $T_i \leq T_S$, whereby $T_S = \frac{1}{2} T_G$.

From FIG. 1 one can also derive that the pulse response function $U_{AS}$ is the integral of the pulse response function $U_{AP}$, while the input jump-pulse $U_{ES}$ is the integral of the input pulse $U_{EP}$. Conversely the pulse response function $U_{AP}$ is of course the differential derivative of the pulse response function $U_{AS}$, while the input pulse $U_{EP}$ is the derivative of the jump-pulse $U_{ES}$.

Figure 2:
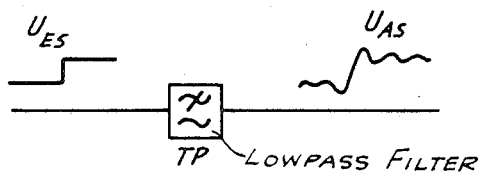
FIG. 2 and 3 are simplified representations of FIG. 1.
Figure 3:
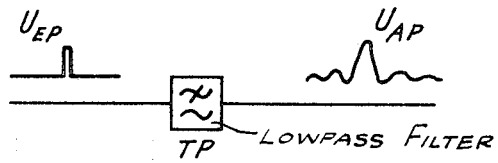
Figure 4:
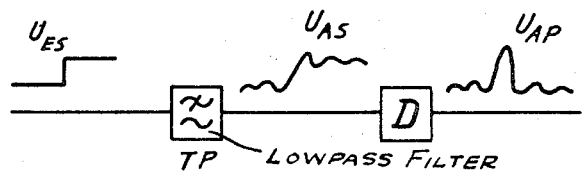
FIG. 4 shows the pulse response function of an ideal lowpass filter resulting from a jump pulse, and also shows its differential derivative.

The matter is summarised in FIGS. 2 to 4. In FIG. 2 a jump-pulse $U_{ES}$ is converted by a lowpass filter into a pulse response function $U_{AS}$, whereas in FIG. 3 a rectangular pulse $U_{EP}$ is converted into a pulse response function $U_{AP}$, and in FIG. 4 a jump-pulse $U_{ES}$ is converted into a pulse response function $U_{AS}$ which, by means of a differentiator D produces the same function $$\left( k \frac{dU_{AS}}{dt} = U_{AP} \right)$$

as that of FIG. 3, but containing a constant factor.

Figure 5:
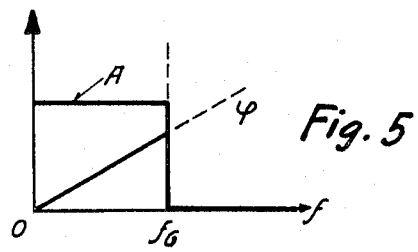
FIG. 5 shows the amplitude and phase curves for an ideal lowpass filter.

FIG. 5 shows the requirements for an ideal lowpass, which are a constant amplitude A in the pass range (from the frequency zero up to the limiting frequency $f_G$), complete blocking in the blocking range ($f > f_G$) and a linear phase behavior $\gamma$ (from the frequency zero up to the limiting frequency $f_G$).

Returning to the diagram $f$ of FIG. 1, it will be seen that the pulse response functions have zero points at intervals equal to the half period of the limiting frequency $T_S = \frac{1}{2} T_G$. In the time grating ZRE, with grating intervals $T_S$, all the grating lines pass through the zero transitions of the pulse response function, with the exception of one which passes through the maximal value $\hat{U}_{AP}$. Each new input pulse $U_{EP}'$, supplied to the input after the interval $T_S$ of the time grating, produces a new pulse response function shifted by the time grating intervals $T_S$ and proportional in value to the new input pulse. If the pulse response functions are picked off only at their maximal values, there is no cross-talk between the individual pulses, and it is therefore possible, as previously mentioned, to transmit independent pulse values up to a maximal pulse frequency of $1/T_S = f_S = 2f_G$.

Figure 6:
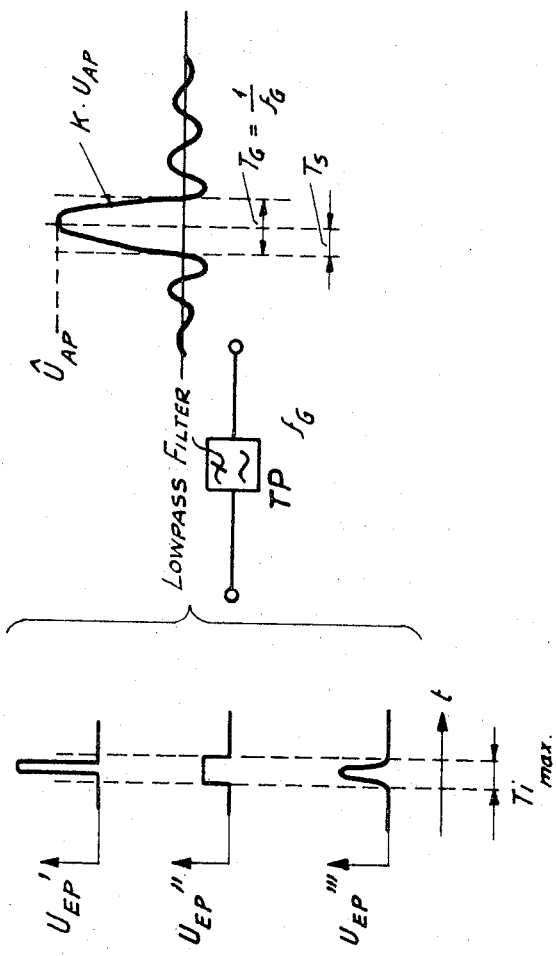
FIG. 6 shows the pulse response function at the output of an ideal lowpass filter resulting from input pulses of various shapes.

In FIG. 6 three different shapes of input pulses, that is to say $U_{EP}'$, $U_{EP}''$ and $U_{EP}'''$, are supplied to the input of an ideal lowpass TP. All three input pulses produce practically the same pulse response function $KU_{AP}$ at the output. In FIG. 6 the input pulse $U_{EP}'$ is very narrow and high, while $U_{EP}''$ is wide and low and $U_{EP}'''$ is rounded off. As long as the width $T_{i_{max}}$ of the pulse is less than the time grating interval $T_S$ (that is to say $T_{i_{max}} \leq T_S$, and therefore $T_{i_{max}} \leq \frac{1}{2} f_G$), the shape of input pulse hardly influences that of the pulse response function. It is a close approximation to say that the shape of the pulse response function depends only on the product of the input pulse width times the input pulse height. On the basis that one can transmit $2f_G$ ($=1/T_S$) pulse values independent of each other, as mentioned above, the time interval between two individual pulse values is $T_S$ ($=\frac{1}{2} f_G$). Each pulse value can therefore be allowed to retain its full value during this interval of time, whereupon the following pulse value again lasts for the same interval of time ($T_i = T_S$). One thus has the individual pulse values in the form of rectangular pulses of width $T_i = T_S$ and a height corresponding to the information content. In what follows only this shape of pulse will be discussed, because any other shape of input pulse producing the same value of the pulse response function will still produce the same result, although the amplitude might be different. One will therefore choose for an input pulse the shape $U_{EP}''$ of FIG. 6, whereby $T_{i_{max}} = T_S$, that is to say is equal to the interval between two neighboring pulse values, or the time grating interval.

Figure 7:
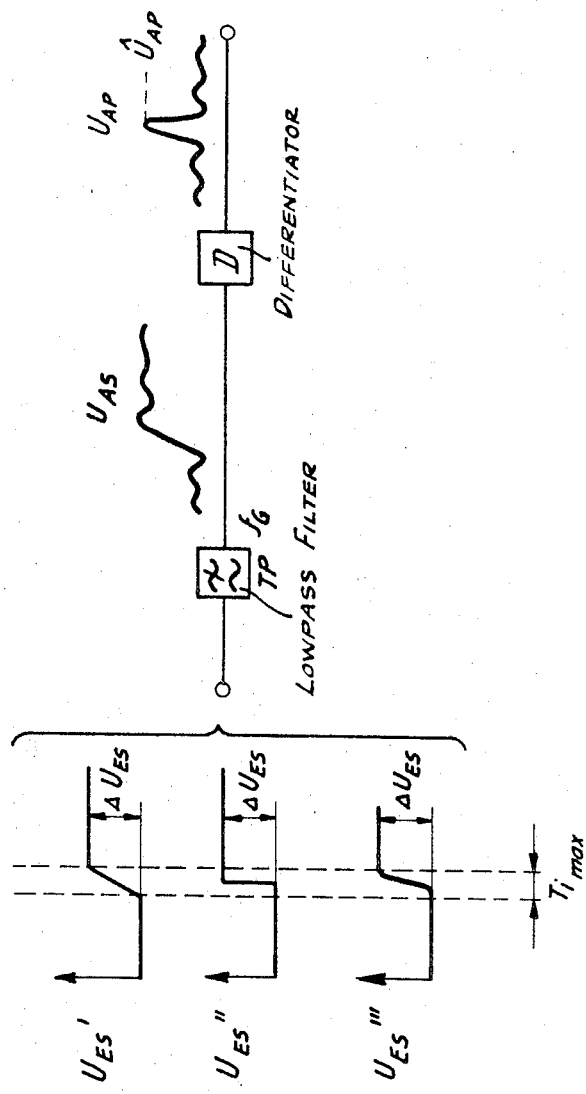
FIG. 7 shows the pulse response function at the output of an ideal lowpass filter resulting from various jump functions at the input, and also shows the differential derivative.

FIG. 7 shows various shapes of jump-pulses, all taking place within the time interval $T_{i_{max}}$, where $T_{i_{max}} \leq \frac{1}{2} f_G$. In FIG. 7 the jump-pulse $U_{ES}$ is of ramp shape, while $U_{ES}''$ is a pure jump-pulse and $U_{ES}'''$ is a rounded jump pulse. Provided that the jump takes place during a time interval less than $\frac{1}{2} f_G$, the resulting shape of the pulse response function is practically the same assuming the same jump height, independently of the shape of the jump. FIG. 7 shows, in addition to the jump response function $U_{AS}$ also the derivative $U_{AP}$, obtained with the help of a differentiator D, and this derivative also has the shape of the pulse response function produced by a short pulse $$\left( U_{AP} = k \frac{dU_{AS}}{dt} \right)$$

The maximal value $\hat{U}_{AP}$ of the derived function is proportional to the height of the jump, that is to say $\hat{U}_{AP} = c \Delta U_{ES}$.

In FIG. B in diagram $a$, a pulse $U_E$ (I) of duration $t_i$ is supplied to a non-ideal lowpass filter TP (diagram $c$) resulting in the pulse response function $U_A$ shown in diagram $b$. The damping curve $b$ and the phase curve $\gamma$ in function of the frequency F are shown in the diagram $d$. In this case the pulse response function $U_A$ does not of course have the shape provided by an ideal lowpass filler, but it does still show a pronounced pulse maximum $\hat{U}_A(\hat{A})$. The maximal effect of the pulse $U_E$ in the pulse response function is in the region of this pulse maximum $\hat{U}_A$. These is of course also a time delay, indicated as $t_v$. However, in subsequent considerations regarding the pulse $U_E$ (I) the first criterion will be the pulse maximum $\hat{U}_A(\hat{A})$ of the pulse response function, corresponding to the characteristic line ZL.

In FIG. 9 is diagram $a$ a rectangular input pulse $U_E$(I) of duration $t_i$ has been fed to a non-ideal bandpass filter (diagram $c$) at whose output there appears the pulse response function $U_A$. The damping curve $b$ of this bandpass filter is shown diagrammatically in diagram $d$. Here again there results (diagram $b$) a certain time delay and a pronounced pulse maximum $\hat{U}_A$ ($\hat{A}$) in the pulse response function, and here again the input pulse $U_E$ is in the first place characterised by this pulse maximum. Whereas in the case of a lowpass filter the decay corresponds substantially to a decaying oscillation of the limiting frequency $f_G$ (FIG. 1$f$), in the case of a bandpass filter the decaying of the pulse response function corresponds to two frequencies, the lower and upper limiting frequencies $f_1$ and $f_2$. For example in telephone channels the lower limiting frequency is usually $f_1 = 300$ c.p.s. and the upper limiting frequency $f_2 = 3400$ c.p.s. Thus an oscillation at the lower limiting frequency has a duration about ten times longer than that of an oscillation at the upper limiting frequency. Assuming the same logarithmic decrement for the two decaying oscillations, the lower frequency takes about ten times longer to decay than the upper one. It should further be observed that in the case of a bandpass filter the middle valve of the pulse response function is of course at zero, because the D.C. component is suppressed. This fact becomes particularly important when one is transmitting a sequence of pulses entirely independent of each other, for example when using digital coding, because in a succession of pulses randomly distributed in their way there occur frequencies below the lower limiting frequency, right down to zero frequency i.e. D.C. current.

It should be observed that the pulse response function shown in FIG. 9 is typical for wide bandpass filters ($f_2 \gg f_1$), for example for a telephone channel where $f_1=300$ c.p.s. and $f_2=3400$ c.p.s. ($f_2 \approx 11 f_1$). If a narrow bandpass filter is used the pulse response function is considerably "widened" in time, and a single pulse maximum $\hat{A}$ can hardly any longer be recognised in the pulse response function.

In FIG. 10 in diagram $a$ a jump-pulse $U_E(\Delta U_E)$ is fed to the circuit represented in diagram $d$, after the non-ideal lowpass filter TP there results the pulse response function $U_A$ shown in diagram $b$, and at the output of the differentiator D there results the derived function $U_A{'}$. Diagram $e$ represents the pass characteristic $b$, whereby $f_G$ represents the limiting frequency.

In FIG. 11 in diagram $a$, a jump-pulse $U_E$ of height $\Delta U_E$ is fed to the input of the circuit represented in diagram $d$. After the non-ideal bandpass filter there results the pulse-response function $U_A$ shown in diagram $b$, and after the differentiator D there results the differential derivation $U_A{'}$ shown in diagram $c$. The pulse maximum $U_A{'}$ of the derived pulse response function is proportional to the height $\Delta U_E$ of the jump, that is to say $\hat{U}_A{'}=c\Delta U_E$. In FIGS. 10 and 11 the characteristic line for the maximum of the derived pulse response function is characterised by the line ZL. Diagram 11E represents the pass charactertistic curve of the bandpass filter, whereby the two limiting fraquencies are again $f_1$ and $f_2$.

If one supplies to the input of an information transmission channel not just single pulses but a succession of pulses spaced from each other at intervals $T_S=1/f_S$ (by means of a time grating ZRS at the sending end), then each individual pulse fed to the input end will produce a pulse response function whose amplitude is in each case proportional to the value of the initial pulse, whereby the individual pulse response functions will follow each other at the receiver end at the same intervals $T_S=1/f_S$ i.e. the time grating ZRE. By superposition of all these individual, successive pulse responses there results what has been called a "synthesis signal" SYS, which represents the received information signal. In the case of linear information transmission channels, which will be considered exclusively here, purely additive superposition is permissible.

Figure 12:
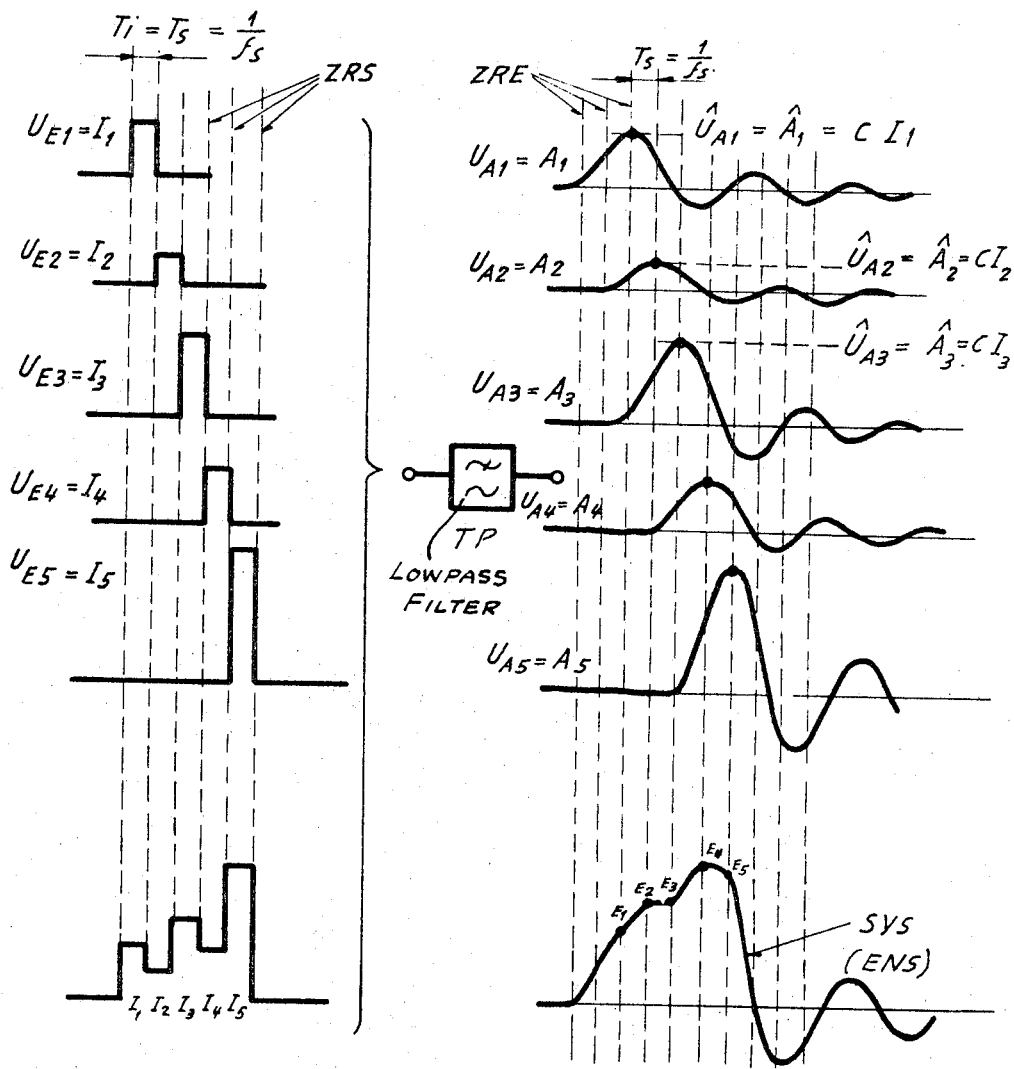
FIG. 12 shows the formation of a synthesis signal, or received information signal, by the superposition of individual pulse response functions.

FIG. 12 represents an example of this process of superposition to form a synthesis signal. In this diagram the information channel is a non-ideal lowpass filter TP. At the sender end the five pulses $I_1$ to $I_5$ are situated in the time grating ZRS at the grating intervals $T_S=1/f_S$. At the receiver end there result five pulse responses $A_1$ to $A_5$. The pulse response function $A_1$ is the result of the pulse $I_1$, and the value of $A_1$ is proportional to the value of $I_1$. The maximum of the pulse response function is therefore $\hat{A}_1=cI_1$. The pulse response function $A_2$ results from the pulse $I_2$, and the value of $A_2$ is proportional to that of $I_2$ so that $\hat{A}_2=cI_2$. At the sender end the two pulses are spaced by the interval $T_S=1/f_S$, and at the receiver end the pulse response functions are correspondingly spaced by the time interval $T_S=1/f_S$. The receiver time grating ZRE has the same intervals $T_S$ as the sender time grating, but with a time shift corresponding to the transmit time of the information channel. The receiver time grating ZRE should be so positioned that the grating lines pass through the maxima $\hat{A}_1, \hat{A}_2, \hat{A}_3 \ldots \hat{A}_5$ of the individual pulse response functions. The time gratings ZRS and ZRE are formed by the clock pulse generators having a repetition frequency of $f_S$ at the sender and receiver ends.

In FIG. 12 in the bottom left-hand corner there is represented the sender pulse sequence consisting of the five pulses $I_1$ to $I_5$, while the corresponding curve on the right represents the synthesis signal SYS produced by the superposition of the individual pulse responses (the synthesis signal SYS at the same time expresses the received information signal ENS). It is obvious that a direct scanning of this signal at the time grating intersections would give the values $E_1, E_2, E_3, E_4, E_5$, which are not in the least proportional to the pulses $I_1, I_2, I_3, I_4, I_5$. It is therefore, necessary to derive from a received information signal ENS, as shown at the bottom right-hand corner of FIG. 12, the initial pulse values $I_1$ to $I_5$, preferably by an iteration method as will be discussed in more detail hereinafter.

Figure 13:
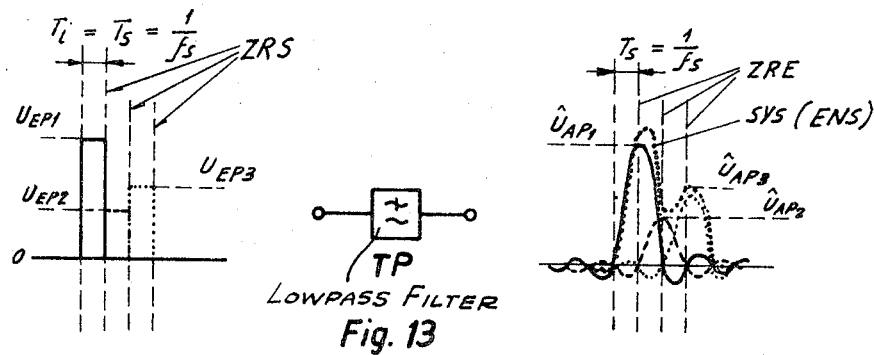
FIG. 13 shows the formation of a synthesis signal at the output of an ideal lowpass filter, resulting from three input pulses.

FIG. 13 represents in a similar way to FIG. 12 a succession of three individual sender pulses $U_{EP1}, U_{EP2}, U_{EP3}$, whereby the pulses are again spaced at the intervals of a time grating ZRS whose time interval is $T_S=1/f_S$. The pulse width $T_1$ is again so chosen that it is equal to the time grating interval, that is to say $T_1=T_S$, whereby the pulse value remains constant during the whole of the available period $T_S$. In FIG. 13 the pulse values are fed to a lowpass TP which has an ideal characteristic curve as represented in FIG. 5, rather than that of the low pass of FIG. 12. The maxima of the pulse response functions are proportional to the values of the individual initial pulses. For example $\hat{U}_{AP1}=cU_{EP1}$, and $\hat{U}_{AP2}=cU_{EP2}$ and so forth. From this it follows that the differences between successive input pulses are also proportional to the differences between the corresponding pulse response functions, for example $(\hat{U}_{AP2}-\hat{U}_{AP1})=c(U_{EP2}-U_{EP1})$ and so forth. Thus there are fed to the input of the lowpass filter TP at the frequency $f_S=1/T_S$ a succession of pulses of heights $U_{EP1}, U_{EP2}, U_{EP3}$ each of width $T_S$, whereby there results at the output of the lowpass filter a corresponding succession of pulse response functions whose maxima are $\hat{U}_{AP1}, \hat{U}_{AP2}, \hat{U}_{AP3}$ each time displaced by the amount $T_S$. The superposition of these three pulse response functions produces the pulse response, that is to say the synthesis signal SYS (which expresses the received information signal).

Figure 14:
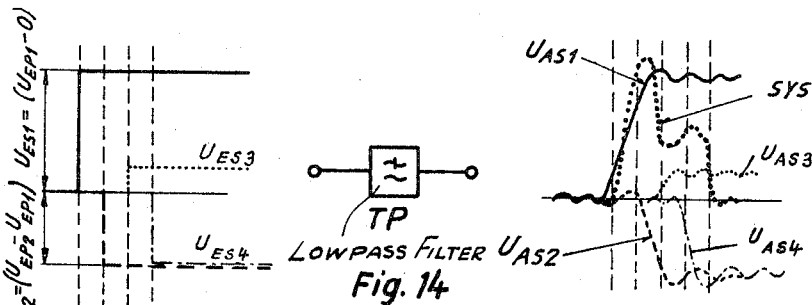
FIG. 14 shows the formation of a synthesis signal at the output of an ideal lowpass filter, resulting from three input jump pulses.
Figure 15:
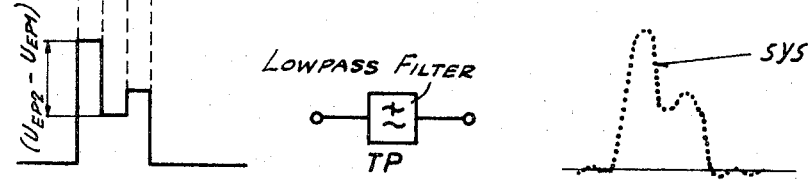
FIG. 15 is the superposition of the signals of FIG. 14.

FIGS. 14 and 15 show how the input signal consisting of three successive pulses can be regarded as built up out of four jumps (four amplitude differences). The first jump is $U_{ES1}=(U_{EP1}-0)$ and its response is the function $U_{AS1}$. The second jump is $U_{ES2}=(U_{EP2}-U_{EP1})$, and it results in the response $U_{AS2}$, and so forth. Thus the jumps are the amplitude differences between each two successive pulses, and each amplitude difference results in a corresponding pulse response function $U_{AS}$. From the diagrams it will be seen that the sum of these jumps at the input end adds up again to the initial signal of FIG. 13 (see also FIG. 15), moreover at the output end the pulse response functions $U_{AS1}, U_{AS2} \ldots$ when superposed provide the same synthesis signal SYS as that shown in FIG. 13 (see also FIG. 15). It follows that the signal can equally well be regarded as a succession of pulses or as a succession of jumps.

Figure 16:
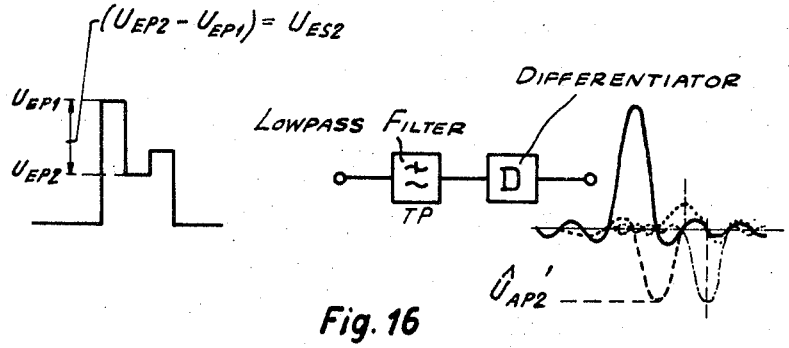
FIG. 16 represents the differentiation of the signals of FIG. 14.

In FIG. 16 the same succession of three pulses are fed to a lowpass filter TP and after that to a differentiator D. From each input jump pulse there results at the output a pulse maximum corresponding to that shown in FIG. 10. For example, from the jump $U_{ES2}=(U_{EP2}-U_{EP1})$ there results at the output end the derived pulse response function whose maximum is $\hat{U}_{AP2}{'}$. The value of each of these pulse responses derived by the differentiator is directly proportional to the value of the input jump (a jump is the amplitude difference between two successive pulses). For example, $\hat{U}_{AP2}{'}=c(U_{EP2}-U_{EP1})$.

FIGS. 13 to 16 thus represent two possible alternatives. The information can be represented by either the amplitude value or a difference between amplitude values. The corresponding evaluations are also shown in the figures. In FIG. 13 the information supplied by the sender takes the form of the amplitude values of the pulses $U_{EP1}, U_{EP2}$ and so forth whereas in FIGS. 14 to 16 an information is supplied in the form of the amplitude difference between two successive pulses, for example $U_{EP2}-U_{EP1}$.

At the receiver end the amplitude difference representing the information can be evaluated by either of two different methods. By the first method the response functions resulting from the individual input pulses (for example $U_{EP1}$ or $U_{EP2}$ in FIG. 13) are received and then, at the receiver end, are processed to form the pulse response functions for example by forming the difference between the maxima of successive pulses (for example $\hat{U}_{AP2} - \hat{U}_{AP1}$ in FIG. 13), whereby this difference is proportional to the input amplitude difference between the two successive pulses. By the second method (according to FIG. 16) the amplitude difference is directly obtained as the derivative provided by a differentiator situated at the output of the information channel.

Figure 17:
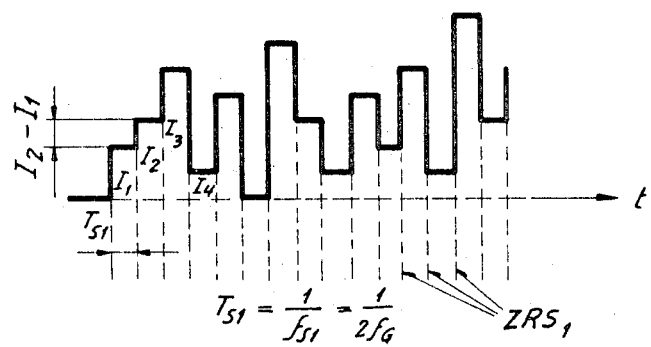
FIGS. 17 and 18 show the pulse trains in two different succession frequencies.
Figure 18:
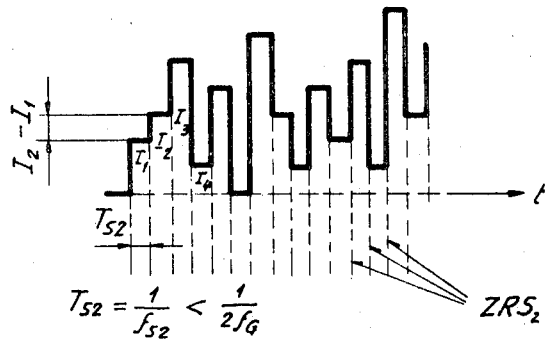
Figure 19:
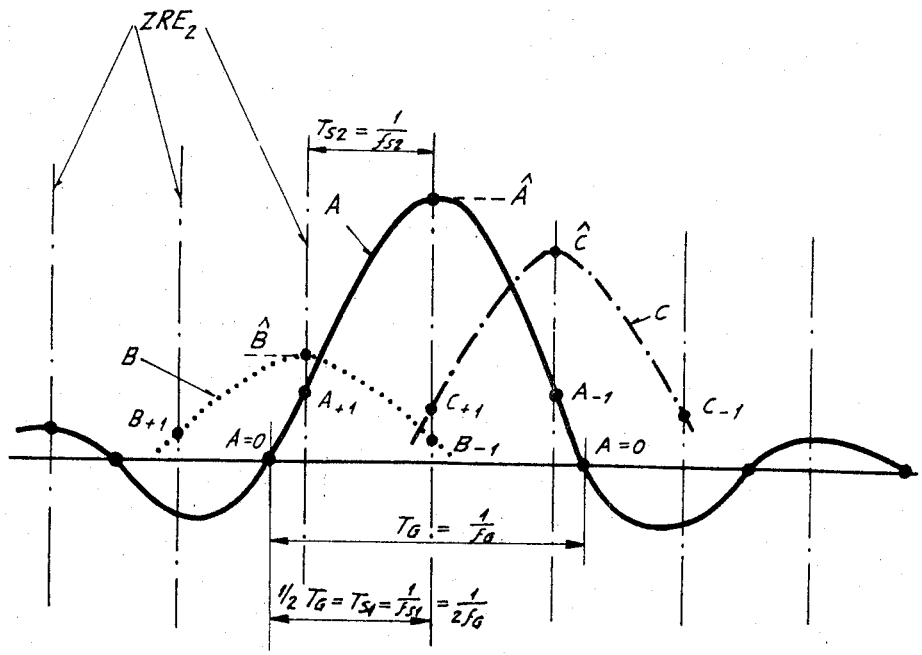
FIG. 19 shows pulse response functions produced in the presence of rather high pulse frequencies.
Figure 20:
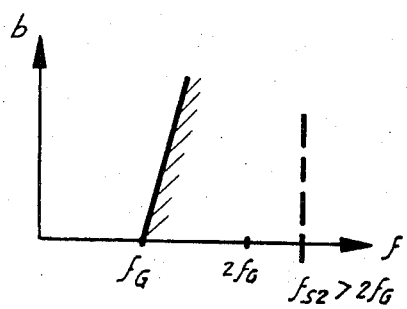
FIG. 20 is the frequency diagram for a lowpass filter.

FIG. 19 shows once more the pulse response of an ideal lowpass filter with limiting frequency $f_G$ and limiting frequency period $T_G$. If the pulse repetition frequency were to be $f_{S1} = 2f_G$ ($T_{S1} = 1/f_{S1} = 1/2f_G$), as represented by the pulse succession shown in FIG. 17, then the scanning of the maxima of the information pulse would coincide exactly with the zero points of the ideal pulse response function. On the other hand, if we make the pulse repetition frequency $f_{S2} > 2f_G$, as represented in FIG. 18 ($T_{S2} = 1/f_{S2} < 1/2f_G$, that is to say there is a greater information density), then we find that at the maximum value $\hat{B}$ of the previous pulse response function B, the value of the pulse response function A is no longer zero but has the value $A_{+1}$. Similarly at the pulse maximum $\hat{C}$ of the subsequent pulse response function C the pulse response function A again has not the value zero but rather the value $A_{-1}$. Thus it is clear that in the presence of time intervals $T_{S2} < 1/2T_G$, corresponding to pulse frequencies $f_{S2} > 2f_G$, it is no longer possible to determine in a simple way the individual pulse values, which can for example be represented by the maxima $\hat{A}$, $\hat{B}$, $\hat{C}$, because the individual pulse value is modified by parts of the neighbouring pulse response functions. In the example of FIG. 19 there has been chosen a pulse frequency which is 2.5 times the limiting frequency $f_G$ of the lowpass filter. FIG. 20 shows this frequency behaviour.

Figure 21:
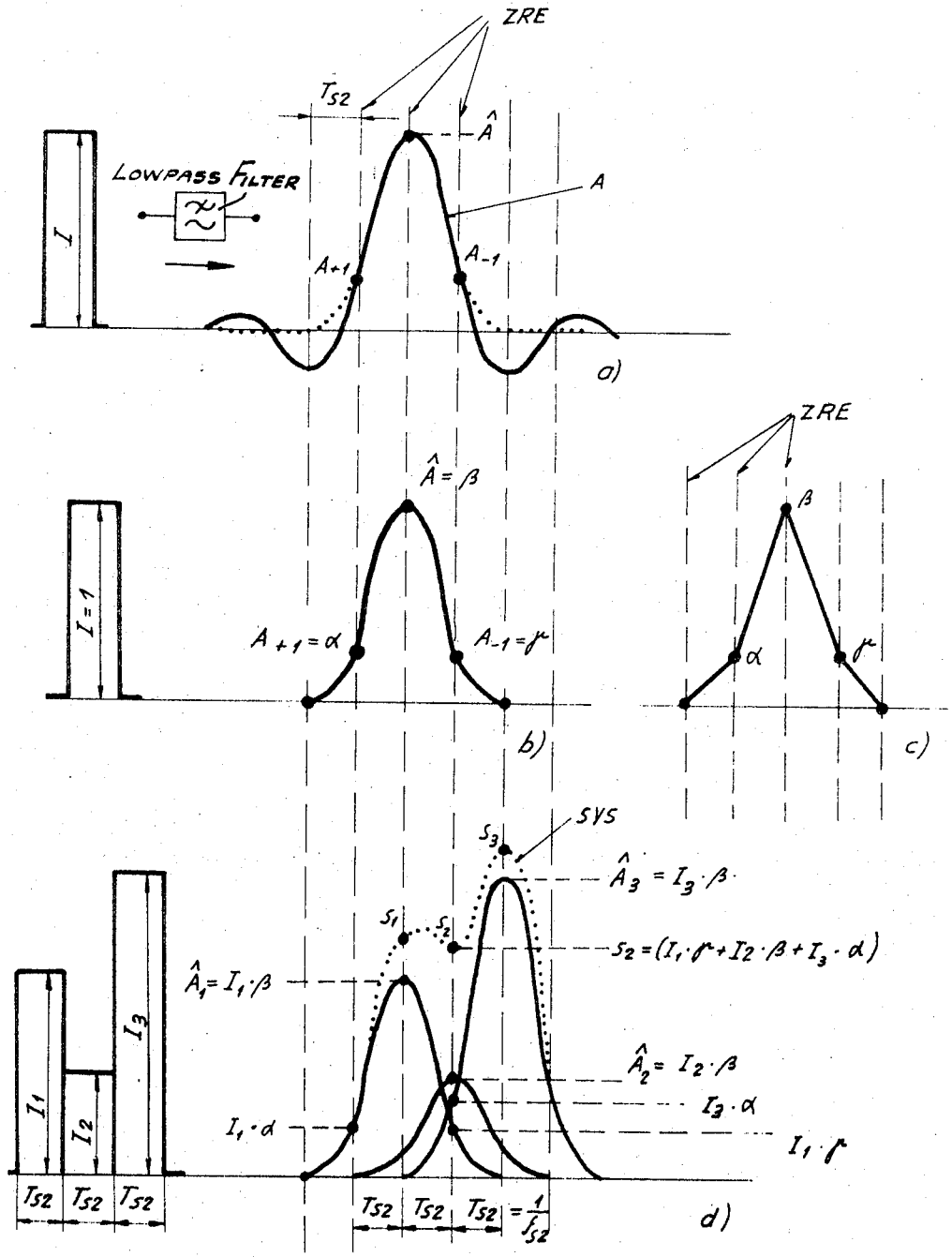
FIG. 21 shows at $b$ and $c$ the development of a simplified representation of the pulse response function shown at $a$, and shows at $d$ the formation of a synthesis signal by superposition of simplified pulse response functions.

FIG. 21 shows in diagram $a$, the same pulse response function A as that shown in FIG. 19. Here again the pulse frequency is more than double the limiting frequency, that is to say $1/T_{s2} = f_{S2} = 2.5 f_G$. This pulse response function A can be represented, as an approximation, by the simplified pulse response function shown in diagram $b$, which retains the maximal value $\hat{A}$, the function value $A_{+1}$ at the maximum B of the preceding pulse response function B and also the function value $A_{-1}$ at the maximum $\hat{C}$ of the subsequent pulse response function C (compare FIG. 19). The other values, which decay rapidly, are neglected. Thus this representation of the pulse response function takes into account only the three values $A_{+1}$, $\hat{A}$ and $A_{-1}$. All three of these values do of course change in proportion to the value of the initial pulse I which gives rise to this pulse response function. Let us assume that the value of the initial pulse is $I = 1$, and let us use for the three characterising values the symbols $A_{+1} = \alpha$, $\hat{A} = \beta$ and $A_{-1} = \gamma$. These three quantities, $\alpha$, $\beta$ and $\gamma$ are thus three coefficients which characterise the particular lowpass and which have to be multiplied by the value of the initial pulse in order to describe the resulting pulse response function. In FIG. 21 the diagram $c$ is an equivalent representation of the simplified pulse response function represented by diagram $b$. In view of the fact that we need take into account only the values intersected by the time grating line ZRE the equivalent diagram of $c$ contains all the values required to represent the simplified function of diagram $b$. In diagram $d$ three such simplified pulse response functions have been represented superposed to give the composite signal SYS. Each one of these three pulse response functions, whose maxima are $I_1\beta$, $I_2\beta$ and $I_3\beta$, results from its own initial pulse $I_1$, $I_2$ or $I_3$ at the input of the lowpass filter. In each case the pulse width is $T_{s2}$, and this is also the distance between consecutive pulse response function maxima. However, the values of the initial pulses $I_1$, $I_2$, $I_3$ cannot be calculated in any simple way from the resulting signal SYS. For example the values $S_2 = (I_1\gamma + I_2\beta + I_3\alpha)$ consists of parts deriving not from a single initial pulse value but from three. Moreover it is evident that the values $S_1$, $S_2$ and $S_3$ are in no way proportional to the pulse values $I_1$, $I_2$ and $I_3$. It is therefore necessary to derive the initial pulse values from the compound function SYS which is made up of several, different, overlapping pulse response functions, by a series of consecutive approximations (iteration). The process is of course applicable not only to three but to any desired number of pulses.

By the iteration process according to the invention the received information signal is simulated by a synthetically constructed signal, whereby this synthesis signal consists of pulse response functions of different values, each pulse response shifted forwards from the previous one by the timing interval $T_s$. If the synthesis signal thus obtained by the combination of these pulse responses (to each of which there is attributed a pulse value proportional to the value of the pulse response) agrees with the received information signal, then the values of the individual consecutive pulse responses, and the corresponding attributed pulse values, are proportional to the pulse values feed in at the input end. The matching of the synthesis signal to the received information signal is accomplished stepwise by iteration. In this process each value is usually matched several times because the influence on the preceding and subsequent neighbouring pulses have to be repeatedly corrected. The chief comparison is always made where the pulse response function exert its greatest influence. The principal requirements for the usefulness of the process are that the iteration must converge, the solutions obtained must be unambiguous and the error in the resulting impulse values must be small. It has been found in practice that all these requirements can be satisfied up to frequencies $f_s \leq 2f_G$.

The process for determining the initial impulse values from the received information signal by means of storage and iteration, utilising the pulse response function of the information channel which is initially determined, will now be described in principle with the help of FIGS. 22 to 74, whereby the pulse response functions will be represented in the simplified form shown by diagram $c$ of FIG. 21.

In FIG. 22 the pulse I fed from the sender end of the information channel produces at the receiver end the (simplified) pulse response function shown in FIG. 23 (see also diagram $c$ of FIG. 21). In FIG. 23 the value $\hat{A}$ of the pulse response function is proportional to the amplitude of the pulse I (FIG. 22). In the following figures the scale is so chosen that the height of the value $\hat{A}$ is equal to the amplitude of the pulse I. The ordinate values of $A_{+1}$ and $A_{-1}$ are each a quarter of the corresponding value of $\hat{A}$.

FIG. 24 shows three pulses $I_{01}$, $I_{02}$ and $I_{03}$ of different amplitudes. The corresponding pulse response functions $A_{01}$, $A_{02}$ and $A_{03}$, whose maximal values $\hat{A}_{01}$, $\hat{A}_{02}$ and $\hat{A}_{03}$ correspond to the impulse values $I_{01}$, $I_{02}$, $I_{03}$, are represented in FIG. 25. Furthermore FIG. 26 shows the sum of all the pulse response functions shown in FIG. 25 of the received information signal ENS as delivered to the receiver end of the information channel. In each figure the abscissa represents the succession of pulses, expressed as "impulse numbers" IN. For each pulse $I_{01}$, $I_{02}$, $I_{03}$ and for each pulse response function $A_{01}$, $A_{02}$, $A_{03}$ and for each pulse response maximum there is a pulse number 1, 2, 3. The equidistant time grating lines ZRS and ZRE pass through the pulse number IN = 0, 1, 2, 3, 4 on the abscissa. The amplitude (0 to 6) is represented on the ordinate $a$. The spacing of the pulse members on the abscissa agrees with the timing periods $T_S = 1/f_s$. From FIGS. 25 and 26 it will be seen that at the positions IN=1, 2, 3 the amplitude value of the received informations signal depends not merely on the value of a single pulse response function but also on the value of at least one further pulse response function, particularly on the values of the neighbouring functions.

The problem is to derive from the received information signal ENS (FIG. 26), which for clarity has been reproduced once more in FIG. 27, the pulse values $I_{01}$, $I_{02}$ and $I_{03}$ of the input signal, by means of an iterative synthesis in which the synthesis signal is composed of successive pulse response functions. To each pulse response function there is attributed an initial pulse value, and the value of the pulse response function is proportional to its attributed initial pulse value. At the beginning of the operation the value of the synthesis signal is zero, the value of each pulse response function is zero and each attributed pulse value is also zero. At the end of the operation the synthesis signal must agree as exactly as possible with the values of the received information signal, and the pulse value attributed to each pulse response function must agree as exactly as possible with the corresponding pulse value fed into the system at the sender end (FIG. 24).

The process of comparison and iteration will now be described on the basis of FIGS. 27 to 53, which represent one variant. In this variant the operations will be performed in sequence at the several pulse number positions running from right to left in the diagram, that is to say the first operation is performed at the position IN=4, the next operation at the position IN=3 and so on.

At each particular IN position the difference between the existing synthesis signal SYS and the received information signal ENS is represented in the diagrams by the symbol Δ. Beginning now with FIG. 27 and starting at the position IN=4, the difference $\Delta_4$ is determined (the synthesis signal SYS is at this point in the operation of course zero).

FIG. 28 shows how this first contribution is introduced into the synthesis signal in the form of the pulse response function $A_4$ by supposing, for the present, that the maximum $\bar{A}_4$ of the pulse response function $A_4$ is equal to the difference $\Delta_4$, that is to say by supposing for the present that the difference between the received information signal and the synthesis signal is determined exclusively by the maximal value $\bar{A}$ and is not influenced by the values $A_{+1}$ and $A_{-1}$ of the neighbouring pulse response functions. The next step is to determine the pulse value $I_4$ which is attributed to the pulse response function $A_4$, whereby according to the convention established above $I_4 = \bar{A}_4 = \Delta_4$. This pulse value $I_4$ has been entered in the diagram FIG. 29. In the diagrams, FIGS. 27, 28 and 29, the arrow PZ has been entered to clarify the operations. The pulse value $I_4$ has thus been determined. The next operation is done at the position IN=3. At the beginning of this second operation the synthesis signal SYS consists of the pulse response function $A_4$, as shown in FIG. 30. At the position IN=3 there is now determined the difference $\Delta_3$ between the ENS and the SYS and there is introduced into the SYS a second pulse response function $A_3$, as shown in FIG. 31, whose maximum $\bar{A}_3$ is taken as having the value $\Delta_3$. The pulse value $I_3$ attributed to this pulse response function is calculated as $I_3 = \bar{A}_3 = \Delta_3$. This second pulse value has been entered in FIG. 32 as indicated by the arrow PZ. We thus now have in FIG. 32 the two pulse values $I_4$ and $I_3$ as preliminary values which must however in no way be regarded as the final and correct values. The synthesis signal, as developed up to the present, is obtained by superposition of the two pulse response functions $A_4$ and $A_3$ as shown in FIG. 33. The next operation is performed at the position IN=2. The difference $\Delta_2$ is determined and from this is derived, as before, the further pulse value $I_2$ attributed to the pulse response function $A_2$, as shown in FIGS. 34 and 35. We now have in FIG. 35 three preliminary pulse values $I_4$, $I_3$ and $I_2$ and by superposition of the corresponding pulse response functions $A_4$, $A_3$ and $A_2$ we obtain the further developed synthesis signal SYS as shown in FIG. 36. The next operation takes place at the position IN=1, where the difference $\Delta_1$ is determined and the pulse value $I_1$ derived, as before, and entered as shown in FIG. 38, whereby FIG. 37 represents the corresponding pulse response functions $A_4$, $A_3$, $A_2$ and $A_1$.

The first iteration has thus been completed. If FIG. 38 is compared with FIG. 24 it will be seen that the derived pulse values $I_1$, $I_2$, $I_3$ and $I_4$ do not yet agree with the pulse values $I_{01}$, $I_{02}$ and $I_{03}$ transmitted. Neither does the synthesis signal SYS so far developed, as represented in FIG. 39, agree with the received information signal ENS. It is therefore necessary to perform a second iteration.

The second iteration is once more begun at the position IN=4, as shown in FIG. 39. The difference $\Delta'_4$ is determined and is regarded as equal to the maximum $\bar{A}_{4'}$ of the pulse response function $A_4'$, as shown in FIG. 40. To this pulse response function there is now attributed the pulse value $I_4'$ on the basis of the equation $I_4' = \bar{A}_4' = \Delta_4'$, as entered in FIG. 41 and indicated by the arrow PZ. It will be observed that in this operation the partly developed synthesis signal SYS as represented in FIG. 39 is for the first time greater at this place than the received information signal ENS, and consequently both the pulse response function $A_4'$ and its attributed pulse value $I_4'$ are entered in the FIGURES 40 and 41 as negative values.

Figures 45, 46, 47, 48, 49, 50:
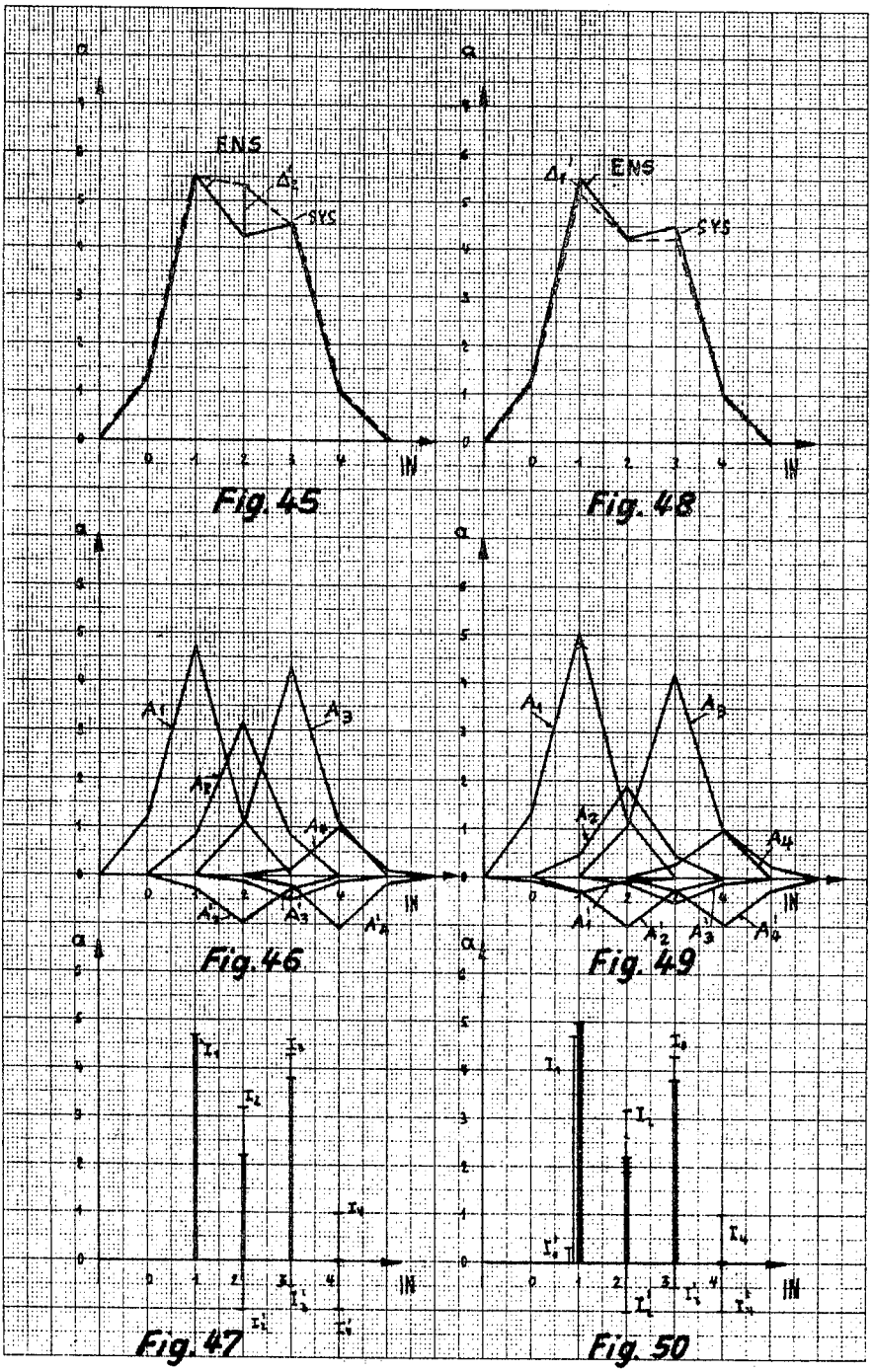

In the diagrams the pulse value derived in each individual iteration, that is to say the pulse value—and its pulse response function—which determine the subsequent synthesis signal, has been entered as a heavy line. For example, at the instant of time represented by FIG. 41, at the position IN=4, the pulse value resulting from the values $I_4$ and $I_4'$ has the value zero. The operations are now continued on the same principle at the position IN=3 (FIGS. 42, 43 and 44), and then at the position IN=2 (FIGS. 45, 46 and 47), and at the position IN=1 (FIGS. 48, 49 and 50).

At the end of this second iterative operation the synthesis signal SYS is as shown in FIG. 51 and it will be seen that there is now good agreement between the synthesis signal SYS and the received information signal ENS. Moreover from FIGS. 52 and 53 it will be seen that both the determined pulse response functions $\bar{A}_1$, $\bar{A}_2$ and $\bar{A}_3$ and the derived pulse values $I_1$, $I_2$ and $I_3$ agree very well with the corresponding values $A_{01}$, $A_{02}$, $A_{03}$ and $I_{01}$, $I_{02}$, $I_{03}$ of FIGS. 25 and 24, to within quite small errors. For the case where all the pulse values have only discrete, quantitised amplitudes, it would be sufficient to terminate the iteration at this point because the remaining errors are each less than one half of a unit of amplitude, or amplitude step, and thus the new values $\bar{I}_1$, $\bar{I}_2$, $\bar{I}_3$ can be regarded as exactly equal to the transmitted pulse values $I_{01}$, $I_{02}$, $I_{03}$.

It is a special characteristic of the method described above that the synthesis signal is compared to the received information signal by a series of comparisons in an iteration performed in the sequence of the pulse positions IN, that is to say the operations are performed on the pulses one after the other in the sequence of their IN numbers. After taking the difference at IN=4, the next step is to take the difference at IN=3 and so forth. After completing the first iteration one returns to the position IN=4 and begins again.

In a further variant the comparisons between synthesis signal and received information signal, and the iteration, are performed in a sequence such that the greatest difference between the aforementioned two singles is each time taken first. This second fundamental version will now be described on the basis of FIGS. 54 to 74, in which the relationships between the individual diagrams are each time indicated by the arrow PZ.

As a starting point we will once again take the pulse values $I_{01}$, $I_{03}$, $I_{04}$ (FIG. 24) supplied to the sender end of the transmission channel. The corresponding pulse response functions are $A_{01}$, $A_{02}$ and $A_{03}$ (FIG. 25) are superposed in FIG. 26 to give the received information signal ENS at the receiver end of the transmission channel. This received information signal ENS is reproduced in FIG. 54.

Considering to begin with FIG. 54, the greatest difference $\Delta_1$ between the ENS and the SYS, which is initially everywhere zero, is at the position IN=1. In FIG. 55 the first contribution to the synthesis signal is introduced as the pulse response function $A_1$, whereby it is supposed for the present that the maximum $\hat{A}_1$ of the pulse response function $A_1$ is exactly equal to the difference $\Delta_1$. There is then determined the pulse value $I_1$ which is attributed to this first pulse response function $A_1$, on the basis of the assumption that $I_1 = \hat{A}_1 = \Delta_1$. This pulse value has been entered in FIG. 56, as indicated by the arrow PZ.

In FIG. 57 the synthesis signal SYS consists of the pulse response function $A_1$ thus determined. From FIG. 57 it will be seen that the greatest difference between the synthesis signal and the received information signal is now at the position IN=3. This difference $\Delta_3$ is equated to the maximum $\hat{A}_3$ of a pulse response function $A_3$, which has been entered in FIG. 58. To this pulse function $A_3$ there is then attributed a pulse value $I_3$, calculated as $I_3 = \hat{A}_3 = \Delta_3$, which is entered in FIG. 59 as indicated by the arrow PZ.

FIG. 60 shows the synthesis signal SYS as thus developed up to now, as the superposition of the pulse response functions $A_1$ and $A_3$. The next step is to determine the largest remaining difference $\Delta_2$ from which the values $A_2$ and $I_2$ are determined, as before, and entered in FIGS. 61 and 62. The resulting superposition is shown in FIG. 63. The same procedure is then repeated as shown in FIGS. 63 to 71. In FIGS. 65, 68, 71 the resulting pulse values, which determine the subsequent synthesis signal SYS, are shown as thick lines. In each case the new synthesis signal is, as described before, the sum of the preceding pulse response functions.

Figures 72, 73, 74:
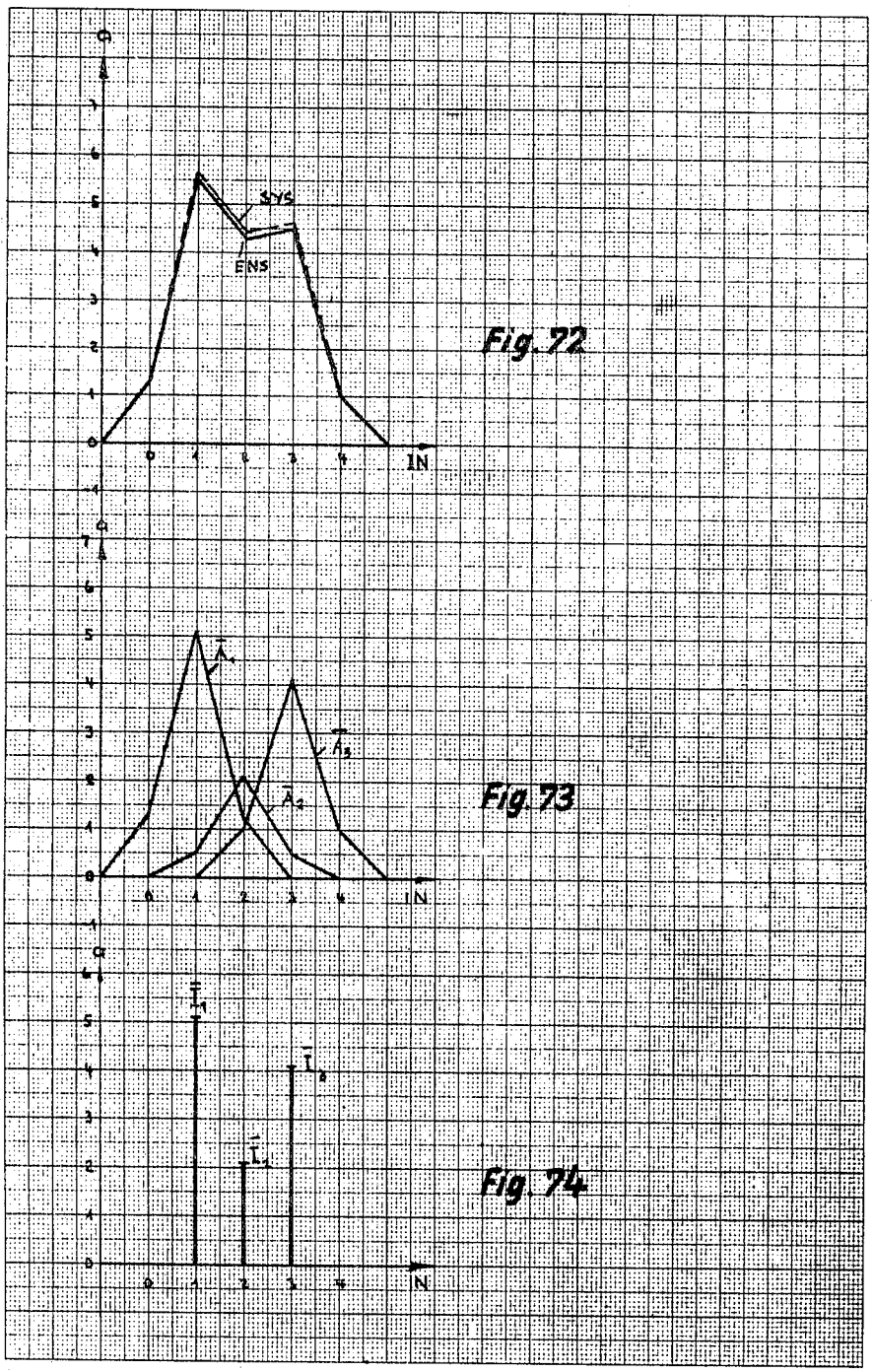

From FIG. 72 it will now be seen that the final synthesis signal SYS is substantially the same as the received information signal ENS, to within a small error. Similarly, in FIGS. 73 and 74 the pulse response functions $\bar{A}_1$, $\bar{A}_2$, $\bar{A}_3$ and their attributed pulse values $\bar{I}_1$, $\bar{I}_2$, $\bar{I}_3$ are in value almost the same as the quantities $A_{01}$, $A_{02}$, $A_{03}$ and $I_{01}$, $I_{02}$, $I_{03}$ of FIGS. 25 and 24.

Thus from the received information signal we have determined the original sequence of pulses as fed into the system at the sender end, by two different methods in the first of which the comparisons and iterations were performed in the sequence of the numbered pulses, that is to say taking one pulse after the other and going from one pulse to the next one all the way, whereas by the second method the comparison and the iteration are performed by taking each time the greatest remaining difference in the stored range. This second method usually requires fewer iteration steps, but has the disadvantage that it requires more expensive apparatus.

It is of course obvious that the number of iterations required, that is to say iteration cycles, depends on the shape of the impulse response function curve, as also does the convergence of the iteration and the unambiguity of the solutions obtained. The determinative criterion here is the ratio of the maximal value $\hat{A}$ to the side values $A_{+1}$ and $A_{-1}$. In the case of the simplified shape represented in FIG. 23 convergence and unambiguity were established for the case where $A_{+1} = A_{-1} \leq 0.4 \hat{A}$.

Before considering a receiver for performing iterative operations, a brief description will first be given of the process whereby the amplitude values are converted into amplitude differences. The process described below can be applied wherever it is desired to express the information in the form of amplitude differences (for example in the case of bandpass channels without band transpositions). First of all, there will now be described the process itself, with reference to FIGS. 75 and 76.

Figure 75:
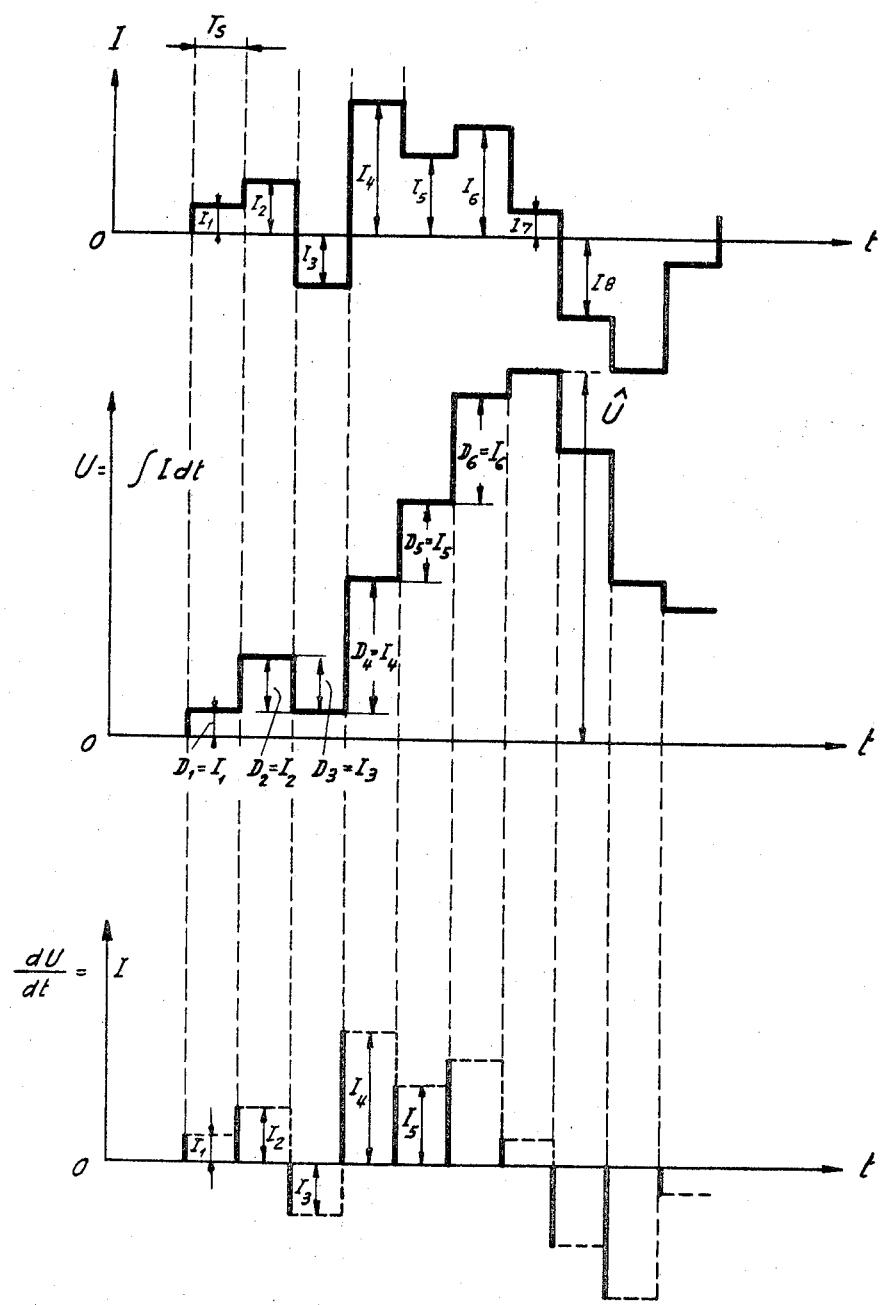
FIG. 75 is a diagram for clarifying the conversion of amplitude values into amplitude differences, by integration at the sender end and differentiation at the receiver end.

One possible method for converting information supplied in the form of pulse amplitudes into amplitude differences consists in that the pulse value functions are first integrated, then transmitted and finally differentiated at the receiver end. This method is illustrated in FIG. 75. At the top of the figure there is shown the information contained in the function I, in the form of the pulse values $I_1$, $I_2$, $I_3$, $I_4$ and so forth. Over the second line (middle) in FIG. 75 there have been entered the integrals of these functions, that is to say $U = \int I dt$. It will be seen that the amplitude values of the first line (top) in FIG. 75 correspond to amplitude differences D in the middle line. For example $D_1 = I_1$, $D_2 = I_2$, $D_3 = I_3$ and so forth. This function is transmitted over the information channel, whereby it is evident that the information content is contained in the amplitude differences, and therefore it is of no importance whatever whether the D.C. current value is at the same time also transmitted or not, even during the transmission through the bandpass filter. At the receiver end this function of the initial signal is recovered by differentiation, as shown along the lowest line of FIG. 75. While it is of course true that direct differentiation gives for each jump only a very narrow pulse for each jump, whereby the pulse has the amplitude equivalent to the value of the jump, but this narrow pulse is then extended to the width $T_S$ of the timing period by means of a simple circuit, giving once more the intial signal as represented in the top line in FIG. 75. However this method of transmission, with integration at the sender end and differentiation at the receiver end, has a disadvantage that the integration at the receiver end can produce very high amplitudes, for example the amplitude $\hat{U}$ in the middle line in FIG. 75, which occurs when the individual impulse values are randomly or pseudo-randomly distributed, as occurs with digital coding. Under these circumstances the integration can produce very high transient values in the integral function.

Figure 76:
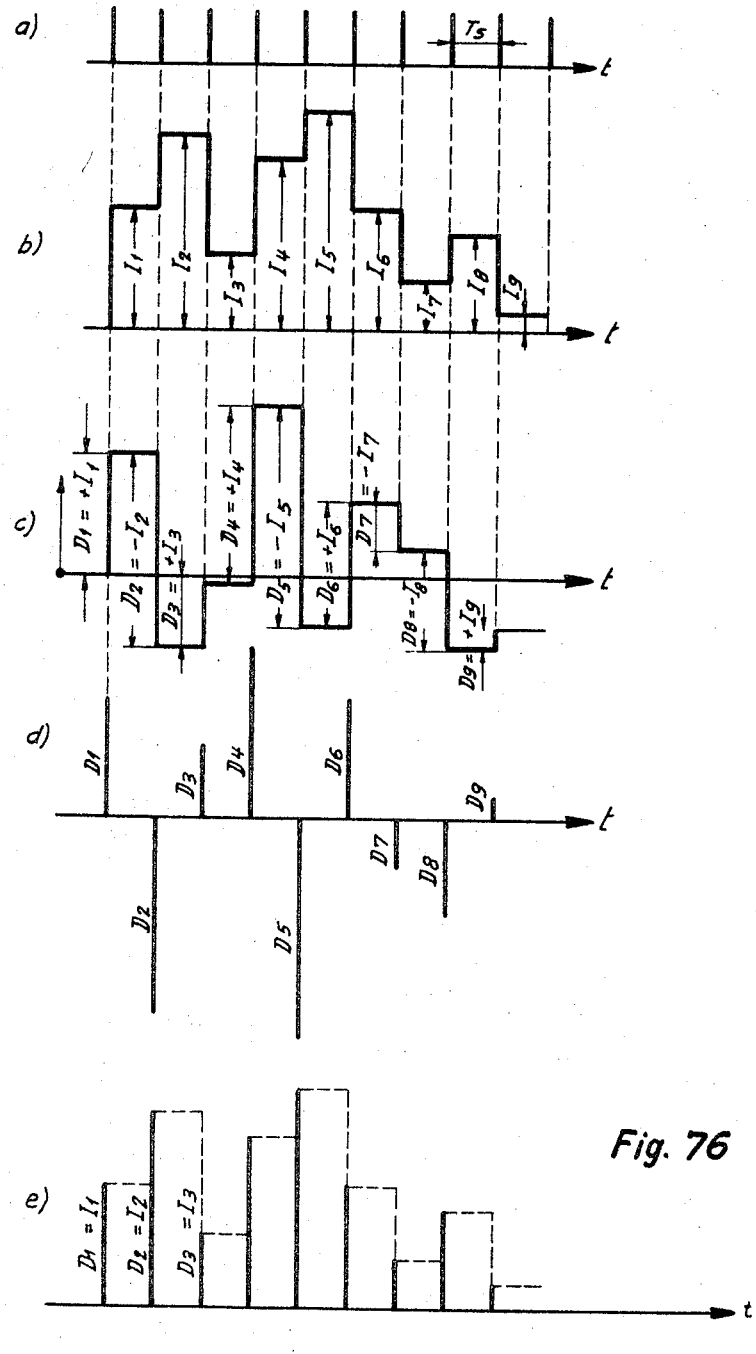
FIG. 76 shows diagrammatically, from $a$ to $e$, the conversion of amplitude values into amplitude differences, whereby adjustment is made at the sender end to produce the smallest amplitude range.

In order to eliminate this difficulty it is proposed, as shown in FIG. 76, to convert the information contained in the initial impulse values $I_1$, $I_2$, $I_3$ . . . (line b) into amplitude differences, whereby these differences are made positive or negative as desired. With advantage the difference is made positive whenever the signal falls below a certain threshold value, and is made negative when it exceeds a certain threshold value. The sign of the difference gives for the present no information. The information is contained in the absolute value of the difference. In the example shown here the difference is made positive whenever the signal in the form of amplitude differences (line c) is negative, whereas the difference is made positive whenever the signals is positive (above zero). In FIG. 76 the line a is the time grating with the timing period $T_S$, whereby one pulse value is transmitted during each timing period. Line b shows the individual pulse values $I_1$, $I_2$, $I_3$ . . . containing the information. Line c represents a function in which the information in differences, whereby the sign given to the difference is according to the rule described above. The first difference is made positive, the second negative, the third positive and the fourth positive, the fifth again negative ($D_1 = +I_1$, $D_2 = -I_2$, $D_3 = +I_3$, $D_4 = +I_4$, $D_5 = -I_5$ and so forth), whereby as mentioned above the sign is automatically so chosen that the value of the function never departs very far from the zero line. At the receiver end of the transmission channel differentiation is used to obtain the values $D_1$, $D_2$, $D_3$, $D_4$ . . . shown in line d, which for the present still have positive and negative signs. These pulses are then subjected to two-way rectification, with the result that there is obtained at the receiver end the signal shown in line e (after a pulse width modification to extend the resulting difference values to cover the entire timing periods). This is in fact the initial signal, in which again the pulse amplitudes contain the information. The signal which is transmitted over the information channel is that shown in line c, where the information is contained in the amplitude differences. This signal can never give excessive amplitude values. The signs of the differences can be made to follow exactly defined rules, but they do not influence the information.

Figure 92:
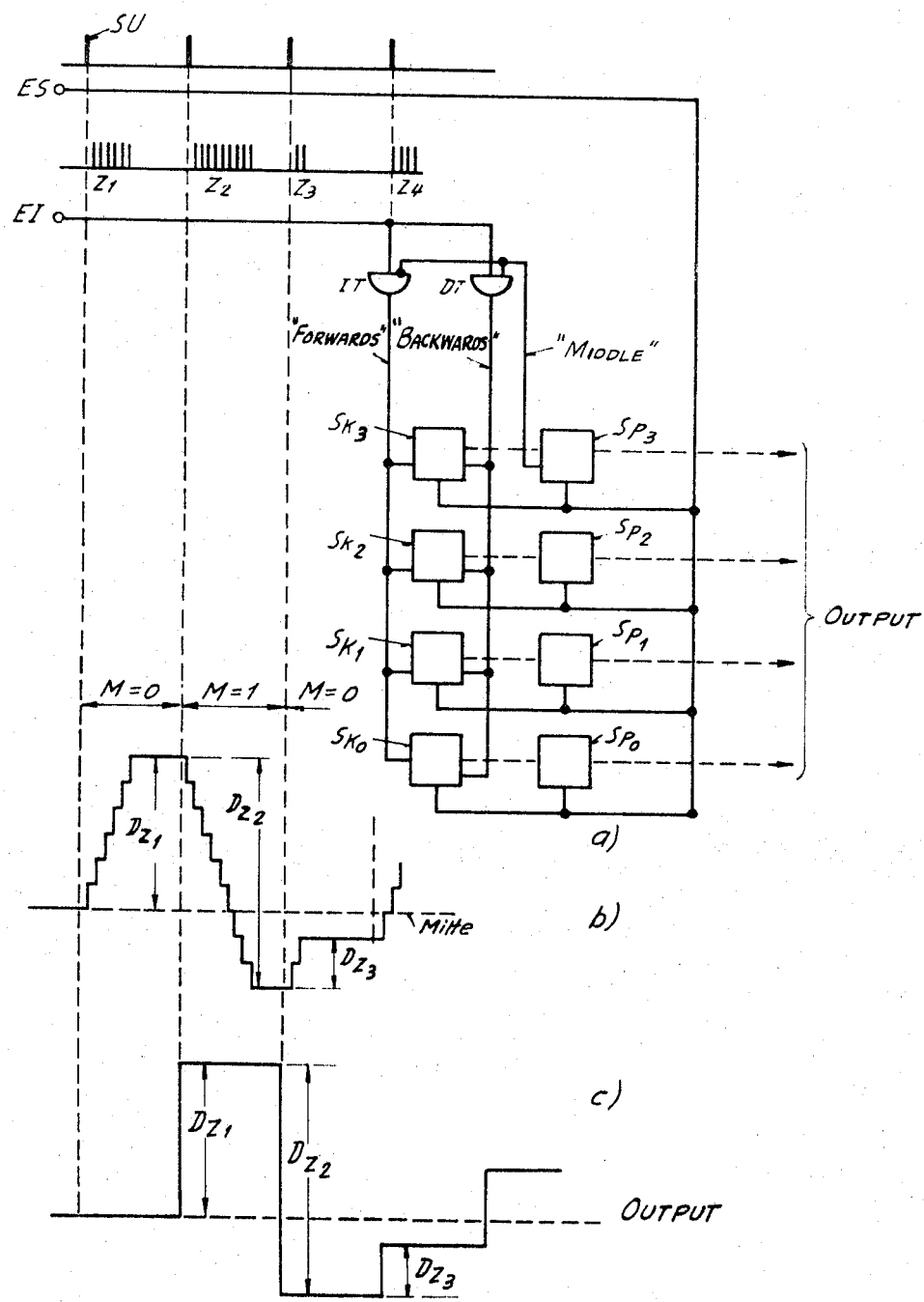
FIG. 92 is a block diagram for a digital converter to convert pulse values to pulse differences.

A circuit for converting the amplitude values into amplitude differences will later on be described in detail with reference to FIG. 92.

The iteration operations for recovering the initial pulse values from the received information signal, as described in FIGS. 22 to 74, are in practice performed entirely automatically. The preferred apparatus required for this will be described in detail in what now follows.

Figure 77:
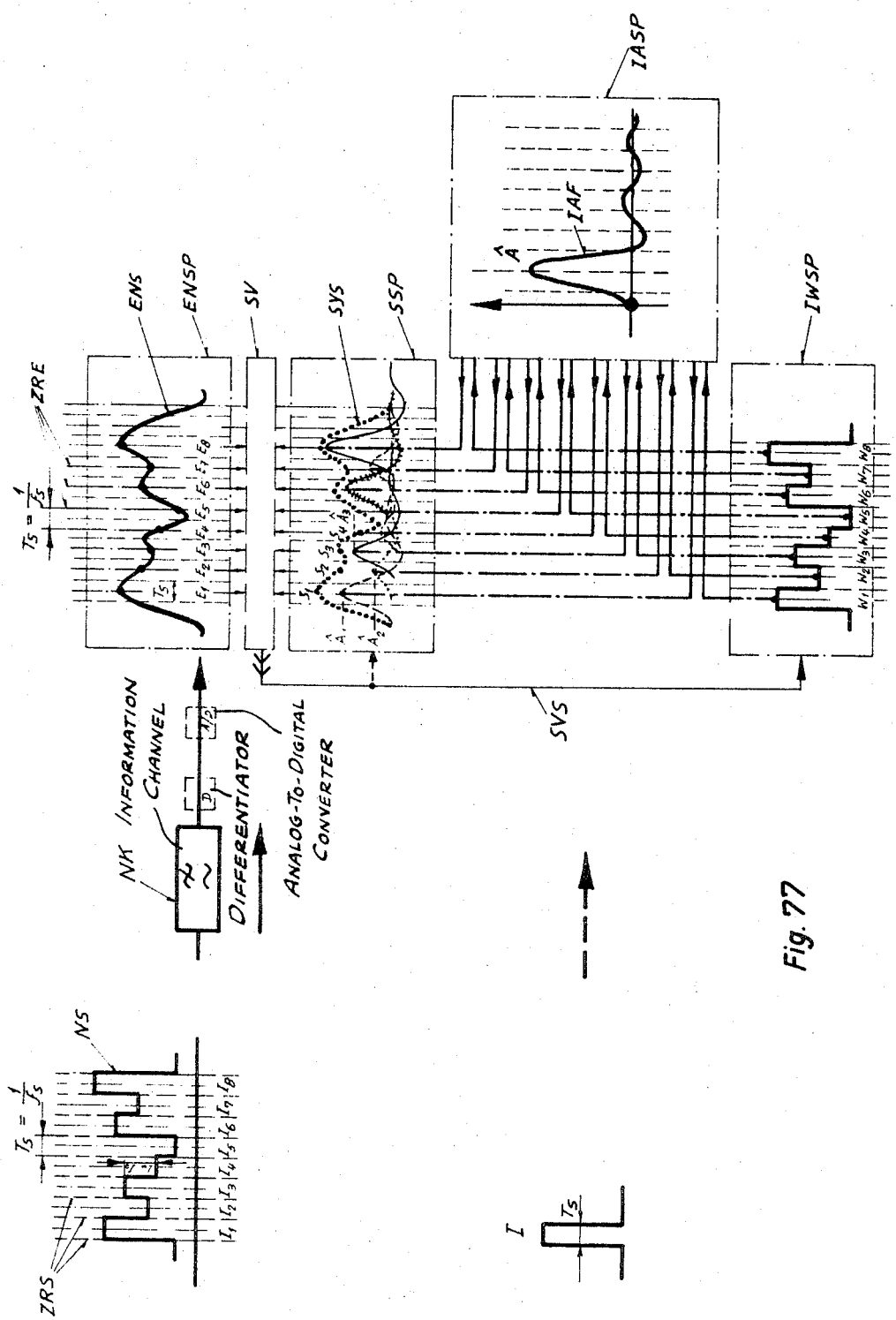
FIG. 77 is a simplified block diagram for an iteration receiver for realising the method according to the invention.

FIG. 77 represents, as a block diagram, a first fundamental version of the apparatus, as an example. At the top left-hand corner of the figure there is represented the information signal NS provided at the sender end of the system and consisting of the individual pulse values $I_1$, $I_2$, $I_3$ ... $I_8$. This information signal NS is transmitted over the information channel NK, which is here represented as a lowpass filter. The received information signal ENS (or its derivative produced by a differentiator D shown as a rectangle in broken lines) passes to a received information signal storage unit ENSP, where a section of it of definite length is briefly stored. If this received information signal storage unit ENSP is a digital device, it is of course necessary to use an analog-to-digital converter A/D of the known kind at the input of the ENSP (framed in broken lines). The received information signal storage unit ENSP stores at least one value for each pulse value transmitted. The individual values of the received information signal ENS are stored at the same timing frequency $f_S = 1/T_S$ as that used in the transmission of the pulse values and in the same sequence. In this storing operation in the received information signal storage unit ENSP a value is stored at the instant of time when the pulse responsive junction, or its differential derivative of the transmitted pulse value reaches its maximum amplitude. In FIG. 77 the stored values are represented by the symbols $E_1$ to $E_8$. The stored value $E_1$ is allocated to the transmitted pulse value $I_1$, while the stored value $E_2$ is allocated to the transmitted pulse value $I_2$ and so forth. The stored value $E_3$, for example, is stored at the instant when the pulse response function resulting exclusively from the initial pulse $I_3$ reaches its greatest value $\tilde{A}_3$. The stored values $E_1$ to $E_8$ are of course not directly measures for the values of the individual transmitted pulses, because at the higher pulse frequencies the pulse response functions overlap each other. The stored values $E_1$ to $E_8$ can therefore not be directly sensed.

The correlation between the stored values of the received information signal ENS and the transmitted pulses is not influenced by the time delay between the transmitted pulse and the maximum in the resulting pulse response. For example, if the pulse $I_1$ is transmitted all by itself, then the maximum of the received information signal ENS (which is in this case the pulse response to the pulse $I_1$) is at the storage position $E_1$. The same is true for all the pulses.

The FIG. 77 furthermore shows a synthesis signal storage unit SSP, which is used to produce by iteration a synthesis signal SYS which is matched as closely as possible to the stored received information signal ENS. For this purpose a pulse of known value and shape, as shown at the left in FIG. 77, is produced and fed to the pulse response storage unit IASP, at the right of the figure, resulting in the known pulse response function IAF, which is fed to the synthesis signal storage unit SSP, which stores it as a first attempted synthesis signal SYS. In order to determine the error in this first synthesis signal SYS, as compared to the received information signal ENS, there is used a signal comparator SV, which compares corresponding points in the two signals with each other, either in sequence or simultaneously. The comparison value supplied by the signal comparator SV influences a comparison controller SVS, which increases or decreases that pulse response function IAF which has its maximum, or nearly its maximum, at the comparison position (comparison grating line), for example $\tilde{A}_1$ or $\tilde{A}_2$. This correction process continues till, at this comparison position, the synthesis signal SYS agrees with the received information signal ENS ($SYS=ENS$ in the stored section of the received information signal ENS). Simulaneously with this matching process, a pulse value for example $W_1$ attributed to this pulse response function IAF, is proportionally modified in a pulse value storage unit IWSP. At the end of the receiving process the pulse values $W_1$, $W_2$, $W_3$ ... $W_8$ thus established must agree as closely as possible with the transmitted pulse values $I_1$, $I_2$, $I_3$ .... The method of functioning of the apparatus corresponds exactly in all details with the process which has been described above on the basis of FIGS. 22 to 53 and 54 to 74.

Some further explanations are required in regard to the processes of storing the pulse response functions IAF and forming the synthesis signal SYS.

Figure 78:
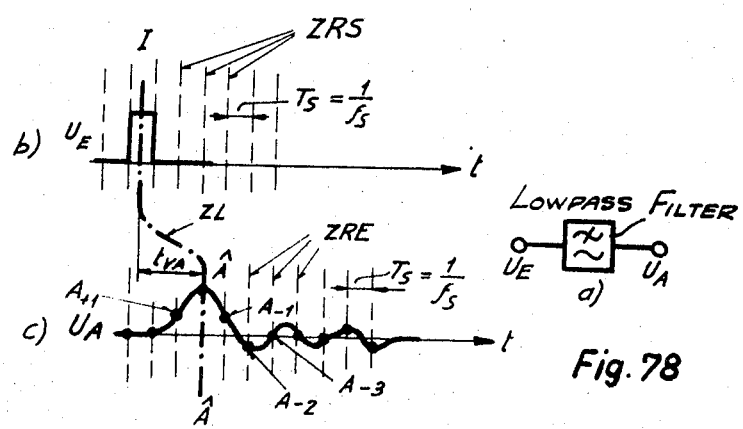
FIGS. 78 to 82 are diagrams for clarifying the method of functioning of the receiver of FIG. 77.

FIG. 78a is a block diagram representing a lowpass filter with input $U_E$ and output $U_A$. FIG. 78b represents a single pulse I of the length of the timing period $T_S=1/f_S$. FIG. 78c represents its pulse response function $U_A$ delayed by the time interval $t_{VA}$ and containing distortions. Before the operational transmission of information takes place, there is stored one value of this response function for each timing period $T_S$. These values stored in the pulse response storage unit ($A_{+1}$, $\tilde{A}$, $A_{-1}$, $A_{-2}$, $A_{-3}$ ...) are each on a line of the receiver time grating ZRE whose grating intervals are the same as those of the sender time grating ZRS, that is to say the spacing is in the timing period $T_S=1/f_S$, whereby one grating line intersects the maximum value $\tilde{A}$, or at least intersects the pulse response function near this maximum value. The receiver time grating ZRE is time shifted with respect to the sender time grating by the delay period $t_{VA}$. This delay period $t_{VA}$ is expressed by the curved correlation line ZL between FIGS. 78b and 78c. This correlation line ZL expresses the fact that the transmitted pulse I is attributed to the pulse response function, and in particular to its maximum $\tilde{A}$. It is obvious that the subsidiary values of the pulse response function, for example $A_{+1}$, $A_{-1}$, $A_{-2}$, $A_{-3}$ and so forth, at the other positions in the time grating ZRE have values which depend on the value of the initial pulse I. However, the chief correlation is that between the transmitted pulse I and the maximum of the pulse response function resulting at the receiver end. The matter of the recording and storing of the pulse response function, and the question of establishing the time grating ZRE at the receiver end will be described in detail further below. Considering for the present the values $A_{+1}$, $\tilde{A}$, $A_{-1}$, $A_{-2}$, $A_{-3}$ ... positioned in the receiver time grating ZRE, these values of the pulse response function are stored in the pulse response function storage unit IASP (FIG. 77), whereby in each case the amplitude is determined by a transmitted pulse I whose value is known. During operational transmission the received information signal is also stored in the receiver time grating, that is to say at the timing intervals $T_S$. A requirement is therefore that the receiver time grating ZRE must remain in synchronisation with the sender time grating ZRS all through the operational transmission, whereby the delay between a transmitted pulse and a stored value of the received information signal must be exactly the same as the delay between a single transmitted pulse and its maximum in the pulse response function (correlation line ZL). During the recording of the single pulse response function the time grating ZRE therefore also serves to establish the values to be stored in the pulse response storage unit IASP. In operation the time grating ZRE serves to establish the storage positions for the received information signal, whereby each storage position is correlated to a transmitted pulse. In order to synchronise the receiver time grating with the sender time grating there are required special synchronising devices which must ensure a constant phase relationship between ZRS and ZRE, and this must be the same as that used in recording the single pulse response function. This synchronisation can for example be obtained by means of a single large information pulse, which acts as a synchronisation pulse, or the synchronisation can be obtained by any of the other well-known methods.

Figure 79:
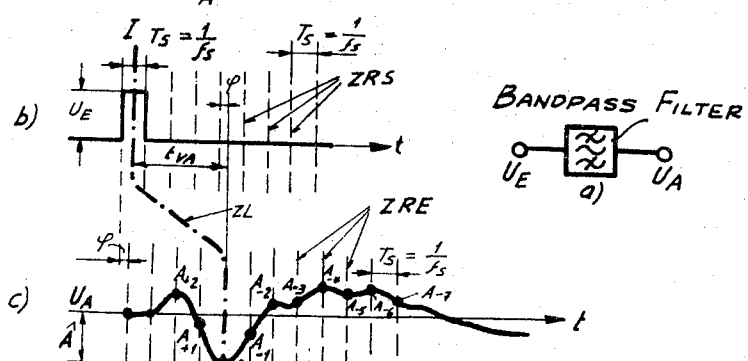

FIG. 79 shows the correlation by correlation line ZL between a pulse response having a maximum Â and its initial pulse I, and also shows the sender time grating ZRS and the receiver time grating ZRE for a bandpass filter as the information channel.

Figure 80:
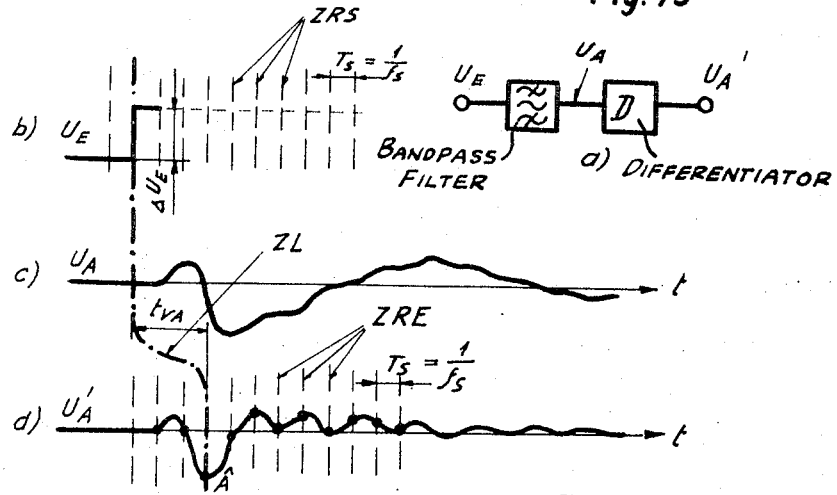

FIG. 80 shows diagrammatically an information channel in the form of a bandpass filter with subsequent differentiator $D(a)$. A jump pulse $\Delta U_E(b)$ is fed to the input $U_E$, producing at the output $U_A$ of the bandpass a function $(c)$ and at the output of the differentiator a pulse response function with a pronounced maximum $\hat{A}(d)$. In this case the correlation is between the jump pulse $\Delta U_E$ at the sender end and the maximum Â of the differential derivative $U_A'$ at the sender end, as indicated by the curved correlation line ZL. The stored values of the differentially derived pulse response function $U_A'$ are here again situated on the lines of the time grating ZRE, whereby one of these lines goes through the maximum Â. The sequence of the sender jump pulses is in the time grating ZRS, and the information is contained in the jump height $\Delta U_E$.

Figure 81:
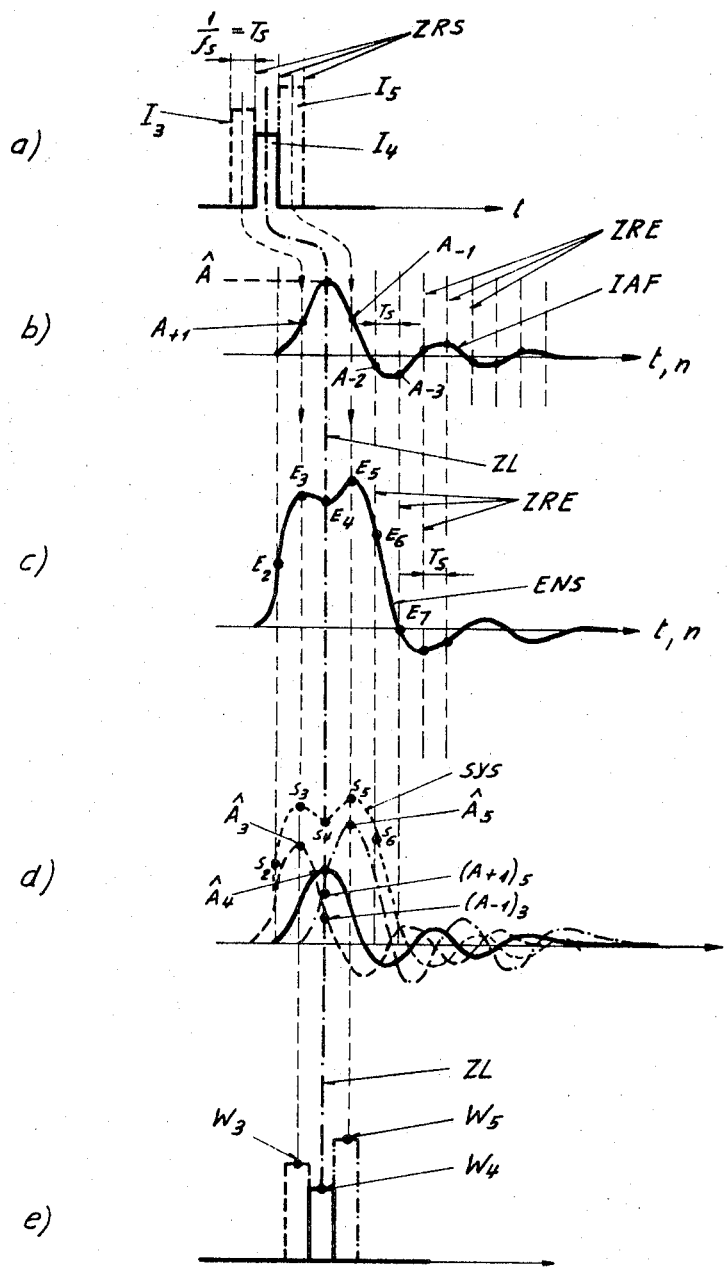

FIG. 81 illustrates, on the basis of a simple example, the method of functioning of the information transmission system of FIG. 77. In diagram $a$, the three pulses $I_3$, $I_4$ and $I_5$ are transmitted in the sender time grating ZRS (timing frequency $f_s = 1/T_s$). Diagram $b$ represents a pulse response function IAF expressing exclusively the pulse response to the sender pulse $I_4$. Thus pulse response function IAF is stored by its values $\hat{A}$, $A_{+1}$, $A_{-2}$, $A_{-3}$ and so forth (in the receiver time grating ZRE) in the pulse response storage unit IASP. Diagram $c$ represents the received information signal ENS which reaches the receiver end of the information channel as a result of the three pulses $I_3$, $I_4$ and $I_5$ transmitted in succession by the sender. The received information signal storage unit ENSP (FIG. 77) stores the values $E_2$, $E_3$, $E_4$, $E_5$, $E_6$ and so forth which are situated in the receiver time grating ZRE, whereby each stored value is correlated (by the correlation line ZL) with a transmitted pulse. Diagram $d$ represents the synthesis signal SYS as the summation signal of the three pulse responses whose maxima $\hat{A}_3$, $\hat{A}_4$, $\hat{A}_5$ correspond to the three transmitted pulse $I_3$, $I_4$ and $I_5$. If the matching is good for all three of these individual pulse response functions their summation signal, which is the synthesis signal SYS, will agree with the received information signal ENS. The individual values of the synthesis signal, for example $S_2$, $S_3$, $S_4$, $S_5$ and so forth are stored in the synthesis signal storage unit SSP. Diagram $e$ represents the three pulse values $W_3$, $W_4$ and $W_5$, of which the pulse value $W_3$ is attributed to the pulse response function whose maximum is $\hat{A}_3$, moreover $W_3$ is proportional to $\hat{A}_3$. A similar correlation and proportionality applies to the pulse value $W_4$ and the pulse response function whose maximum is $\hat{A}_4$, and also to the pulse value $W_5$ and the pulse response function whose maximum is $\hat{A}_5$. The pulse values $W_3$, $W_4$ and $W_5$ are stored in the pulse value storage unit IWSP (FIG. 77) and should agree as closely as possible with the transmitted amplitude values $I_1$, $I_2$ and $I_3$. For example the value $E_4$ in the received information signal is compared in the signal comparator SV with the value $S_4$ of the synthesis signal. On the basis of the comparison value thus obtained an increase or decrease is then applied to that pulse response function IAF which has its pulse maximum (in this example $\hat{A}_4$) in the correlation line running through both $E_4$ and $S_4$, whereby at the same time the pulse value (in this example $W_4$) attributed to this pulse response function IAF is also increased or decreased in proportion to the pulse response function, until the value $S_4$ agrees precisely enough with the value $E_4$. The received information signal ENS, the synthesis signal SYS and the pulse value sequence are then all shifted along by one time grating interval and the value $E_3$ compared with the value $S_3$ these two values are made to agree with each other precisely enough by suitably changing the value of the pulse response function IAF whose maximum is $\hat{A}_3$, and simultaneously applying a corresponding change to the attributed pulse value $W_3$.

The comparisons between the individual stored points of the received information signal ENS and the corresponding points in the synthesis signal SYS are normally made point by point and in sequence, whereby the corresponding pulse response function IAF, which has a maximum on the correlation line, and the corresponding attributed pulse value are subjected to changes until the requisite agreement is reached, at the position in question, between the received information signal ENS and the synthesis signal SYS.

In the version just described the most recently received and stored information signal value is first compared and its pulse response function and pulse value obtained by matching. As a second step in the operation the signal value obtained one timing period $T_S$ earlier is similarly processed, and then the signal value obtained one timing period $T_S$ still earlier and so forth, till the comparisons and matching processes have been performed all the way through the entire stored range. Thus the comparisons are made in the sequence of the pulses one after the other (compare FIGS. 22 to 53).

The entire matching process between a stored information pulse value and the synthesis signal takes place during the period of transmission of a single pulse value, that is to say during the interval of the timing period $T_S$ (for example 0.15 ms.). Subsequently a newly received information signal value is stored and compared with the synthesis signal at this position and the matching process repeated, after which all the previously stored values are matched up again one after the other so that in this way the value which is stored for the longest period can be subjected to as many iterations as there are positions available in the storage unit, for example in the received information storage unit ENSP. This kind of iteration has the advantage that it can be realised using a modest amount of apparatus.

A further possible method consists in that, as already discussed in connection with FIGS. 54 to 74, there is first determined within the stored range the greatest existing difference between the received information signal ENS and the synthesis signal SYS. The matching is then done at this position of greatest difference, by changing the pulse response function IAF and also its attributed pulse value. This version of the matching procedure requires fewer iterations, but a more extensive apparatus.

Figure 82:
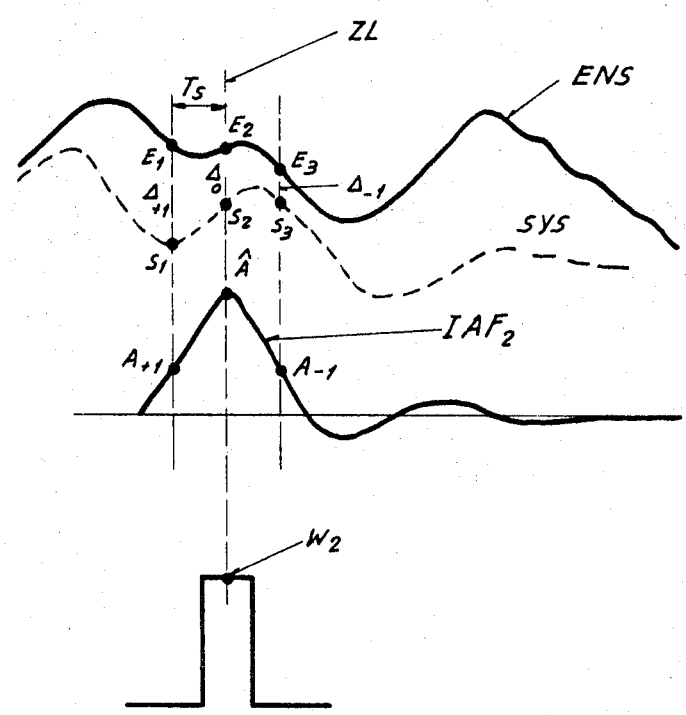

As a still further possibility the received information signal ENS can be compared with the synthesis signal SYS at, for example, three points only, whereby here again the comparison value determined at each of these three points is used to change only a single pulse response function IAF, together with its attributed pulse value. FIG. 82 shows an example of this method. The comparison value depends on the value of the difference $\Delta$ $(SYS-ENS)$ and on the value of the pulse response function IAF $(A_{+1}, \hat{A}, A_{-1})$. For example the comparison value VW can be expressed as follows:

$$VW = f(A_{+1} \Delta_{+1}, \hat{A} \Delta_0, A_{-1} \Delta_{-1})$$
$$= f(IAF_2\Delta)$$

In regard to the storage range available for the pulse response function IAF (that is to say the number of storage positions), this is determined in the first place by how quickly the pulse response function IAF decays. The greater the number of amplitude stages which have to be transferred, the greater must be the storage range available for the pulse response function IAF, and therefore the greater must be the storage range available for the synthesis signal SYS. The storage range available for the pulse response must extend far enough to bring the smallest stored value below the amplitude stage height which it is desired to transfer. When using bandpass filters the method by which the information is contained in the amplitude difference rather than in the pulse amplitude itself has the very important advantage (apart from the advantage that band transposition is not required) that although at the lower limiting frequency (for example 300 c.p.s.) the pulse response function IAF takes very long to decay, it is by no means necessary to extend the storage range to include the whole of this decay process, because using the difference method this lower limiting frequency, which is usually very slow compared to the cadence frequency $f_S$ (for example 6500 c.p.s.) produced in practice only quite small additional amplitudes.

In addition to the synchronisation, which must guarantee that the time grating is in the correct position, it is important to ensure that for a given amplitude in the transmitted signal the received information signal ENS always has exactly the same amplitude, and this must be the amplitude obtained during the reception and storing of the pulse response function IAF (unit function). Before the information signal ENS is fed to the iteration receiver the latter must therefore be adjusted to a fixed amplitude range, because the iteration method can be effected only if this is done. The coded information consists of pulses whose values are within a certain amplitude range, these values are randomly distributed and one can therefore derive a controlling value from the received information signal ENS provided that a sufficiently large time constant is used. This controlling value is then used to adjust the received information signal ENS to a constant and correct value. In the case of an information channel in which the information is contained in the amplitude difference between two neighbouring pulses it is an advantage to use the average value of amplitude differences for determining the control values to use for adjusting the received information signal ENS. Moreover the controlling value can if desired be derived from the differential derivative of the received information signal ENS, obtained by means of a differentiator.

The apparatus for realising the process according to the invention must comprise, as shown in FIG. 77, storage arrangements for storing a section of the received information signal ENS, a section of the synthesis signal SYS, and also a section of the finally derived pulse sequence. Furthermore the method also requires an arrangement for storing a reference pulse response function for use as the basis in the construction of the synthesis signal. The method further requires a signal comparator SV, which compares the received information signal ENS with the synthesis signal SYS, and there are also required clock pulse generators and furthermore devices for adjusting the reception amplitudes. The three storage units, received information signal storage unit ENSP, synthesis signal storage unit SSP and pulse value storage unit, must each be so constructed that the values in the stored range are accessible when required. It is a great advantage to use digital methods, whereby these three storage units are constructed as shift registers. An ordinary shift register can shift the binary information stored in it along the shift register line, that is to say from shift register stage to shift register stage. However, if it is desired to store amplitude values, which are not merely binary values, that is to say zero or 1, but can for example be amplitude steps between 0 and 15, then the storage unit must contain several lines of shift registers, whereby all the same shift register stages of the shift registers together form a column of shift register stages. Each column of shift register stages is capable of storing an amplitude value. For example a storage unit comprising four lines of shift registers contains four shift register stages in each column. With this arrangement a column can store an amplitude value which can be any one of 16 ($=2^4$) different values, and can shift it. Each column of the shift register thus stores an amplitude value in the form of a number consisting of several places of binary digits. One can of course if one desires use more than four lines in the shift register, to give a closer series of amplitude steps, but the cost in apparatus is higher. For example using a 7-line shift register one can store and shift in each column $2^7=128$ different amplitude steps. The binary number containing several digits can for example be constructed according to the ordinary binary code, whereby the binary digit at the lowest place (1 or 0) is multiplied by $2^0$, the digit in the next higher place is multiplied by $2^1$, the digit in the next higher place by $2^2$ and the digit in the next higher place by $2^3$. Obviously one can if one desires use instead of the ordinary binary code any of the other customary codes in order to represent the pulse amplitudes by means of combinations of binary digits.

FIG. 83 represents in simplified form an apparatus which fulfils the above requirements, and this apparatus will now be described with reference to this figure. The main parts of this apparatus are as follows: The input ENS for the received information signal, the differentiator D which is used only in certain versions, the analog-to-digital converter $A/D$, the received information signal storage unit ENSP, the signal comparator SV, the synthesis signal storage unit SSP, the pulse response storage unit IASP, the pulse value storage unit IWSP and the timing pulse generator TGE.

The three multi-line shift registers $ES_n$ . . ., $SS_n$ . . . and $IW_n$ . . . are constructed in such a way that amplitude values repersenting information are stored in their columns and can be shifted not only in the one direction, that is to say for example from left to right, but also in the other direction, from right to left. All three shift registers share in common the two condutcors for effecting the shift, that is to say the conductor SR for shifting to the right and SL for shifting to the left. Thus if a shift pulse is applied to the common right shift conductor SR, all the amplitude values contained in all the columns of all three shift registers are shifted one place towards the right, whereas when a shift pulse is given to the shift conductor SL the values in all the columns are shifted one place towards the left. Furthermore, each of the shift registers of the storage units SSP and IWSP has a counter control for at least some of its columns. The counter control can increase or decrease the amplitude value stored in the column. These columns thus act as column counters capable of counting both forwards and backwards, whereby the value stored in the column is increased or decreased. Each column counter can be activated by an addition counting line AZ and by a subtraction counting line SZ, in such fashion that the amplitude value stored in a column is increased when a counting pulse is applied to the addition counting line AZ, and decreased when a counting pulse is applied to the subtraction counting line SZ. When a shift pulse arrives over the conductor SL or SR the shifting takes place along the lines, shown as horizontal lines in the figure, whereas the counting process runs vertically, that is to say in the column. For these operations the apparatus uses bistable stages, which are represented in the figure as squares in the shift registers.

The pulse response storage unit IASP of the receiver of FIG. 83 is represented as a digital memory. The pulse response function IAF has been received at some previous instant or other when the information channel was put into operation, and the amplitude values have been stored. These are the values $A_{+1}$, $\bar{A}$, $A_{-1}$, $A_{-2}$, $A_{-3}$ and so forth, indicated in the curve IAF. For the reception the pulse frequency time grating (in which the stored points lie) was as before so situated that a time grating line passes through the maximum $\bar{A}$ of the pulse response function IAF. The values $A_{+1}$, $\hat{A}$, $A_{-1}$, $A_{-2}$, $A_{-3}$ are now stored in the pulse response storage unit IASP, which is constructed as a pulse multiplicator device IAE, as represented in the figures. For each point on the pulse response function this pulse multiplicator device has a column. For example, for storing the value $A_{+1}$ there is the column $IA_{+1}$, while for storing the value $\hat{A}$ there is the column $IA_0$ and for storing the value $A_{-1}$ there is the column $IA_{-1}$ and so forth. All the columns consist of binary positions, each of which can have the value 1 or 0. In each column the total sum of all the "1" positions represents the corresponding value of the pulse response function. For example in the figure the of the column $IA_{+1}$ has 3 "1's," and the value $A_{+1}$ here is 3, on the other hand the total sum of the "1's" in the column $IA_0$ is 8 and thus the value of the pulse response function $\hat{A}$ is 8.

The lowest line of each column in the pulse multiplicator device can be activated by a common horizontal conductor $IZ_1$. When a pulse is sent along this activating line $IZ_1$ there results at the output of the column, that is to say $ZA_0$ or $ZA_{+1}$ or $ZA_{+2}$ or $ZA_{-1}$ . . . an output pulse provided that the column in question has a "1" on this line. Similarly all the second stages in the columns, reckoned from the bottom upwards, are connected together by the line activating conductor $IZ_2$ in such fashion that when a pulse is given to this activating conductor all those columns give an output pulse which have a "1" on this line, in our example the columns are $IA_{-2}$, $IA_0$ and $IA_{+1}$. The line activating conductors are themselves activated by a common ring counter RZ, which itself receives an activating pulse over ZI. In the ring counter the counting is done in that when the first activating pulse ZI arrives there results a pulse along the line activating conductor $IZ_1$, the second activating pulse ZI sends a pulse along $IZ_2$, the third activating pulse ZI sends a pulse along $IZ_3$, the fourth sends a pulse along $IZ_4$ and the fifth sends a pulse along $IZ_5$. For example let us suppose that five activating pulses ZI have been fed to the ring counter RZ, whereby one after the other the lines $IZ_1$, $IZ_2$, $IZ_3$, $IZ_4$, $IZ_5$ are activated. As a result of the existing arrangement of "1's" in the several columns, distributed along the activating lines $IZ_1$ to $IZ_5$ as represented in FIG. 83, there now results at the column output ZA of the pulse multiplicator device the following numbers of pulses: at the output $ZA_{+1}$ of the column $IA_{+1}$ there results two pulses, and this value has been entered in FIG. 83 in the pulse response curve $(IAF)_5$ at the position $(A_{+1})_5$. At the output $ZA_0$ of column $IA_0$ there results five pulses and this value has been entered on the pulse response curve $(IAF)_5$ at the point $(\hat{A})_5$. Furthermore, at the output $ZA_{-1}$ there results one pulse which has been entered in the pulse response curve $(IAF)_5$ at the point $(A_{-1})_5$ and so forth. In this fashion we obtain a pulse response function $(IAF)_5$ which is at least approximately proportional to the initial pulse response function IAF. The proportionality depends, as already mentioned, on the coarseness or fineness of the quantitising used. In the example shown here only eight quantitising steps have been used and the proportionality is consequently quite coarse. In practice many more quantitising steps are used, for example 32, 64 or 128.

The zeros and ones in each column of the pulse multiplicator device IAE should be so distributed that the maximum number of pulses ZI (when the ring counter has counted all the way up to the last position $IZ_8$) results in the formation of the stored pulse response function, while each lesser value of ZI results in a pulse response function proportional to this lesser value.

It should further be observed that some of the values, for example $A_{-2}$ and $A_{-4}$, are negative. This fact is allowed for by the sign memory $VZ_{+2}$, $VZ_{+1}$, $VZ_0$ and so forth. The sign memory responds to the sign of the corresponding pulse response function, for example if the pulse response function stored by a particular column is positive, then the sign memory for that column is also positive and vice versa. These sign memories trigger bistable stages $B_{+2}$, $B_{+1}$, $B_0$ and so forth which flop over into one or other of the two stable states according to the sign of the sign memory. Each bistable stage has two outputs, one of which is for "1" whereas the other is for "0." These outputs activate the gates $TB_U$ and $TB_O$, which function as switches to establish the sign, whereby the column values in the synthesis signal storage unit are either increased over the addition counter lines $AZ_{SS}$, or decreased over the subtraction counter lines $SZ_{SS}$, as the case may be, by the values of the pulse response function (expressed as a number of pulses), taking into account on the one hand the signs of the individual values of the pulse response function, and, on the other hand, the positive or negative error values found by the signal comparator. The method of functioning of the apparatus as a whole, as represented in FIG. 83, is as follows:

Let us assume to begin with that the pulse response function IAF has been received and stored on the correct time grating lines in the pulse response storage unit IASP (which is in this case the pulse multiplication device IAE). (The storing of the pulse response function will be described in detail below.) We will assume further that the synchronisation between the receiver time grating ZRE and the sender time grating is functioning correctly. The timing frequency both at the sender and at the receiver end is $f_S = 1/T_S$, where $T_S$ is the timing period. The analog signal (received information signal ENS) is converted to a digital signal in the analog-to-digital converter $A/D$. For each timing period there occurs a conversion and for each cadence period the resulting digital value is stored. This is done in such a way that the analog signal is scanned at the instants determined by the time grating.

The analog-to-digital converter $A/D$ is shown diagrammatically. It is an instrument of the already known kind and consists substantially of a differential comparator DB, the measurement resistance RVA, the evaluation resistances $2^0$, $2^1$, $2^2$, $2^3$, the column counter KZA and a control circuit with the gates $T_{R6}$ and $T_{R7}$.

Within a small fraction of each timing period $T_S$ a comparison is made by the differential comparator DB between the voltage $U_{DBE}$, which is proportional to the received information signal ENS, and a reference voltage $U_{DBA}$. As long as these two voltages are not the same as each other there is a potential either on the line connecting the differential comparator DB with the gate $T_R$, or on the line connecting it to the gate $T_{R7}$, with the result that either $T_{R6}$ or $T_{R7}$ is open and allows passage to the rapid timing pulse AD from the clock pulse generator TGE. If these rapid pulses AD pass through the gate $T_{R6}$ they reach the column counter KZA, which counts backwards (subtraction counter line). On the other hand, if the pulses AD pass over the gate $T_{R7}$ to reach the column counter KZA, the latter counts on the addition counter line.

The voltage $U_{DBA}$ depends on the current flowing through the evaluation resistances $2^0$, $2^1$, $2^2$, $2^3$. Each of these evaluation resistances is connected over a stage of the column counter KZA to a constant source of current (not shown in the drawing). In this way the voltage $U_{DBA}$ can have any one of sixteen voltage amplitudes. The triggering of the column counter KZA by the rapid pulses AD automatically makes the voltage $U_{DBA}$ equal to the voltage $U_{DBE}$, either by increasing it over the addition counter line or decreasing it over the subtraction counter line.

Figure 85:
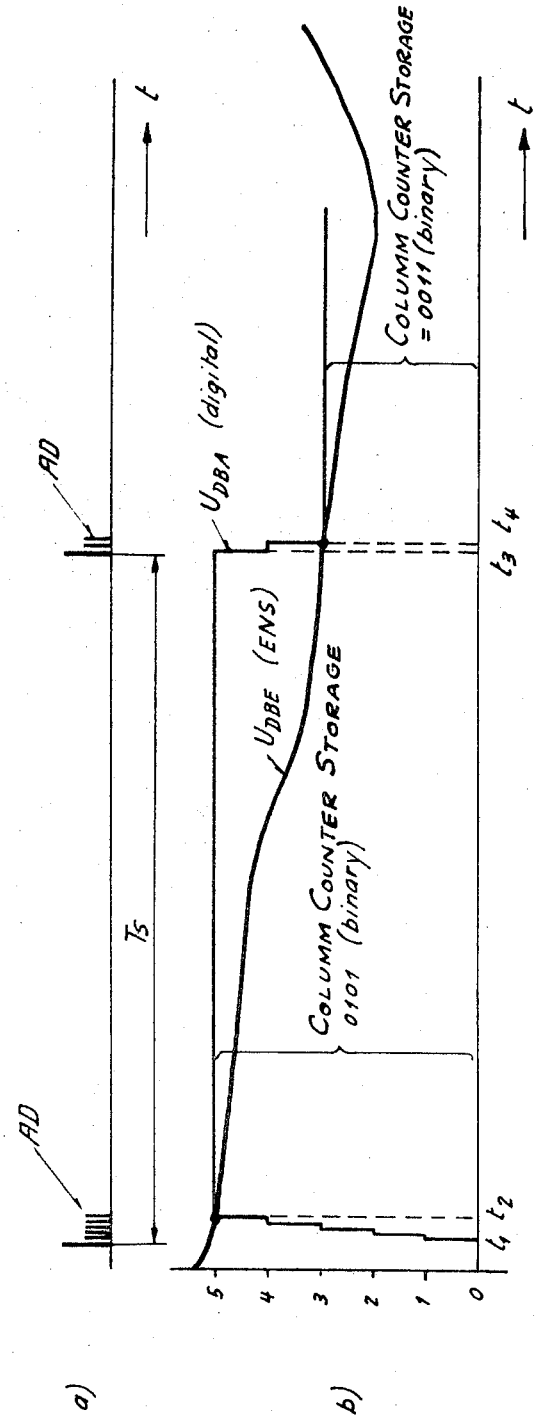
FIGS. 85, 86 are diagrams for clarifying the method of functioning of the analog-to-digital converter of the receiver of FIG. 83.
Figure 86:
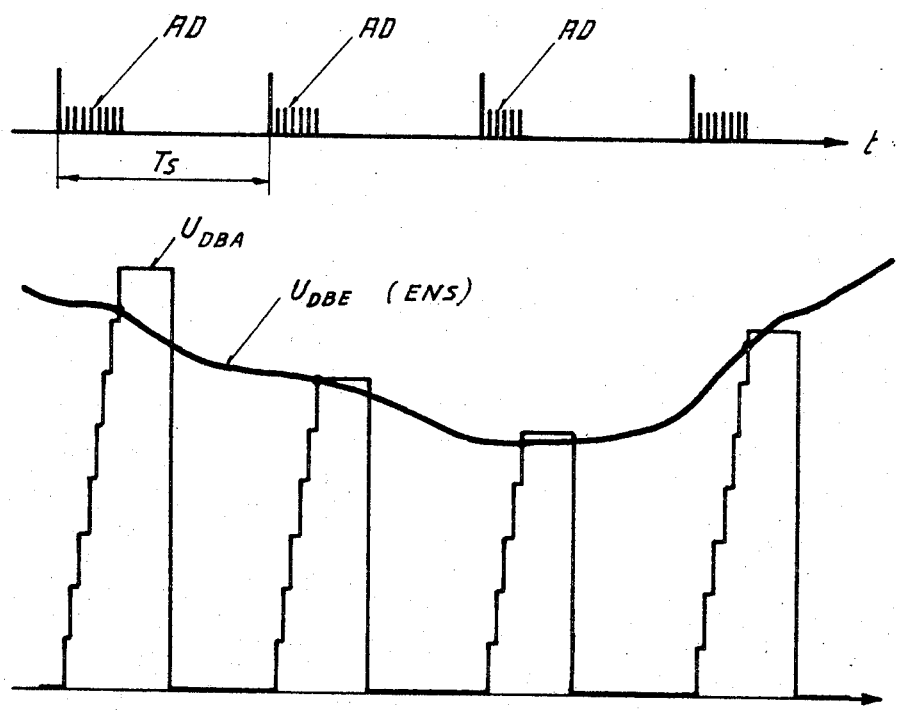

FIG. 85 illustrates two equalisation operations of this kind, the first performed by increasing the voltage by addition $(t_1, t_2)$ and the second by decreasing the voltage by subtraction $(t_3, t_4)$. If the column counter KZA were equipped with only a single counting device, then the equalisation would take place as shown in FIG. 86, whereby after each equalisation the system is returned to zero.

A value of the received information signal ENS has now become stored in the column counter KZA of the analog-to-digital converter (FIG. 83). This stored value is now passed to the column $ES_0$ of the received information signal storage (shift register) unit ENSP, by means of the gate circuits TES, activated by a switching pulse ES deriving from the clock pulse generator TGE. While this value is being processed in the column $ES_0$, the analog-to-digital converter determines a further value and passes it to the column counter KZA. In the column $ES_0$ of the received information signal storage unit ENSP there is now stored the most recently received value of the received information signal ENS in digital form, that is to say in the form of a four-place binary number as shown. The value previously received one timing period $T_S$ earlier is at this time stored in the column $ES_1$, the still earlier value, received two timing periods before, is stored in the column $ES_2$, and so forth. In the version of the invention at present being described there are thus altogether five values stored in the received information signal storage (shift register) unit ENSP, that is to say the values $ES_0$, $ES_1$, $ES_2$, $ES_3$ and $ES_4$.

The most recently received value ($ES_0$) is now compared in the signal comparator SV with the corresponding value in the synthesis signal storage (shift register) unit SSP, that is to say with the value $SS_0$. The correlation is indicated in the drawing (FIG. 83) by the correlation line ZL. The comparison can be performed in the signal comparator SV by either an analog or a digital method. In the version of the invention shown here, a purely digital binary number comparator is used. This has as its inputs on the one hand the states $a_0$, $a_1$, $a_2$, $a_3$ of the storage stages of the column $ES_0$ and, on the other hand, the values $b_0$, $b_1$, $b_2$, $b_3$ of the storage stages in the column $SS_0$ of the synthesis signal storage (shift register) unit SSP. The values $a_0$ to $a_3$ represent together a binary number corresponding to the amplitude value in $ES_0$, while the values $b_0$ to $b_3$ represent together a binary number corresponding to the value stored in $SS_0$. Let us use the symbol A for the value represented by $a_0$ to $a_3$, and the symbol B for the value represented by $b_0$ to $b_3$. In addition to these inputs the signal comparator SV also has a further input over which a constant timing frequency TV is supplied by the clock pulse generator TGE. The signal comparator SV also has the outputs $VD_1$, $VD_2$ and $VS_1$, $VS_2$.

The signal comparator SV functions as follows: If the amplitude value of the number A stored in $ES_0$ is greater than that of the number B stored in $SS_0$, that is to say if $A>B$, there appears on the lines $VS_1$ a static signal "1," whereas on the output $VD_1$ there appear pulses at the timing frequency TV. On the other hand if $A<B$, the static signal "1" appears on the output $VS_2$, while timing pulses at the timing frequency TV appear at the output $VD_2$. Finally, if $A=B$ there appear on the outputs $VS_1$ and $VS_2$ the signal "0," while on the outputs $VD_1$ and $VD_2$ there are no timing pulses, thus indicating the equalisation has been completed and there are no further outputs from the signal comparator SV.

Figure 87:
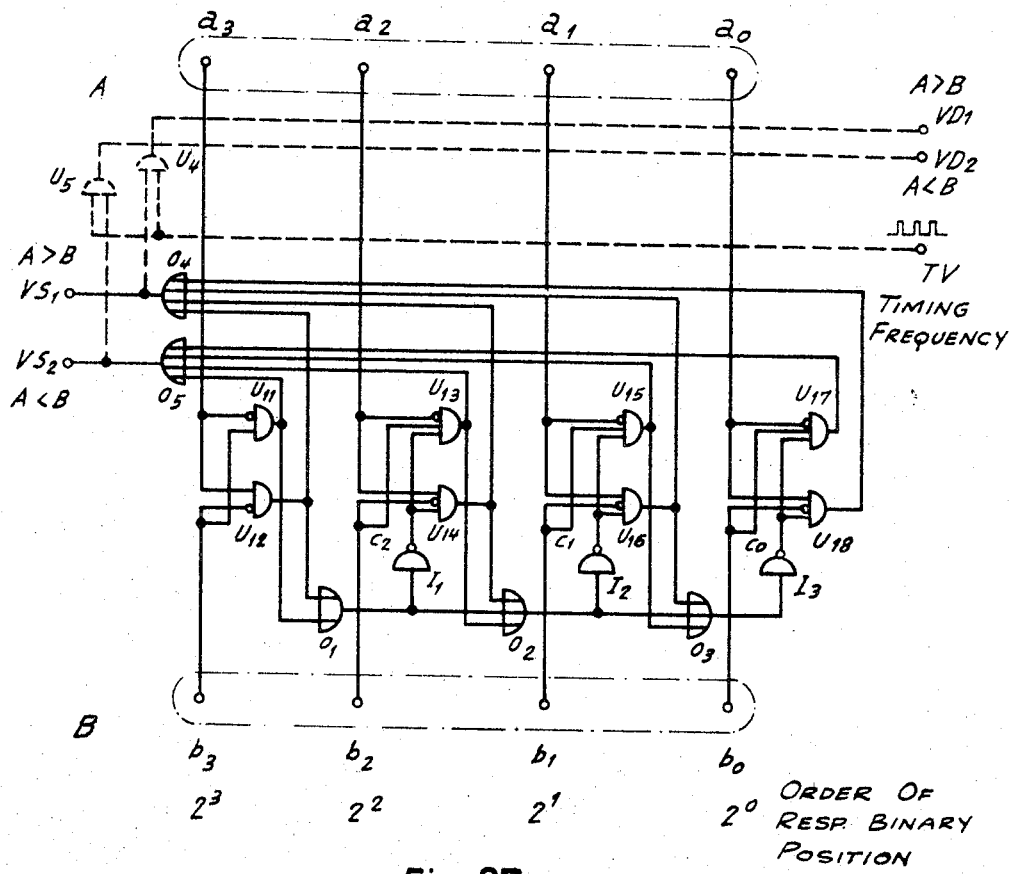
FIG. 87 is another realisation of the signal comparator of the digital receiver of FIG. 83, in the form of a digital signal comparator.

The signal comparator can for example be a binary number comparator as shown in FIG. 87, which functions as follows:

The positions are compared in pairs, that is to say the first position $a_0$ of the number A is compared with the first position $b_0$ of the number B and it is determined whether $a_0$ is greater or smaller than $b_0$. Similarly the second and further positions in the numbers A and B are compared. In these comparisons the result from comparing the positions of the highest orders determines the comparison between the numbers A and B, provided that there is an inequality. That is to say, once an inequality has been determined at a certain position the positions of lower order can no longer influence the decision regarding the relationship between the whole numbers A and B. The circuit in FIG. 87 thus consists of four comparison circuits for the four positions, and a control arrangement which as soon as an inequality has been determined at a particular position puts out of action all the other comparison circuits for the positions of lower order.

Figure 87A:
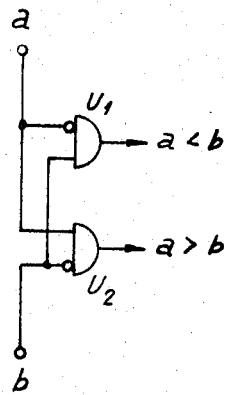
FIGS. 87a, 87b show details of the digital signal comparator of FIG. 87.

For each position the comparison circuit consists of two AND-gates $U_1$ and $U_2$, as shown in FIG. 87a. The AND-gate $U_1$ provides a "1" when $a=0$ and $b=1$, that is to say when $a<b$. On the other hand, when $a>b$, the AND-gate $U_2$ sends out a "1."

Figure 87B:
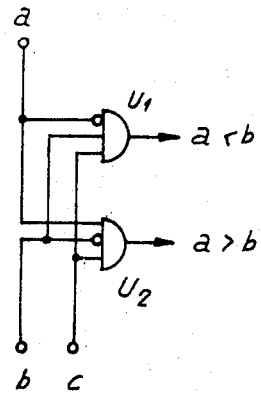

By using the circuit shown in FIG. 87b the comparison circuit can be extended in such a way that it can be blocked or made ineffective by a control signal applied to the input $c$. If the signal on the input $c$ equals 1, the circuit of FIG. 87b functions just like that of FIG. 87a. On the other hand, if a signal 0 is applied to the input $c$, then both the AND-gates $U_1$ and $U_2$ are blocked, and they give off the signal 0 irrespective of the states of the inputs $a$ and $b$.

In the binary comparator of FIG. 87 the comparison circuit for the fourth position (order $2^3$) is according to FIG. 87a, while all the other positions are according to FIG. 87b. The outputs of the comparison circuits which provide the message that $a>b$ are brought together by the OR-gate $O_4$, whose output signal feeds the line $VS_1$. Similarly the outputs of the comparison circuits which provide the message that $a<b$ are brought together by the OR-gate $O_5$, whose output signal passes to the line $VS_2$.

At the same time the output signals of the comparison circuit for the fourth place (order $2^3$) are supplied to the OR-gate $O_1$. In the case where $a_3 \neq b_3$, this gate emits the signal "1," which puts a "0" over the inversion stage $I_1$ on the line $c_2$, whereby the comparison circuit for the third position is made ineffective. Similarly the other two comparison stages are also blocked over the OR-gates $O_2$ and $O_3$ and in the inversion stages $I_2$ and $I_3$. In the case where $a_3 \equiv b_3$, the OR-gate $O_3$ gives a "0" signal, whereby the subsequent stages become ineffective. The comparison circuit for the third position similarly controls the first and second positions, while the comparison circuit of the second position controls the first position. This control circuit thus has the effect that as soon as an inequality is discovered by any comparison circuit, the subsequent comparison circuits for the lower order values are immediately rendered ineffective. In consequence, the outputs $VS_1$ and $VS_2$ are always controlled by the result of the comparison made by the comparison circuit of the highest order which discovers an inequality. This result also applies, as already mentioned, to the whole numbers A and B.

In addition to the static signals at the outputs $VS_1$ and $VS_2$, pulses are also given on the same basis to the outputs $VD_1$ and $VD_2$. As long as $A>B$ it is necessary that the output $VD_1$ must emit timing pulses supplied to the system at the input TV. For this purpose the AND-gate $U_4$ is controlled by the static signal on the output $VS_1$, with the result that as long as $A>B$ the timing pulses from the input TV are emitted at the output $VD_1$. Similarly when $A<B$ timing pulses must be emitted at the output $VD_2$. These pulses are controlled by the signal from the output $VS_2$, over the AND-gate $U_5$.

Suppose that at a particular point the received information signal ENS is greater than the synthesis signal SYS, for example suppose that the signal in $ES_0$ is greater than that in $SS_0$ (FIG. 83), then the counting pulses $ZI_+$ on the output $VD_1$, deriving from the signal comparator SV and arriving with the timing frequency TV, activate the ring counter RZ, over the gate circuit $TO_Z$, as counting pulses ZI, whereby the pulse multiplicator device IAE is activated with the result that at its outputs ZA there appear pulse numbers which correspond, on the one hand, to the corresponding amplitude values in the pulse response function IAF and, on the other hand, to the number of counting pulses applied to the ring counter RZ. Assuming now that $A>B$, the conductor $VS_1$ gives a "1" signal, whereby of the gate circuits $TB_0$ the lower row become conducting, with the result that wherever the pulse response function is positive ($VZ=+$) the output pulses from the columns of the pulse multiplier device pass to the addition counter lines $AZ_{SS}$ of the column counter of the synthesis signal storage unit SSP, while on the other hand the output pulses ZA of those columns of the pulse multiplier device whose correlated values of the pulse response function are negative ($VZ=$"$-$") pass to the subtraction counting line $SZ_{SS}$ under the influence of the gate circuits $TB_U$ and $TB_0$. The process continues till the equality ($A=B$) prevails in the signal comparator SV, and after that the counting pulses emitted by the signal comparator SV cease. The value of the synthesis signal in $SS_0$ which is compared by the signal comparator SV with the corresponding value of the received information signal in $ES_0$ is influenced by that column of the pulse multiplier device which corresponds to the maximum amplitude of the pulse response function (the column $IA_0$ corresponding to the value Â). In effect the value of the synthesis signal which is to be compared and matched up at a particular instant is first of all matched up just as though the valve of the synthesis signal were determined exclusively by a single pulse response function, and were determined by its maximum value. At the same time there are also added up or subtracted, in proportion to the side values $A_{+1}$, $A_{-1}$, $A_{-2}$ and so forth of the pulse response functions, also the column counters of the synthesis signal storage (shift register) unit SSP corresponding to these side values, that is to say for example the column counters $SS_1$, $SS_{-1}$, $SS_{-2}$, $SS_{-3}$ and so forth, to the effect that the initial difference value between the two signals in $ES_0$ and $SS_0$, that is to say the difference $A-B$, is superposed into the synthesis signal storage unit SSP and this process is continued until the instant when the value in $SS_0$ becomes equal to that in $ES_0$.

The counting pulses $ZI_+$ supplied by the signal comparator over the line $VD_1$ also reach the addition counter line $AZ_{IW_0}$ of the column counter $IW_0$ of the pulse value storage (shift register) unit, and cause an increase in this pulse value $IW_0$ which before the matching procedure corresponds to the difference between the received information signal in $ES_0$ and the synthesis signal in $SS_0$. For example suppose that the difference between the received information signal and the synthesis signal at the comparison point has the value 5, then five counting pulses reach the line $VD_1$ at the timing frequency TV. These five counting pulses increase the column counter $SS_1$ by two units, increase the column counter $S_0$ by five units corresponding to the initial difference, increase the column counted $SS_{-1}$ by one unit, decrease the number in $SS_{-2}$ by two units and so forth, all these changes corresponding to the proportional pulse response function $(IAF)_5$, whereby the five counting pulses on the line $VD_1$ also increase the pulse value $IW_0$ by five units, over the addition counting line $AZ_{IW_0}$. Moreover the pulse values are previously corrected just as though the entire signal difference depended only on a single pulse value, or on the amplitude of its correlated pulse response function. In this case the correlation line ZL correlates the two comparison positions in the received information signal storage unit ENSP and in the synthesis signal storage unit SSP, and also correlates the maximal value of the pulse response function IAF with its attributed pulse value $IW_0$.

After the completion of this automatic matching process, that is to say when equality has been reached, a shifting pulse is supplied to the shifting line SR with the result that the values stored in the columns of the three shift registers are shifted one stage towards the right. The value previously in $ES_0$ now appears in $ES_{-1}$, the value of $SS_0$ appears in $SS_{-1}$ and the value of $IW_0$ appears in $IW_{-1}$. On the other hand, in $ES_0$, $SS_0$ and $IW_0$ there are now the values which have been previously been in $ES_1$, $SS_1$ and $IW_1$. In this process it should be remembered that the amplitude value which was previously in $ES_1$ had been received and stored one timing period $T_S$ earlier, while the value which had been in $SS_1$ was the corresponding value in the synthesis signal, moreover the value previously in $IW_1$ was the attributed value. All these values are now stored in the co-ordination line ZL, where they are automatically compared and, as described above, adjusted or matched to each other, again just as though at this position the maximum value of the corresponding pulse response function were exclusively determinative for the difference between the received information signal and the synthesis signal. During this matching process the side values in the synthesis signal storage unit SSP are of course also changed. For example, the value in $SS_{-1}$, which was previously matched to the value in $ES_{-1}$, can now of course show a difference. After the completion of this second matching operation, that is to say after this second correction of the synthesis signal and of the corresponding value in the pulse value storage unit IWSP, a further shifting pulse is supplied to the shifting line SR with the result that all the values stored in the shift registers are once more shifted one step towards the right. The process is repeated and, after four steps, we find the information which was initially stored in $ES_4$ now stored in $ES_0$, that initially stored in $SS_4$ now stored in $SS_0$ and that initially stored in $IW_4$ now stored in $IW_0$. With the completion of this matching operation the entire storage range has been processed once. The information initially in $ES_0$ is now in $ES_{-4}$ and that initially in $SS_0$ is now in $SS_{-4}$.

In the operation which now follows, five shifting pulses are supplied one after the other to the shifting line SL, with the result that the values in the shift registers are shifted five steps towards the left. The information initially in $ES_0$ is now in $ES_1$, that initially in $ES_1$ is in $ES_2$, that initially in $ES_3$ is in $ES_4$ and the information initially in $ES_4$ has disappeared entirely. In $ES_0$ there is now the information of $ES_E$, which had been artificially set to "0." In the synthesis signal storage shift register unit the shifting by five steps to the left takes place similarly, as also in the pulse value storage shift register unit, but in the latter storage unit the information which has been pushed furthest over to the left is not lost but is pushed into the output pulse value column $IW_5$. This information is in fact the sought pulse value which has been obtained by iteration, that is to say by successive approximation. In the meantime a new received information signal value, arriving one timing period later, and, after completion of the shifting by five steps to the left, this new value is put into the column $ES_0$ by a setting pulse ES. The entire process is then repeated for this new value. In this way each pulse value can be corrected four times by iteration, whereby of course the values in the synthesis signal storage unit are all at the same time also matched, before this pulse value reaches the output pulse value column $IW_5$ as an output value.

The shift register columns $SS_E$ in the synthesis signal storage unit, together with the $IW_E$ values in the pulse value storage unit, together provide a definite average value as the "0-line" to the shift register columns. In the example of FIG. 83 it is assumed that the columns in the shift register are arranged in the ordinary binary code whereby the binary values in the lowest line must be multiplied by 1, those in the second line by 2, those in the third line by 4 and those in the fourth line by 8. For example if a 1 occurs in the fourth column, then this signifies the value 8. As the entire range is 16, a "1" in the fourth line represents a value just about in the middle of the available range. A "1" is therefore set in the highest stage in $IW_E$ and in $SS_E$, with the result that when this is shifted to the left and thus introduced into the shift register the resulting "Zero line" establishes the middle of the numbering range.

The extra pulse value columns $IW_X$ and $IW_Y$ in the pulse value storage unit can be used, in those cases where the information is contained in the amplitude differences, for forming the differences between two pulse values. This process will be described below on the basis of FIG. 90.

Up to this point there have been described, on the basis of FIG. 83, the processes taking place in principle. It is of course obvious that instead of performing four iterations for each value received, one could perform eight or more. Moreover the shift registers could have 5, 6 or even 7 lines if desired, and this would of course allow the amplitude steps to be smaller. Furthermore, it would be perfectly possible to use much smaller amplitude steps in the synthesis signal storage unit SSP and in the pulse value storage unit IWSP, and of course also in the pulse response storage unit IASP, then are used in the received information signal storage unit ENSP, in order to keep within sufficiently small limits the errors arising in the quantitised superposition in the synthesis signal storage unit SSP.

As has already been mentioned in connection with FIG. 82, the signal comparison can very well be performed not only at a single point, that is the point on the co-ordination line and which therefore contains the maximum value $\hat{A}$ of the pulse response function, but rather at three or even more points simultaneously with the formation of a common adjustment value $$VW = f(A_{+1}\Delta_{+1}, \hat{A}\Delta_0, A_{-1}\Delta_{-1})$$

in which the determinative values are the product of the coefficients $A_{+1}$, $\hat{A}$, $A_{-1}$ . . . of the pulse response function and the differences $\Delta_{+1}$, $\Delta_0$, $\Delta_{-1}$ . . . between the ENS and the SYS at the points in question. In a further variant one could also use as the determinative values instead of directly the products $A\Delta$, rather products of the form $A^m\Delta^n$. The adjustment value is brought down to a minimum by varying the correlated pulse response function. This method can be used with particular advantage, for example when the channel has a large transit time distortion, where the maximum $\hat{A}$ of the pulse response function is not much greater than the side values $A_{+1}$, $A_{-1}$, $A_{-2}$, $A_{-3}$ . . ., that is to say where the main energy distribution of the pulse response function is greatly scattered through time.

In a preferred version of the invention the comparison adjustment value VW can be formed on the basis of the equation:

$$VW = |A_{+1}\Delta_{+1}| + |\hat{A}\Delta_0| + |A_{-1}\Delta_{-1}| + \ldots$$

or in general:

$$VW = \epsilon|A_X\Delta_X|$$

where $A_X$ is the coefficient of the pulse response function, and $\Delta_X$ is the difference between the received information signal and the synthesis signal at the position in question ($\Delta_X = ENS_X - SYS_X$). The comparison value VW is a measure of the correlation between the received information signal and the synthesis signal in the region of the pulse response function which is about to be adjusted. The value of the pulse response function must be so adjusted that the comparison value VW is a minimum.

By this method the signal comparator is no longer required to determine at a particular point whether the ENS is greater or smaller than the SYS and then to modify the pulse response function in such a way that, at this point, the ENS is equal to the SYS; the requirement is rather that the signal comparator must determine the adjustment value $VW = \epsilon|A_X \Delta_X|$ which, over the pulse multiplicator device IAE, modifies the pulse response function until the value of the VW becomes as little as possible. A circuit of this kind is shown diagrammatically by FIG. 83 and as modified by FIG. 84.

Figure 84:
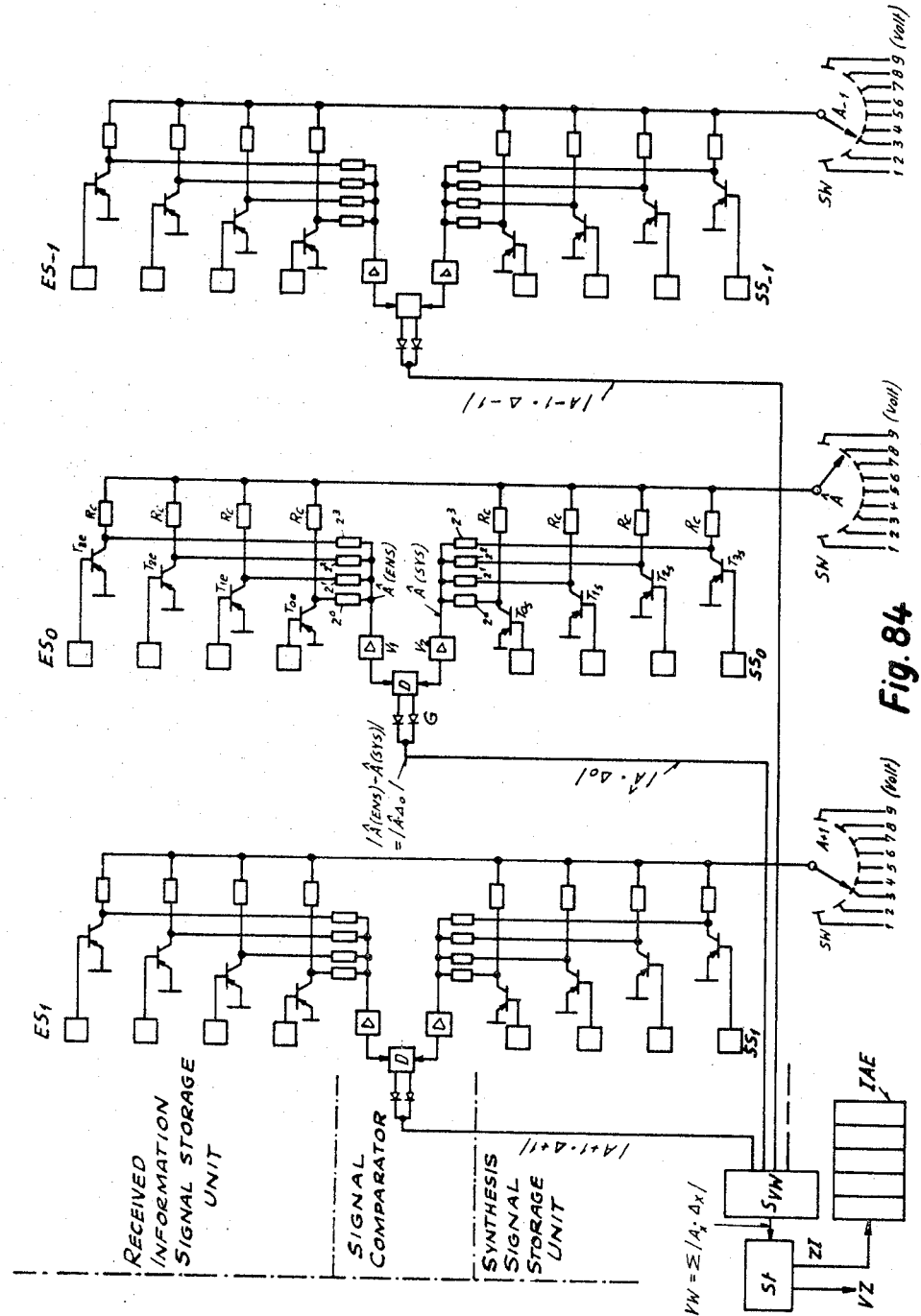
FIG. 84 shows a variant of the signal comparator of the receiver of FIG. 83.

FIG. 84 shows the three colums $ES_1$, $ES_0$, $ES_{-1}$ of the received information signal storage unit, and three columns $SS_1$, $SS_0$, $SS_{-1}$ of the synthesis signal storage unit.

The method of functioning of the receiver of FIG. 83 as modified according to FIG. 84 will now be described.

In order to form the product, for example $|A \Delta_0|$, there are first formed the products $(\hat{A} \text{ ENS})$ and $(\hat{A} \text{ SYS})$ because this multiplication can be obtained more simply. The factor $\hat{A}$ is the value stored in the multipoint commutation switch SW during the reception of the pulse response function. In the present case there is a voltage which was picked off at one point of the commutator switch SW. The picked off voltage $\hat{A}$ passes to the evaluation resistances $2^0$, $2^1$, $2^2$, $2^3$ of a digital-analog converter, whereby these resistances are considerably greater than the collector resistances Rc of the circuit transistors $T_{0e}$, $T_{1e}$, . . . $T_{0s}$, $T_{1s}$, which function only as switches and are switched by the stages $ES_0$ ($ES_1$, $ES_{-1}$ . . .) or $SS_0$ ($SS_1$, $SS_{-1}$ . . .).

The sum currents in the evaluation resistances $2^0$, $2^1$, $2^2$, $2^3$ are proportional to the product $(\hat{A} \text{ ENS})$ or $(\hat{A} \text{ SYS})$, and pass over the amplifier $V_1$ or $V_2$ to reach the differential amplifier D, in which the absolute value $|A \Delta_0|$ is formed by the rectifier G. Similarly there are obtained at the stored side points $(ES_1, SS_1)$, $(ES_{-1}, SS_{-1})$ the values $|A_{+1} \Delta_{+1}|$ and $|A_{-1} \Delta_{-1}|$ which give, by summating the three values in $S_{VW}$, the adjustment comparison value $WV = \epsilon|A_X \Delta_X|$. Using this adjustment value VW the pulse multiplicator device IAE is activated, to bring the VW to a minimal value, over a control device St and over the ring counter RZ of the pulse multiplicator device IAE, by means of control pulses ZI, and utilising the sign circuit of the receiver of FIG. 83. For this purpose the control device also contains a differentiating member.

One could of course use for forming the control value VW two or even more than three points, the latter particularly in those cases where the main energy of the pulse response function is distributed over more than three interval lines of the time grating.

In the variant just described the matching of the synthesis signal to the received information signal is also done by iteration.

In the arrangement of FIG. 83 the entire iteration device is controlled by the clock pulse generator TGE, whose basic timing must have the frequency $f_S = 1/T_S$ and must be synchronized with the timing frequency at the sender end. This clock pulse generator will now be briefly described with reference to FIGS. 88 and 89.

Figure 88:
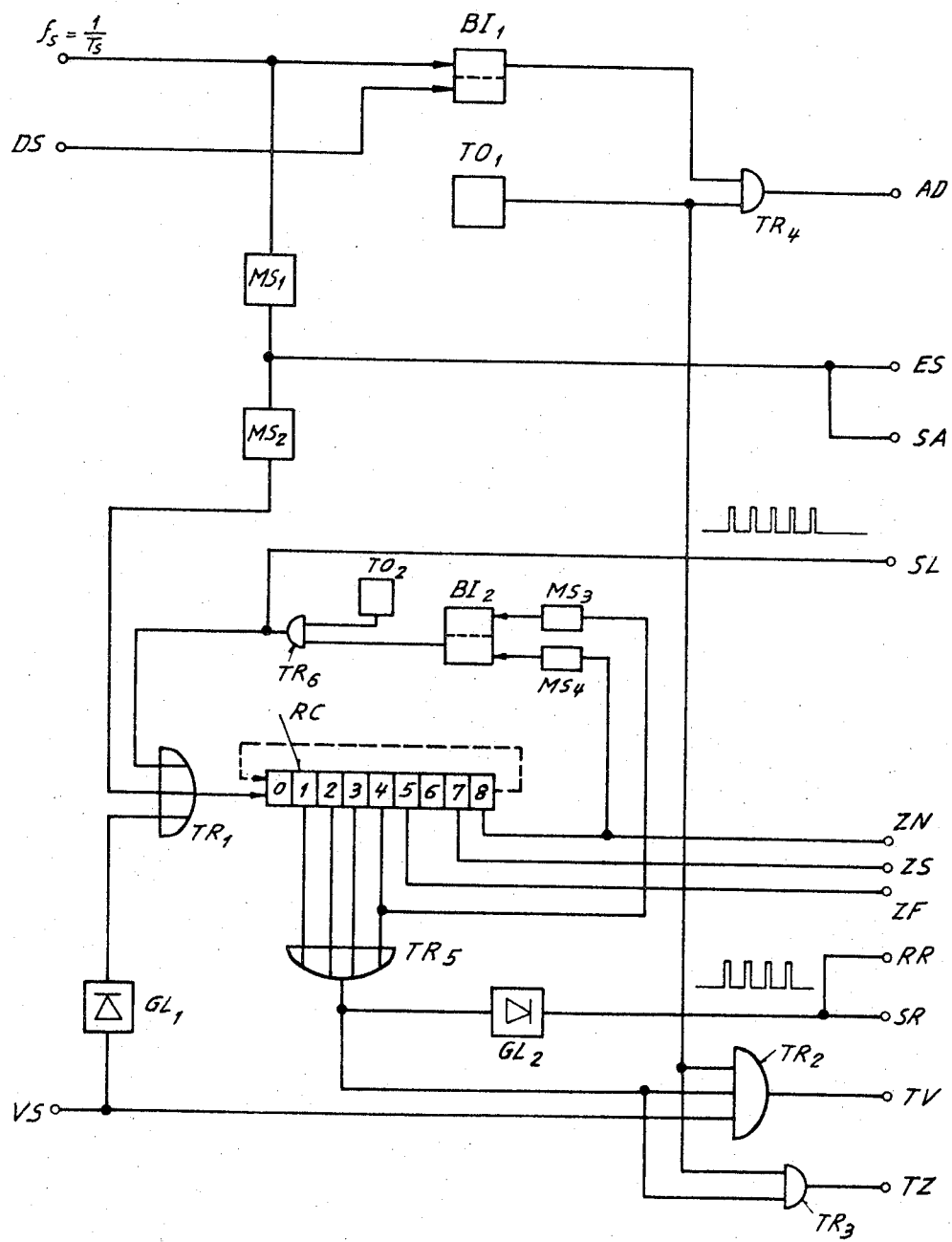
FIG. 88 shows a block circuit for a clock pulse generator for the digital receiver of FIG. 83.
Figure 89:
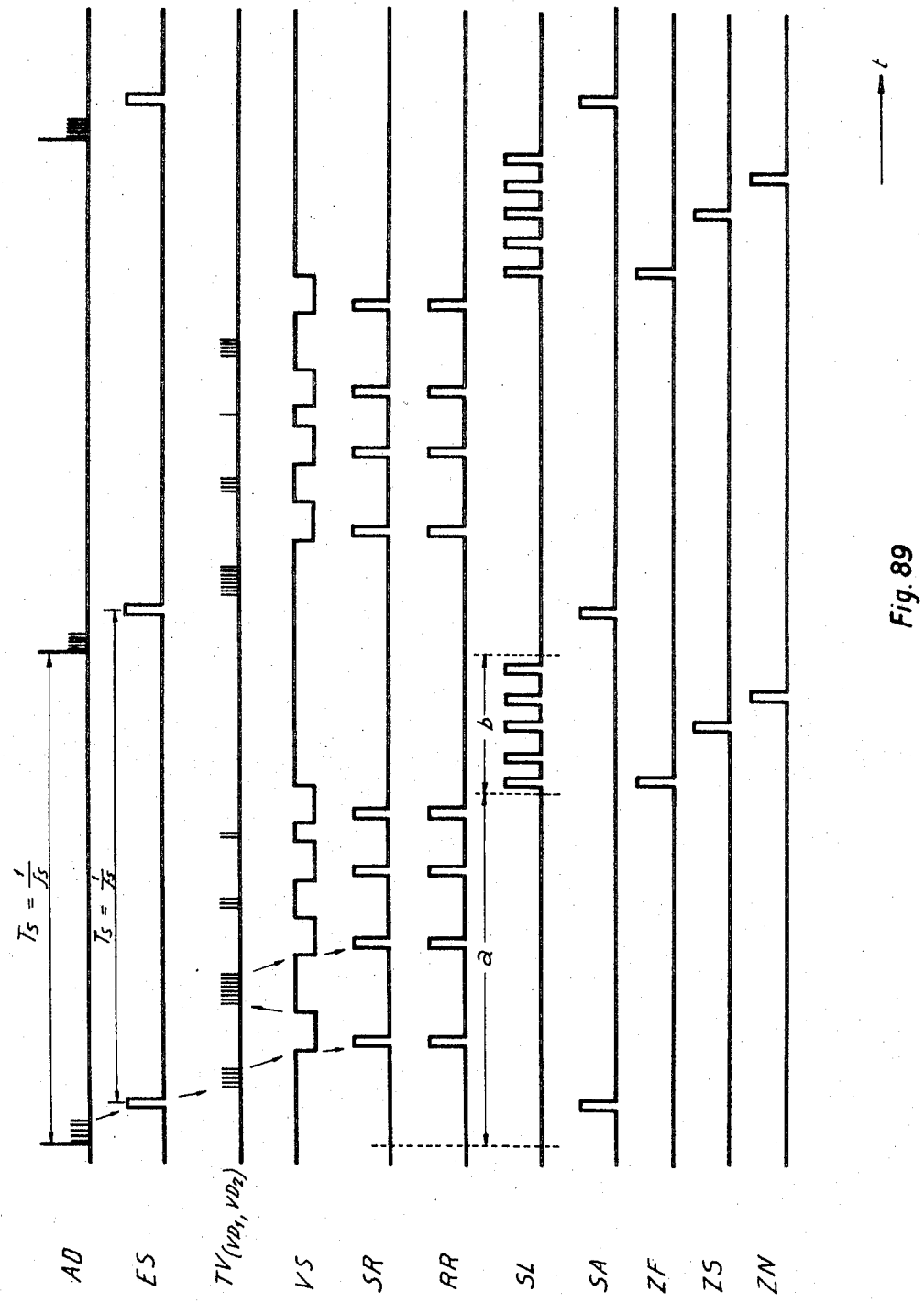
FIG. 89 is a diagram for clarifying the method of functioning of the clock pulse generator of FIG. 88.

FIG. 88 is the block circuit of the clock pulse generator, and FIG. 89 shows the pulse sequences over at least two timing periods. A bistable stage $BI_1$ is switched at the timing frequency $f_S$, with the result that the gate $TR_4$ becomes conductive and the rapid control pulses produced the generator $TO_1$ reach the output AD which, by means of the differential comparator DB and over the gates $T_{R6}$ and $T_{R7}$ controls the column counter KZA of the analog-digital converter, the column counter KZA functioning as an adding and substracting column counter, until agreement is reached between the digital value stored in KZA and the analog value of the received information signal (FIG. 83). As soon as the value is stored in the column counter KZA, it is transferred to the shift register column $ES_0$ by means of a pulse ES derived from the clock pulse generator from the pulse frequency $f_S$ by the influence of a delay member $MS_1$. At the same time, the most recently determined and final pulse value from the output pulse column $IW_5$ is transferred to the pulse value storage column $IW_X$ or $IW_Y$ by means of a pulse SA (FIG. 83). With a further delay provided by a further delay member $MS_2$ the pulse passes to the OR-gate $TR_1$ and thence to a ring counter RC to shift the information in this ring counter, which is at zero, into the position 1. As as result, the gate $TR_2$ now becomes conductive, over the gate $TR_5$, as soon as a signal arrives from VS, that is to say as soon as either $VS_1$ or $VS_2$ has the state "1," which is always the case whenever an inequality is determined by the signal comparator SV. Thus in the presence of an inequality the gate $TR_2$ becomes conductive and the rapid control pulses from the generator $TO_1$ reach the output TV of the apparatus, and thus also reach the comparator, with the result that the matching process already described takes place in the synthesis signal storage unit over the lines $VD_1$ and $VD_2$ under the influence of the counting signal ZI, and so forth. Once the maching has been completed the signal VS becomes zero, with the result that the macthing pulses TV disappear and a switching pulse is given over the rectifier circuit $GL_1$ and over the gate $TR_1$ to the ring counter, setting it to the position 2. With this switching in the ring counter there is also sent, over the gate $TR_5$ and the rectifier $GL_2$, a shifting pulse to the shifting line SR, with the result that the information in the shift registers (FIG. 83) is shifted one place towards the right. Similarly, a pulse RR is given to the ring counter RZ (FIG. 83) and this resets this ring counter to zero. In view of the fact that new information is now on the correlation line, the signal VS can again be 1 with the result that now again pulses are given to the signal comparator, at the output TV, and these cause, over the conductor $VD_1$ or $VD_2$ a follow-up activation at this position. If a matching between $ES_0$ and $SS_0$ is here also obtained, then VS again becomes zero, with the result that a further switching pulse is now given to the ring counter RC, over $GL_1$ and $TR_1$. This occurs until the fourth stage of the ring counter RC is reached, that is to say until four shifts towards the right and four matching processes have been completed, after which the shifting pulses over SR, which can only reach here from the ring counter stages 1 to 4 cease and the bistable stage $BI_2$ is switched via the delay circuit $MS_3$, whereby the generator $TO_2$ gives pulses on the one hand over the now conductive gate $TR_6$ to the shift line SL (shift to the left) and, on the other hand, over the gate $TR_1$ to the ring counter up until the time when the ring counter has reached stage 8 and once more switches back the bistable stage $BI_2$ over the delay $MS_4$, whereby the pulses from $TO_2$ now cease. As a result, the shifting through five stages towards the left has now been completed and the processes which have been described on the basis of FIG. 83 are terminated.

However, the clock pulse generator also produces certain other pulses, that is to say a pulse ZF when the ring counter is at the position 5, a pulse ZS when the ring counter is at the position 7 and a pulse ZN when the ring counter is at the position 8. Furthermore the generator $TO_1$ also gives a series of rapid pulses over the gate $TR_3$ to the output TZ when the ring counter is at the positions 1, 2, 3 and 4. All these latter outputs are required for the zero line adjustment and also for forming the difference according to FIG. 90, as will be described later on.

FIG. 89 shows the time diagram for the clock pulse generator. In this figure each line represents the pulse succession at the corresponding points of the block circuit of FIG. 88.

The line AD represents the pulses from the generator $TO_1$ at the timing period $T_s$. The line ES shows the timing period $T_s$ after the delay by the delay member $MS_1$. In the figure the small arrows indicate which pulses trigger the other pulses. Line TV shows the rapid pulses for controlling the signal comparator, and line VS represents the output values of the signal comparator. The line SR represents the pulses which actuate the shift register during the matching phase (a), while the line SL shows the left shifting pulses (b) sent out after the completion of the matching. The lines SL, SA, ZF, ZS, ZN represent the pulses which occur within the timing frequency and which are required for the automatic zero line adjustment or difference formation.

As already explained above it is very useful, where one is using information channels containing bandpass filters, to convert the information into amplitude differences between two successive pulses. For this case the process can be conducted in either of two different ways:

The first method consists in that at the receiver end the pulse response resulting from a pulse is stored, for example as shown in FIG. 8 or 9. At the sender end there is first of all performed, before the transmission, a conversion of pulse values into pulse differences, for example in the manner described on the basis of FIG. 76. At the receiver end there now appear in the pulse value storage unit, after the approximation by iteration, pulses between which it is however only necessary to determine the difference, because the difference contains the initial information.

As a second possibility one can store as the pulse response function the differential derivative of the received information signal, as provided by a differentiator, this derivative occurring when at the sender end a pulse jump is terminated. For example, considering FIG. 11, this might be the function $U_A'$, on the basis that the value $\bar{U}_A' = c\Delta U_E$ and is thus proportional to the pulse jump at the sender end. If one chooses to use this derived function as the pulse response, then the pulse values obtained at the receiver end are directly proportional to the pulse differences at the sender end and need merely be two-way rectified at the sender end.

Figure 90:
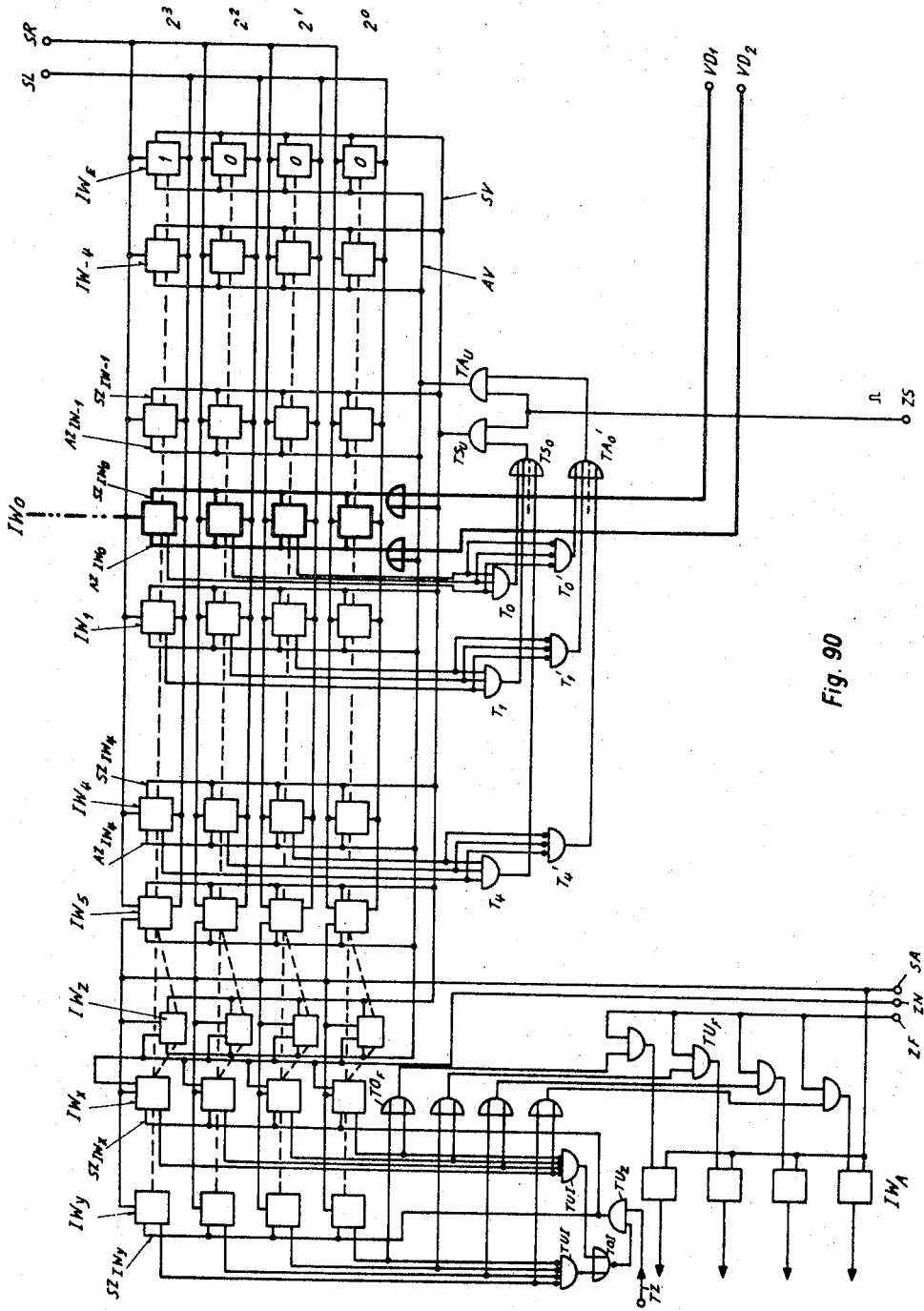
FIG. 90 is a block diagram for a converter to convert pulse values to pulse differences, with automatic zero line adjustment, as an extension to the receiver of FIG. 83.

Considering the process of the first kind, that is to say difference formation followed by two-way rectification according to FIG. 76, in order to determine the pulse value differences the pulse value storage unit ISWP of FIG. 83 has to be somewhat extended as shown in FIG. 90. The "final" pulse value $IW_5$ is now transposed by a shifting pulse on the one hand into the pulse value column $IW_X$ (FIG. 90) and, on the other hand, into the pulse value column $IW_Z$. The two columns $IW_X$ and $IW_Y$ contain the two most recently (finally) determined pulse values. It is now necessary to determine the difference between these two pulse values, that is to say the absolute difference neglecting the sign, as indicated in FIG. 76. This difference is obtained in that by the effect of a timing pulse of frequency TZ derived from the clock pulse generator applied to the gate $TU_Z$ both the values $IW_X$ and $IW_Y$ are counted backwards over the subtraction counting lines $SZ_{IW_X}$ and $SZ_{IW_Y}$, until one of these two values becomes zero, with the result that one of the of the two gates TUI becomes conductive while over the gate TOI (with subsequent inversion) the gate $TU_Z$ is blocked. The sought difference value is now in one of the two columns $IW_X$ or $IW_Y$ and is now transferred over the gate circuits $TO_F$ and $TU_F$, by means of a setting pulse ZF, to the pulse value output column $IW_A$.

Subsequently a shifting pulse ZN is used to transpose the information in $IW_Z$, which is the same as initially present in $IW_X$, into the column $IW_X$, whereupon a different shifting pulse SA is used to shift the newly obtained information $IW_5$ on the one hand into $IW_X$ and one the other hand into $IW_Z$, whereby at the same time the information in $IW_X$ is also shifted into the column $IW_Y$. Thus we now have the two most recent pulse values once more in $IW_X$ and $IW_Y$ and the new difference can be determined.

In this first variant in which there are stored pulse response functions resulting from pulses, for example according to FIG. 9, and in which one need consider for the transmission of the information only the differences, it is necessary to take into account the fact that up to this point we have as yet no criterion for establishing the zero line in the pulse value storage unit. Although as described above we need consider here only the differences between neighbouring pulse values and one might, therefore, suppose that it does not matter in the least where the absolute zero line is situated in the pulse value storage unit, nevertheless this zero line could easily wander upwards or downwards so that finally it would become impossible to store the pulse values on account of the upper or lower limit. For this reason there is preferably provided an automatic control for the zero line. If we are using a digital storage unit which can for example store 4-place binary numbers on the basis of the usual binary code, thus storing altogether 16 possible different numbers or amplitude steps, the zero line should be situated in the middle, that is to say at the number 8, by making the highest position (which has the order $2^3$) have the value 1. This is done by means of a feed-in column $IW_E$. Now suppose that the determined pulse values $IW_0$ to $IW_4$ result in the storage of pulse values which exceed a certain number, in this case the zero line is automatically moved, for example downwards by one amplitude step, whereas, on the other hand, if there are stored numbers which are below a certain value, then the zero line is moved, for example, one amplitude step upwards at a time. This is done automatically according to FIG. 90 by means of the zero line adjustment over the gates $T_0, T_1 \ldots T_4$ and $T_0', T_1' \ldots T_4'$, and $TS_0$ and $TA_0$ and $TS_U$ and $TA_U$. It is assumed that in this pulse value storage unit, shift register, the individual columns express the ordinary binary code, that is to say a "1" in the lowest stage of the column, or in the lowest line, is $2^0$ or the value 1, while a "1" in the second stage or second line is $2^1$ or the value 2, while further a "1" in the third line is $2^2$ or the value 4, and a "1" in the fourth line is $2^3$ or the value 8. In this example the gate $T_4$ for example becomes conductive when the amplitude value in the pulse value storage unit $IW_4$ reaches or exceeds the binary number 1110 which has the value 14. The same thing applies similarly to the gates $T_0$ to $T_3$. Moreover one of the gates $T_0'$ or $T_4'$ becomes conductive when the number "1" is reached or exceeded downwards. In this way one obtains the result that values which equal or exceed the number 14 cause a pulse to reach the line SV over the gates $TS_O$ and $TS_U$, with the result that all the subtraction counting lines $SZ_{IW}$ receive subtraction pulses and the zero line becomes displaced downwards. Similarly a pulse ZS on the line AV causes, over the gates $TA_O$ and $TA_U$ all the addition counting lines $AZ_{IW}$ to receive a pulse which displaces the zero line upwards by one stage as soon as any one of the pulse value storage units has a value equal to or below the number "1." This method of zero line adjustment has been described here on the basis of very coarse steps whereas in practice it is of course performed using much finer steps.

Figure 91:
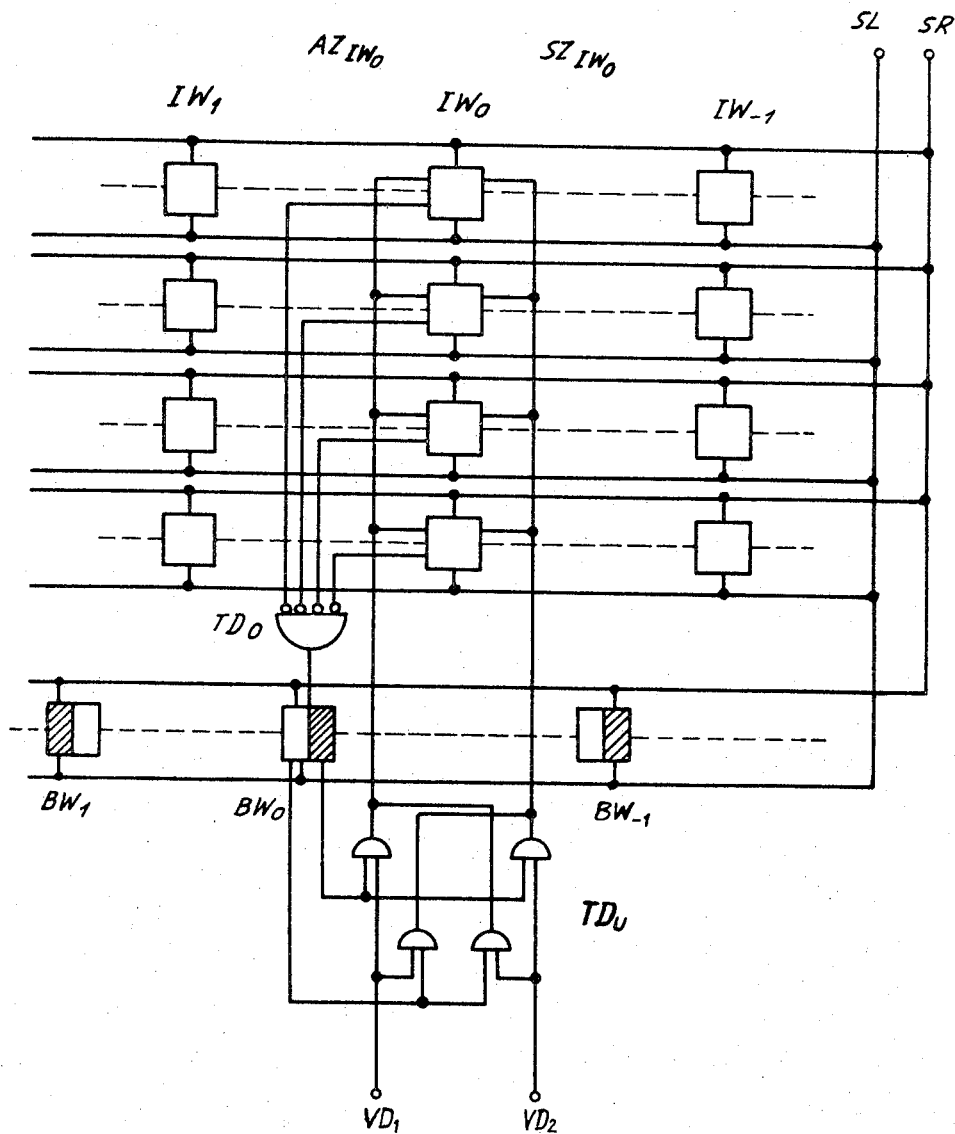
FIG. 91 is a block circuit for a digital two-way rectifier, as an extension to the receiver of FIG. 83.

FIG. 91 shows, as a variant to the receiver of FIG. 83, a part of a pulse value storage unit IWSP suitable for the transmission by the second method, in which the information is already at the sender end in the form of amplitude differences. At the receiver end the information signal is differentiated in a differentiator. In this case the stored received information signal is therefore the differential derivative of the information signal reaching the receiver. Similarly the stored pulse response is the function derived in the differentiator. As the difference is in this case formed by the differentiator it is merely necessary in the pulse value storage unit to perform a "two-way rectification," because in this case it is the absolute values of the jumps or of the amplitude differences which are determinative. This digital two-way rectification functions as follows: The pulse value $IW_O$ is successively reduced by pulses on the subtraction counting line $SZ_{IW_O}$ until finally the number in $IW_0$ reaches the value zero. At this instant the flip-flop $BW_0$ is switched to feed the gate $TD_0$ with the result that the pole reversing circuit $TD_U$ has its poles reversed, after which further counting pulses from $VD_2$ no longer reach the subtraction line but reach the addition line instead and are counted (pole reversal). With the flip-flop $BW_0$ in its new state counting pulses on the line $VD_1$ now count down the column counter $IW_0$ until again the value 0 is reached and, over the gate $TD_0$, the flip-flop $BW_0$ is reset, which results in the counting device becoming pole-reversed once more. This process expresses a two-way rectification, in this case a digital rectification. It is evident that the information in the flip-flops $BW_0$, $BW_1$, $BW_{-1}$ and so forth, which expresses the pole reversal state of their correlated pulse values, must be shifted to the right or to the left in agreement with these correlated pulse values. This purpose is served by the shifting lines SL and SR.

As already described above, a task often encountered is to convert the amplitude values in the information signal to amplitude differences at the sender end. FIG. 92 illustrates a digital circuit for this operation. The information signal arrives here at EI in the form of pulses in the sender sequence SU. In this figure the pulse group $Z_1$ can for example represent the amplitude step number 6, while the pulse group $Z_2$ represents 9 amplitude steps, the pulse group $Z_3$ represents 2 amplitude steps and so forth. The circuit $a$ consists of a column counter with the counting stages $S_{K0}$, $S_{K1}$, $S_{K2}$, $S_{K3}$, and a buffer storage unit with the stages $S_{P0}$, $S_{P1}$, $S_{P2}$, $S_{P3}$. The column counter and the buffer storage unit are also connected together, over the lines shown as broken lines in the drawing and over the shifting lines ES, to form a shift register. The information in the column counter is each time shifted by the sender pulse sequence SU into the buffer storage unit, where it is then available for the evaluation. Let us assume that at the beginning the information 0111 is stored in the buffer storage unit $S_{P0}$, $S_{P1}$, $S_{P2}$, $S_{P3}$. As a result the gate IT is now open for pulses over EI (because there is a "0" on the line marked "middle"). The pulses, for example $Z_1$, now count the column counters $S_{K0}$, $S_{K1}$, $S_{K2}$, $S_{K3}$ upwards, over the line marked "forwards" as shown in the part $D_{Z1}$ of diagram $a$ of FIG. 92. The next sender pulse sequence SU shifts the values in the column counter over into the buffer storage unit, with the effect that the information signal can be picked off from there in amplitude steps of evaluated form. As shown in diagram $b$, the "middle" of the entire counting range of the counting column or buffer storage unit, which in this example is assumed to contain 4 stages, has been exceeded, the stages $S_{P0}$ in any case now contains a "1." The gate DT is therefore now open for the pulses $Z_2$ (because there is a "1" on the line "middle"), with the result that the column counter is counted backwards over the line "backwards" as shown in the part $D_{Z2}$ of diagram $b$ of FIG. 92. The next sender pulse sequence SU now shifts the value in the column counter over into the buffer storage unit again. As the "middle" of the counting range has now been exceeded downwards (compare diagram $b$, part $D_{Z2}$), the next pulses (both $Z_3$ and also $Z_4$) count the column counter upwards. It is not till the arrival of the following pulses that the column counter is again counted backwards. Thus this circuit converts the amplitude values of the information signal into amplitude differences, while at the same time ensuring that the resulting amplitude values do not depart too far from the "middle" of the amplitude step range.

In what follows there will now be described a circuit for realising the iteration method in the sequence of the greatest difference in the stored range.

Figure 93:
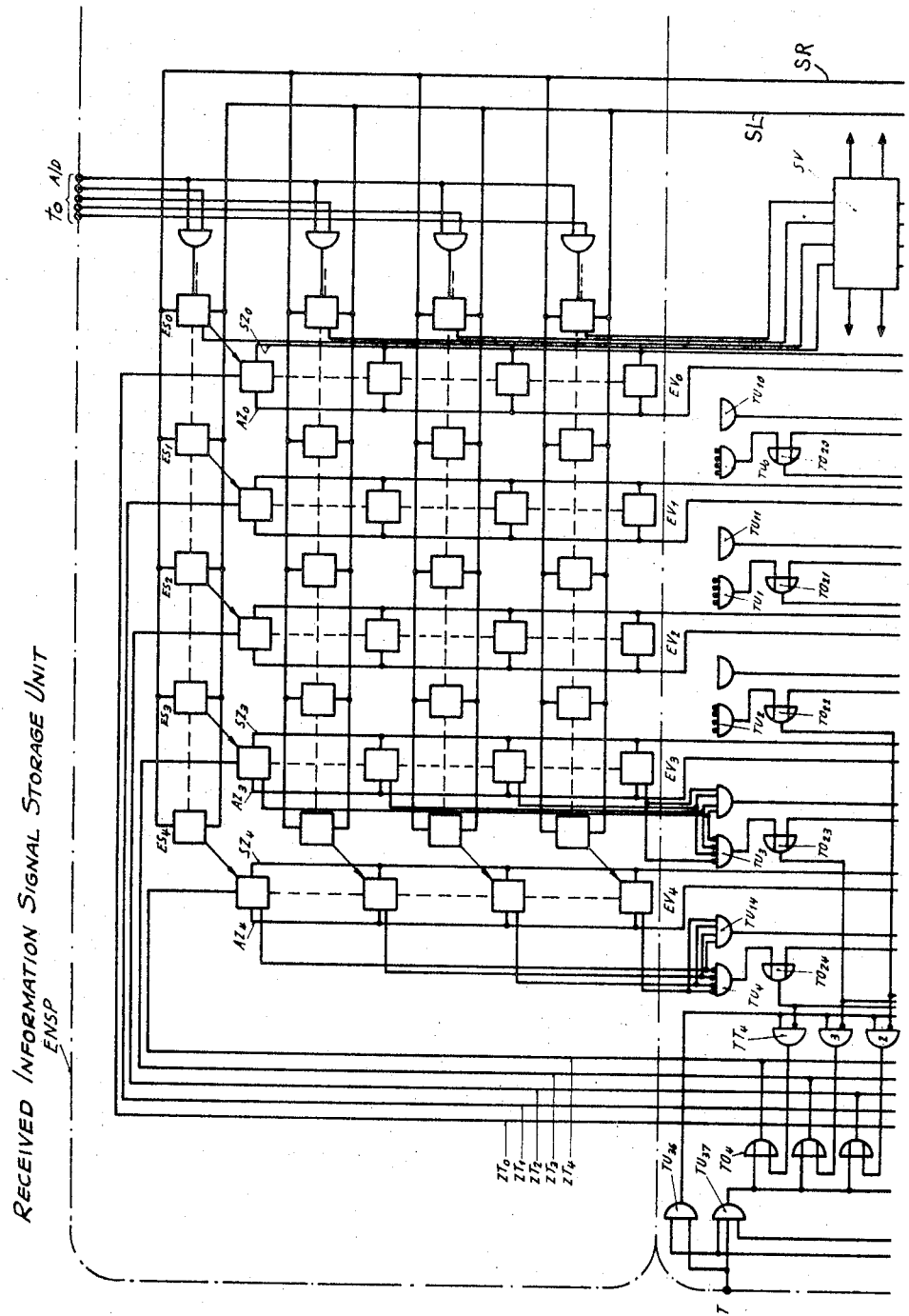
FIG. 93 is a block circuit for a variant of the receiver of FIG. 83, to provide iteration control in the sequence of the greatest differences between the received information signal and the synthesis signal.

On the basis of the receiver of FIG. 83 there was previously described the digital iteration method in which the comparison and matching is done in the sequence in which the values arrve. However it has already been shown, with reference to FIGS. 54 to 74, that the operations can be performed in a sequence such that the greatest difference in the stored range between the received information signal and the synthesis signal is each time reduced to zero by changing the pulse response function which has its maximum at this point. In the circuit of FIG. 83 this method of operation is done as follows. At the beginning of the operation there are stored in the storage units the received information signal values $ES_0$ to $ES_4$ and the synthesis signal values $SS_0$ to $SS_4$. The signal comparator now has to determine which of these five pairs of values shows the greatest difference, and this must then be corrected. Subsequently the greatest difference in the stored range is again determined and corrected. The process is repeated till the synthesis signal agrees with the received information signal entirely. FIG. 93 shows in the form of a block circuit a preferred digital version of a receiver for this method of iteration, whereby the circuit in FIG. 93 should be regarded as an extension or modification of the circuit of FIG. 83.

It should be observed that in FIG. 93 the shift register column counter is represented somewhat differently. In the circuit of FIG. 93, in contrast to that of FIG. 83, the counting pulses proper are supplied on the "counting pulse lines," while the addition counting line and subtraction counting line are activated by means of steady-state signals for the operations of adding and subtracting.

In FIG. 93 each bistable stage of the columns $ES_0$ to $ES_4$ and $SS_0$ to $SS_4$ has correlated to it a second bistable stage in one of the auxiliary column counters $EV_0$ to $EV_4$ and $SV_0$ to $SV_4$. In the figure the arrows indicate this correlation between two bistable stages. The arrows indicate that at the beginning of the comparison operation both the bistable stages of each correlated pair contain the same information.

These auxiliary column counters $EV_0$ to $EV_4$ and $SV_0$ to $SV_4$ allow comparisons to be made between the values in the two auxiliary column counters $EV_n$ and $SV_n$ (the suffix $n$ being the same), and thus allow the pair of columns showing the greatest difference to be found, without disturbing the information contained in the two storage units, for the received information signal and the synthesis signal.

The process of comparison will now be described in detail on the basis of FIG. 93. To begin with the received information signal ENS is stored in the storage unit ENSP in the manner already described on the basis of FIG. 83. On the other hand there is stored in the synthesis signal storage unit SSP the synthesis signal SYS which was developed during the preceding matching process. Before determining the greatest difference between these two signals, that is to say between the ENS signal and the SYS signal, these two signals are first fed into the auxiliary column counters $EV_0$ to $EV_4$ and $SV_0$ to $SV_4$, as already mentioned above.

Once the information has been stored in the auxiliary column counters $EV_0$ to $EV_4$ and $SV_0$ to $SV_4$, the next operation is a subtraction, which is continued until in each counter pair (the columns $EV_n$ and $SV_n$ form a counter pair, whereby the suffix $n$ is the same) one of the counters has reached the value zero, whereupon the counting sequence is stopped. For this purpose the outputs of each auxiliary column counter $EV_n$ and $SV_n$ are connected to the signal-inverting inputs of the AND gates $TU_0$ to $TU_9$, and the outputs of these gates, each corresponding to a pair of counters, are connected to the OR gates $TO_{20}$ to $TO_{24}$. (For greater clarity the figure does not show all the connections.) Let us assume that at the beginning of the subtraction process none of the values in the counters $EV_0$ to $EV_4$ and $SV_0$ to $SV_4$ are 0. Under these circumstances all the outputs of the OR gates $TO_{20}$ to $TO_{24}$ have the state logical 0 and, over the AND gate $TU_{34}$, the addition counting lines $AZ_0$ to $AZ_4$ are also given the state logical 0. Similarly over the AND gate $TU_{35}$, whose input is signal inverting, the subtraction counting lines $SZ_0$ to $SZ_4$ are given the state logical 1. The shaft count storage unit SZS has the position "count," and consequently the directive line S/Z (shift/count) has the state logical 1, with the result that the sequence T can now pass through the AND gate $TU_{36}$, and the counting sequence passes through the gates $TT_0$ to $TT_4$, and through the OR gates $TO_0$ to $TO_4$, to reach the counting lines $ZT_0$ to $ZT_4$. In all the auxiliary column counters subtraction now takes place and continues until one auxiliary column counter of each pair of counters reaches the value 0. For example, suppose that the auxiliary column counter $EV_4$ has reached the value zero. At this instant there appears a "1" at the output of the AND gate $TU_4$ and also at the output of the OR gate $TO_{24}$, and now the counting sequence for the counting line $ZT_4$ is stopped, via the gate $TT_4$, whose input is signal inverting.

In this way all the counting pulses are stopped on all the counting lines $ZT_0$ to $ZT_4$. Once this has been done there appears a "1" at the output of the AND gate $TU_{34}$, with the result that all the addition counting lines $AZ_0$ to $AZ_4$ are put into the state logical 1 and, over the AND gate $TU_{35}$, all the subtraction counting lines $SS_0$ to $SS_4$ are put into the state logical 0. At the same time the AND gate $TU_{37}$ is also opened for the sequence T, with the result that the subsequent pulses pass through the OR gates $TO_0$ to $TO_4$ to reach all the counting lines $ZT_0$ to $ZO_4$, and addition takes place in the auxiliary column counters $EV_0$ to $EV_4$ and $SV_0$ to $SV_4$. At the end of the subtraction process one auxiliary column counter of each pair has reached the value 0 while the other column of the pair contains the difference between the initial values in the pair of columns. The next process is addition, in order to discover which pair of columns previously contained the greatest difference. This will be indicated by the column which first reaches the column value 1.

For this purpose there are used the AND gates $TU_{10}$ to $TU_{19}$, whose outputs are connected in pairs to the inputs of the OR gates $TO_{25}$ to $TO_{29}$. A "1" will appear at the output of one of these AND gates as soon as one of the corresponding column counters has reached the column value 1, whereupon the correlated bistable stage BS is put into the state 1. As the outputs of the bistable stages $BS_1$ to $BS_4$ are connetced to the OR gate $TO_{38}$, there also appears at the output of this OR gate a "1," which alters the shift-count storage unit SZS from the state "count" into the state "shift," with the result that now the AND gates $TU_{34}$ to $TU_{37}$ are blocked, because the line S/Z is in the state logical 0. In consequence the counting sequences on the counting lines $ZT_0$ to $ZT_4$ are stopped, and all the addition and subtraction counting lines of the column counters are changed over into the state logical 0.

Once the pair of column counters containing the greatest difference has been found, which is indicated by the fact that the corresponding bistable stage $BS_n$ is in the state logical 1, the two corresponding values in the columns $ES_n$ and $SS_n$ must be shifted to the right into the columns $ES_0$ and $SS_0$, in order to make the comparison.

For example suppose that the greatest difference has been found between the auxiliary column counters $EV_4$ and $SV_4$, which was indicated by a "1" in the bistable stage $BS_4$ ($BS_0$ to $BS_3$ are in the state 0). The information in the storage columns $ES_4$ and $SS_4$ must now be shifted to the right into the columns $ES_0$ and $SS_0$. To effect this shift the logical 1 of the bistable stage $BS_4$ opens the gate $TO_{39}$ over the OR gate $TO_{38}$, with the result that the gate $TT_5$ allows the pulse T to pass to the shift line SR. With the pulses on the shift line SR the entire information content in the storage columns $ES_0$ to $ES_4$ and $SS_0$ to $SS_4$ is shifted to the right, whereby beyond the columns $ES_0$ and $SS_0$ there are still further storage columns, not shown in the figure, for receiving the information. The bistable stages $BS_0$ to $BS_4$ are also grouped together to form a shift register, as indicated by the broken horizontal lines in the figure, and the "1" in stage $BS_4$ is shifted along, parallel with the information in $ES_4$ and $SS_4$, and used for controlling the shifting process. After the fourth shifting pulse the "1" which had been previously set into the stage $BS_4$ has now arrived in the stage $BS_0$, with the result that the gate $TT_5$ is blocked, over the gate $TO_{39}$ (with inverting input), and this stops any further shifting pulses on the line SR, whereby the shifting process is interrupted. The information in the storage stages of $ES_4$ and $SS_4$ has now arrived, as was desired, in the storage stages of $ES_0$ and $SS_0$ for effecting the comparison.

The next requirement is that the synthesis signal SYS stored in the storage column $SS_0$ must be matched to the received information signal ENS in the column $ES_0$, whereby these two signals show the greatest difference of all the signals in the entire storage range. To effect this matching process control is provided by the signal comparator SV, just as it was in the case of the iteration receiver of FIG.

83. At the same time the corresponding pulse value in the pulse value storage unit IWSP is of course also changed correspondingly, and in the synthesis signal storage unit SSP the side values of this pulse are superposed according to the stored pulse response funtion IAF, as has already been described with reference to FIG. 83.

After the completion of the matching process, the greatest difference between the synthesis signal SYS and the received information signal ENS is once more determined in the same way as before, and the synthesis signal is again matched to the received information signal at this position. This process is repeated until the synthesis signal SYS agrees with the received information signal ENS over the entire storage range. This is usually achieved in fewer steps than are required by the iteration receiver of FIG. 83. Finally the pulse value which was first received and which was accurately determined by iteration, becomes shifted into the stage $IW_5$ of the pulse value storage unit IWSP (FIG. 83) for further processing.

The entire matching of the synthesis signal SYS to the stored received information signal ENS must take place within one timing period $T_S$, and at the end of this period $T_S$ the ulse value first received in the storage range is delivered. With the beginning of the next timing period the next received amplitude value of the received information signal ENS becomes stored in the received information signal storage unit ENSP, and then again the synthesis signal is matched to the newly stored range of the received information signal, as already described, and within one timing period, and a new pulse value is delivered, and so forth.

If the iteration receiver of FIG. 83, in which iteration is performed in the sequence of the pulses one after the other, is compared with the receiver of FIG. 93, in which the iteration is performed in the sequence of the greatest difference in the stored range, it becomes evident that the latter receiver requires in its two storage units ENSP and SSP, for the received information signal and for the synthesis signal, practically twice as many storage positions for example the auxiliary column counters EV and SV. In addition there is also required a control circuit for operating these auxiliary column counters, and to shift the signals containing the greatest difference into the comparison position ($ES_O$, $SS_O$).

Returning now to FIG. 89, the following considerations apply to the pulse frequency.

Within one timing period $T_S = 1/f_S$ the folowing processes must take place: four iteration counts (sequences TV), four shifts towards the right and five shifts towards the left, and one setting of the new signal value. If instead of this there were performed 10 iterations in each timing period (practical experience has shown that this is already quite a high number) and if there are used for example 32 amplitude steps, one could for example obtain the following numbers of pulses for each element of information received:

| (1) Iteration | 32 counting steps (TV) |
| (2) Iteration | 20 counting steps (TV) |
| (3) Iteration | 14 counting steps (TV) |
| (4) Iteration | 10 counting steps (TV) |
| (5) Iteration | 8 counting steps (TV) |
| (6) Iteration | 6 counting steps (TV) |
| (7) Iteration | 4 counting steps (TV) |
| (8) Iteration | 3 counting steps (TV) |
| (9) Iteration | 2 counting steps (TV) |
| (10) Iteration | 1 counting step (TV) |
| Total | 100 counting steps (TV) |

In addition to this there are 10 shifting steps to the right, 11 shifting steps to the left and one setting step, making altogether 122 steps. If there were as a maximum 150 steps to be performed during the timing period $T_S = 1/f_S = 0.15$ msec. $= 150$ μsec., then one would have to perform one step per μsec., coresponding to a pulse frequency of 1 Mc/S. This is not an excessively high frequency, in view of the fact that today's state of the art in computer technology allows frequencies up to 5 Mc/S to be handled without difficulty.

A prerequisite for the correct functioning of the iteration receiver is correct reception and storing of the reference or standard pulse response function.

The three chief conditions which must be satisfied will now be described with reference to FIG. 79.

In this figure a standard pulse I of width $T_S = 1/f_S$ and height $U_E$ (FIG. 79, $b$) is applied to the input $U_E$ of an information channel ($a$) functioning as a bandpass filter. At the output there appears the pulse response function $U_A$ whose maximum value is $\hat{A}$ (FIG. 79, $c$). The pulse is sent out in the sender time grating ZRS which has grating intervals $T_S = 1/f_S$. During the operational transmission of coded information the individual pulses of the information signal will be in this time grating.

The first requirement for correct reception of the pulse response function is the corect phase position of the receiver time grating ZRE. The two time grating frequencies at the sender and receiver ends of the channel, that is to say the timing frequency $f_S = 1/T_S$, present no problems in regard to constancy and accuracy, because both are determined by local quartz controlled oscillators. The phase position of the ZRE must be such that a time grating line passes through the maximum $\hat{A}$ of the pulse response function, and this phase position must be established before the reception and storing of the pulse response function. The absolute value of the delay $t_{VA}$ plays only a secondary role, what is most important is the phase position $\gamma$. The relative phase position between the sender time grating ZRS and the receiver time grating ZRE must be the same during the subsequent operational transmission of information as it is during the reception of the pulse response function.

The second requirement is that the pulse response function must be received in the correct "size." This must be such that on the one hand the required number of amplitude steps and, on the other hand, the peaks of the pulse response function must not pass beyond the amplitude range of the synthesis signal storage unit, but should just about fill it. A given height $U_E$ of the transmitted pulse must produce a particular height in the maximum $\hat{A}$ of the pulse response function, and this ratio of $UE/\hat{A}$ must not change during the subsequent operational transmission. This can always be obtained by using a signal level control of the known kind. For example before the pulse response function is received there can first of all be sent a short test programme, whereby the adjustment value for the level adjustment is determined, and is kept constant for the reception of the pulse response. This operation can of course be performed entirely automatically.

The reception and storing of the pulse response function requires that the individual values $A_{+2}$, $A_{+1}$, $\hat{A}$, $A_{-1}$, $A_{-2}$, $A_{-3}$ . . . (FIG. 79, $c$) on the grating lines of the time grating ZRE must be received and stored. As the correct reception and storing of the pulse response function is decisive for the entire subsequent operational transmission, it would not be sufficient to base this operation on a single and not repeated transmission, because this would involve the risk that a single disturbance could make the following operational transmission impossible.

The third requirement is thus that for the pulse response function there must be used a sufficiently often repeated transmission, preferably by repeated sending out for example 16 times of the standard pulse I, and using "integrating" reception, as will be described below. This method has the advantage that it is comparatively simple, and the further advantage that the apparatus required is already available in the digital iteration receiver. The automatic reception of the pulse response function can be performed in fractions of seconds.

Iteration reception considerably facilitates telephonic communication over networks which have greatly differing channel characteristics, because in many cases it is not necessary to correct channel distortion.

In what follows there will now be described, as an example, one possible method for automatic reception of the pulse response function.

Figure 94:
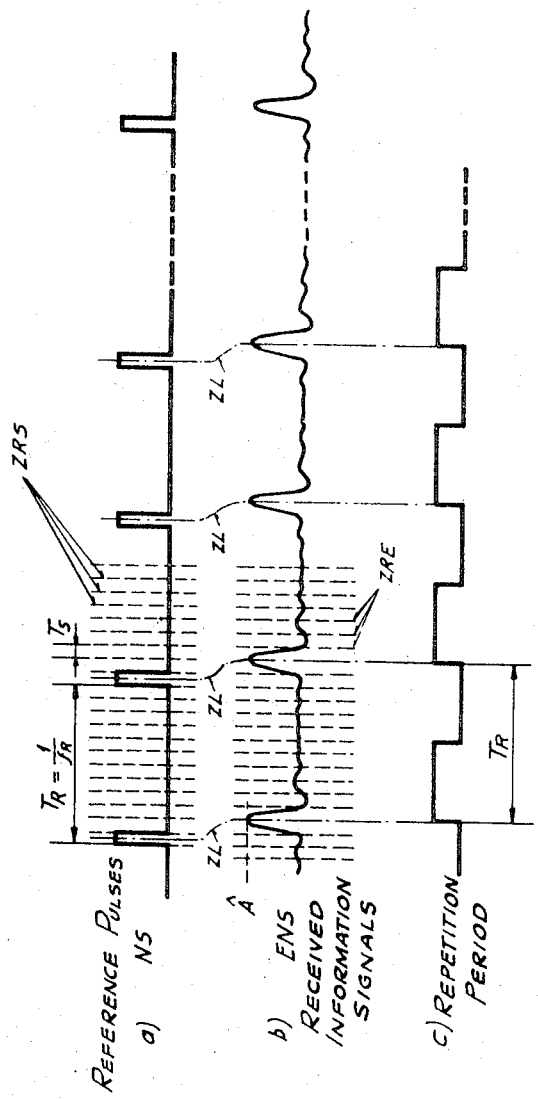
FIG. 94 shows at $a$, $b$ and $c$ pulse diagrams for clarifying the reception of the pulse response function.

In this process there are fed in at the sender end standard reference pulses of known characteristics, while at the receiver end the response functions are scanned by suitable means and stored. In this way the pulse response function of the transmission channel is received and stored. In order to eliminate as far as possible all disturbing influences, there is formed the integral or average value of several pulse response functions received by repetition one after the other, in particular 8 or 16 pulse response functions. FIG. 94 shows the reference pulses sent out by the sender at the repetition frequency $f_R$. Diagram $b$ shows the responses produced by a transmission channel of lowpass character. The repetition period $T_R$ has been chosen to be great enough to allow a pulse response to complete its decaying process before the arrival of the next pulse response, in order to ensure that the individual pulse responses do not interfere with each other. It is assumed that the second condition is satisfied of providing correct amplitudes at the receiver by amplitude level control as hereinbefore described with reference to FIG. 83.

The storing of the individual values of the pulse response function takes place in the receiver time grating ZRE. The first requirement is therefore that the receiver time grating ZRE must be synchronized with the sender time grating, in such fashion that one of the grating lines of ZRE passes through the pulse response maximum.

Figure 95:
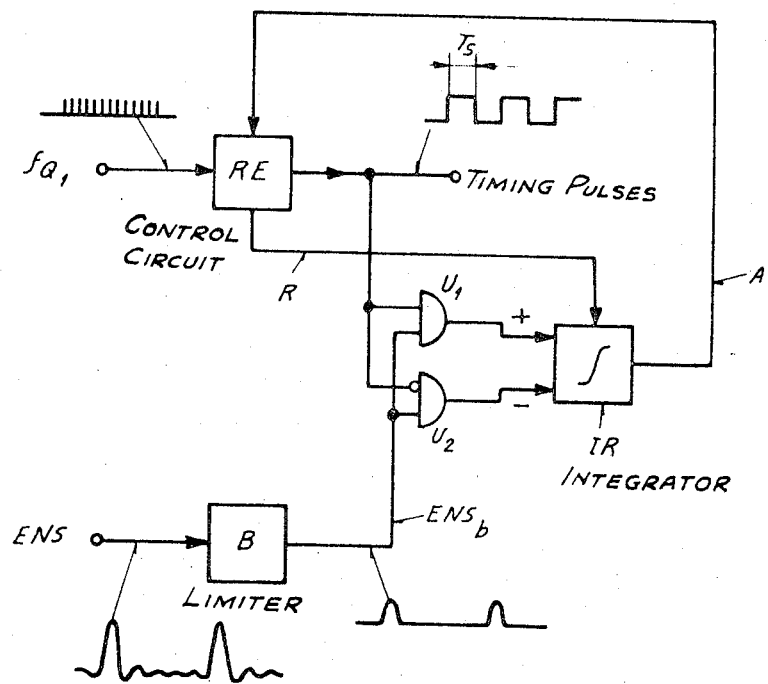
FIG. 95 is a block circuit for a device for synchronising the receiver time grating for the reception of the pulse response function.

FIG. 95 shows a circuit which can be used for synchronising the receiver time grating ZRE. This circuit consists substantially of the control circuit RE and a circuit for producing the controlling value A, this latter circuit consisting of the two AND gates $U_1$ and $U_2$ and the integrator IR.

Figure 96:
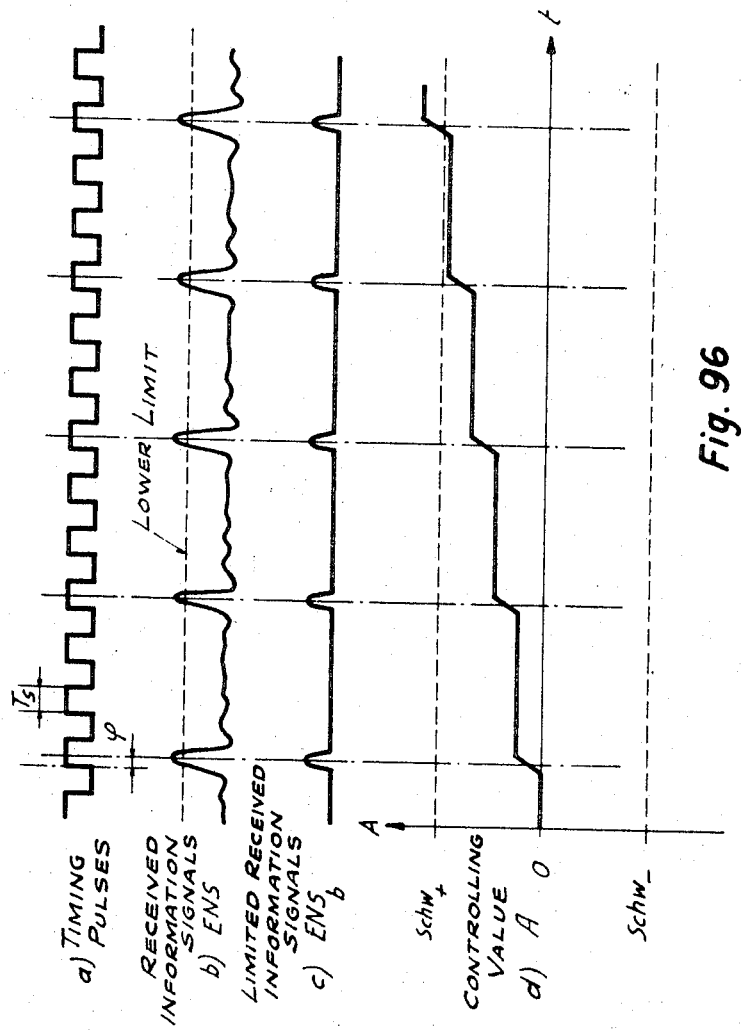
FIGS. 96 to 99 are pulse diagrams for clarifying the method of functioning of the device of FIG. 95.

As soon as the controlling value A reaches its threshold value $Schw_+$ as shown in FIG. 96, the control circuit RE causes a delay in the phase of the timing pulses, whereas when the controlling value reaches its threshold $Schw_-$, the control circuit RE causes the phase of the timing pulses to advance relative to the received pulses. Circuits with these properties are in themselves already known and in what follows it will therefore only be necessary to describe the production of the controlling value A.

Figure 97:
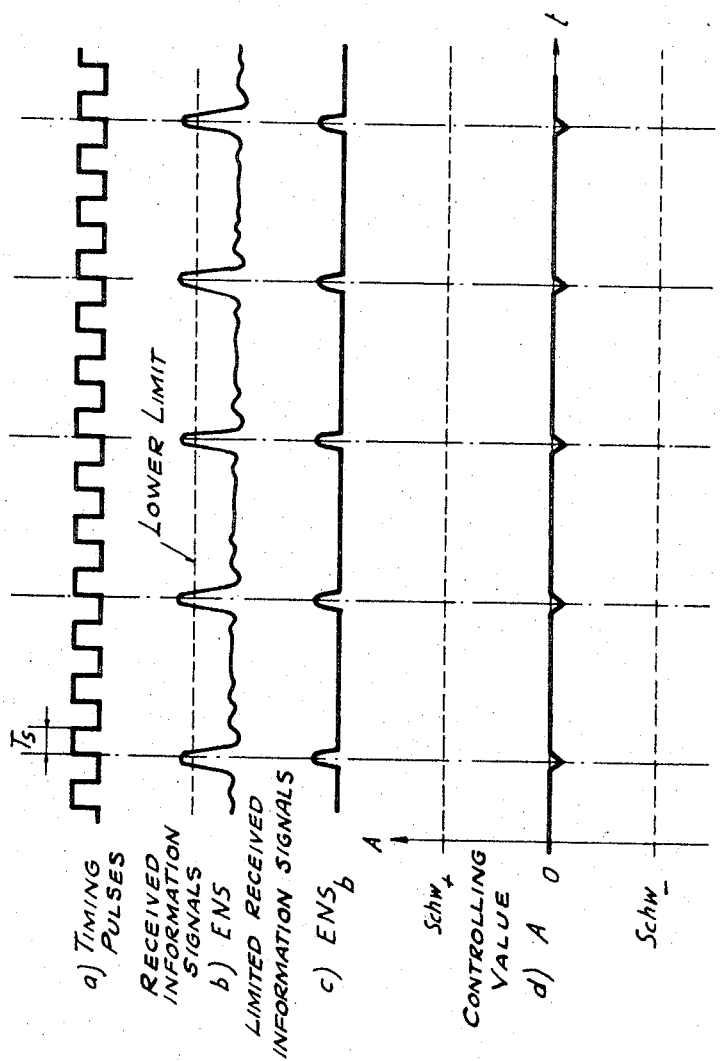
Figure 98:
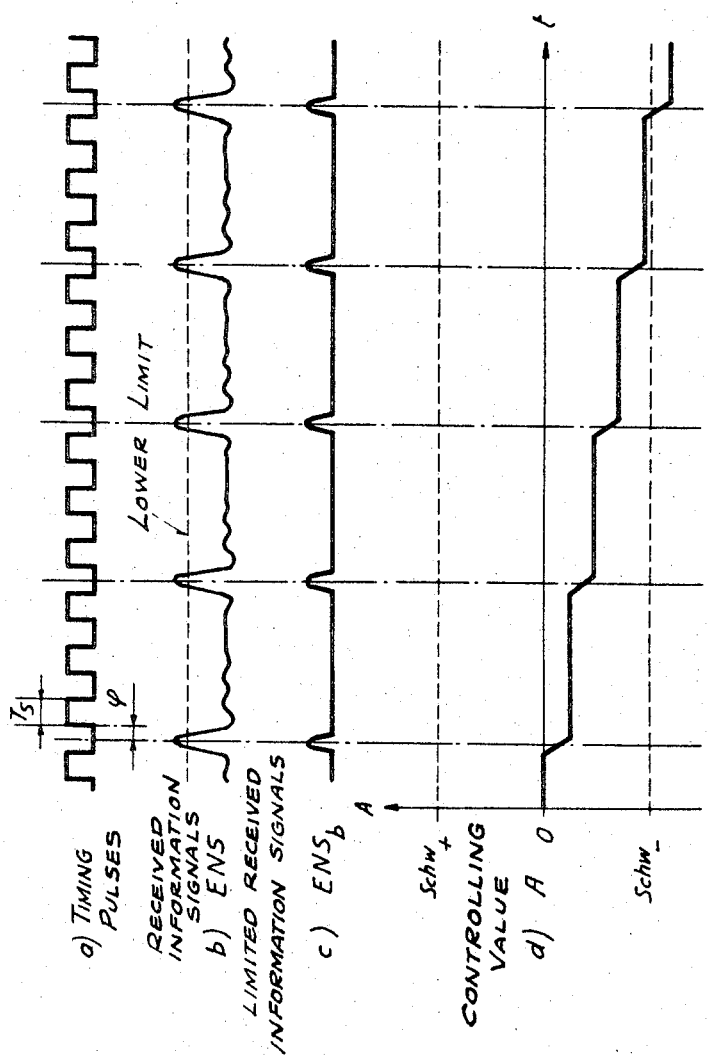

To effect synchronisation there are sent out by the sender reference pulses repetitively as shown in FIG. 94, diagram $a$. The received information signal, as shown in diagram $b$, is fed into the limiter B (FIG. 95), which cuts off the signal at a lower limit and thus gives out only the peaks of the pulse response function. FIGS. 96 to 98 each show in diagram $b$ the received information signal ENS, and in diagram $c$ the limited signal $ENS_b$ as it appears at the output of the limiter. The limited received information signal $ENS_b$ is compared in the AND gates $U_1$ and $U_2$ (FIG. 95) with the timing pulses. The AND gate $U_1$ produces pulses whenever the pulses of the signal $ENS_b$ coincide with the positive half cycles of the timing pulses, while the AND gate $U_2$ produces pulses when the signal $ENS_b$ coincides with the negative half cycles of the timing pulses. The pulses from the AND gates $U_1$ and $U_2$ are integrated in the integrator IR, the pulses from the AND gate $U_1$ with positive sign and those from the AND gate $U_2$ with negative sign (FIG. 95 indicates this at the inputs of the integrator). There is thus produced the controlling value A, which controls the control circuit RE.

With reference to the time diagrams of FIGS. 96, 97 and 98 there will now be considered the production of the controlling value A for three different correlations between the timing pulses and the received information signal ENS.

FIG. 96 shows what happens when the clock pulse generator at the receiver is in advance of the received reference pulses. In this case the pulses of the limited received information signal $ENS_b$ occur during the positive half cycles of the timing pulses, with the result that the AND gate $U_1$ (FIG. 95) produces pulses which the integrator IR integrates with positive sign. This is shown in diagram $d$ of FIG. 96. In the present example the controlling value A reaches its threshold $Schw_+$ after five pulse response functions have been received, and after this, one pulse of the timing signal $f_{Q1}$ (FIG. 95) is suppressed. At the same time, over the line R, the controlling value A is brought down to a little below the threshold value, in order to prevent oscillation of the controlling system. This suppression of one pulse of the frequency $f_{Q1}$ delays the phase of the timing pulse by the small amount $(1'/f_{Q1})$. If this is not enough to entirely correct the phase shift, the controlling value A increases again and, after once more reaching the threshold value $Schw_+$, causes the suppression by the control circuit RE of a further pulse of the signal $f_{Q1}$, and this process is repeated till the entire phase shift has been corrected by small steps to the value $1/f_{Q1}$. FIG. 97 relates to the case where the phase shift is zero. In this case the pulses of the limited received information signal $ENS_b$ are exactly symmetrical to the positive going timing pulse. As a result there now appear on both the AND gates $U_1$ and $U_2$ (FIG. 95) the same pulses, and the integral is zero (FIG. 97, diagram $d$). In this case therefore no correction is made.

FIG. 98 represents the case where the clock pulse generator produces timing pulses which are lagging the received reference pulses. In this case the pulses of the signal $ENS_b$ occur in the negative half cycles of the timing pulses, and are applied to the AND gate $U_2$. These pulses are integrated in the integrator IR with negative sign, whereby after the threshold $Schw_-$ is reached the control circuit RE introduces a pulse, which advances the timing pulse period by the amount $1/f_{Q1}$ (FIG. 95), whereby at the same time the controlling value A reduced to a little below the threshold value.

It is important that the synchronisation must not be influenced by disturbing influences arriving with the information signal over the transmission channel. Distortions of this kind are statistically distributed, that is to say during a sufficiently long interval the distortions arrive in equal numbers in the positive and negative regions. These distortions are integrated with opposite signs and in consequence their influence on the controlling value A is practically nil. By choosing a sufficiently large threshold value ($Schw_+$ and $Schw_-$) one can ensure that the statistical variations introduced by the distortions into the controlling value A do not give rise to a correction.

In order to prevent small asymmetries from being integrated all the time with the production of a correction, the integrator is given a "discharge time constant," which causes a centralising towards zero.

Figure 99:
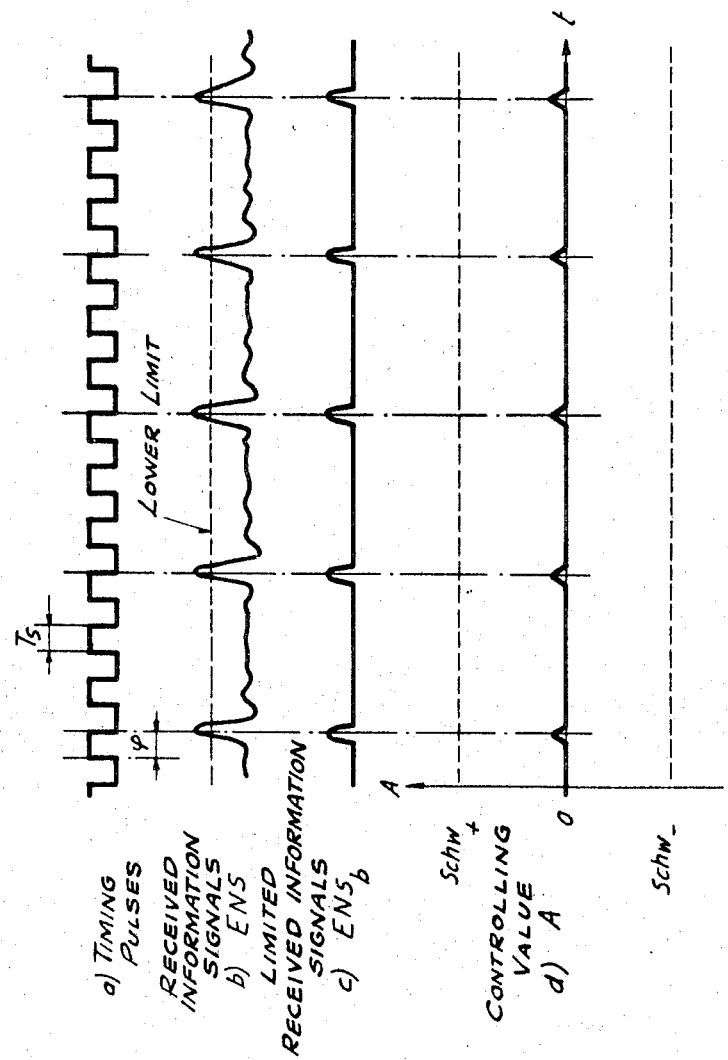

The circuit of FIG. 95 has, in addition to the stable state with phase shift $\gamma=0$, also a second state in which the controlling value A is also zero. This state occurs when the pulses of the limited received information signal $ENS_b$ are symmetrical to the negative going timing pulse. FIG. 99 shows how under these circumstances the integral is zero, even though there is a phase shift. However, as soon as there is a small amount of asymmetry between the positive and negative integrated pulses, the controlling value A increases, whereby the clock pulse generator is pulled out of this false synchronisation. In the case of very accurate clock pulse generators at the sending and receiver ends, this recovery process can, under certain circumstances take a long time. It is therefore necessary to take measures to prevent this latter state from occurring (FIG. 100).

Figure 100:
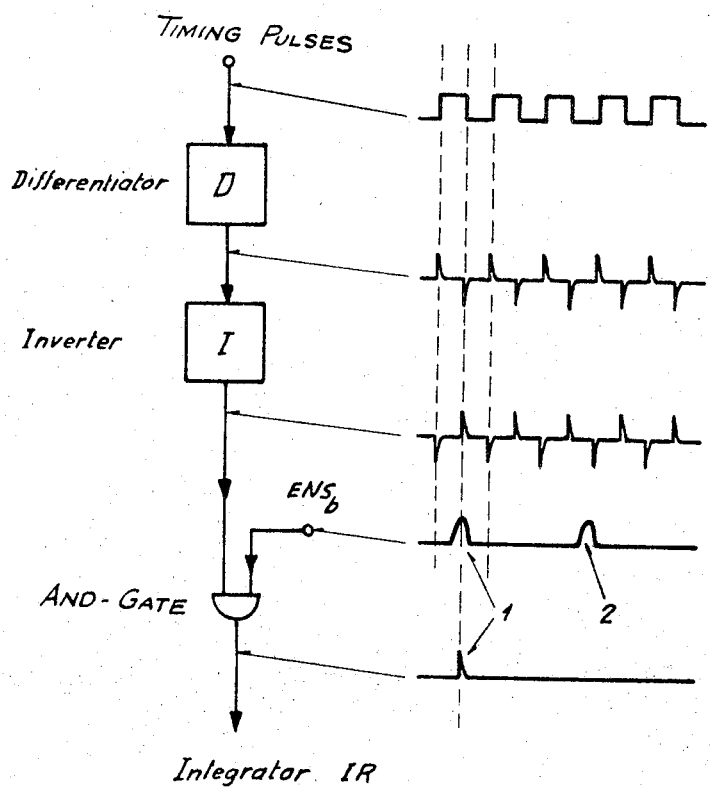
FIG. 100 is the block circuit of an arrangement for preventing the apparatus of FIG. 95 from adopting an unstable position, and also shows pulse diagrams for clarifying the method of functioning of this circuit.

In the circuit of FIG. 100 pulses are produced when the pulse of the limited received information signal $ENS_b$ coincides with the negative going timing pulse. For this purpose the timing pulses are differentiated in the differentator D, and the output signal from this differentiator is phase rotated through 180° in the inverter I. The output signal from the inverter thus gives positive pulses during negative going timing pulses, and these positive pulses are fed to the AND gate. The pulses of the limited received information signal $ENS_b$ are fed to the second input of the AND gate, with the result that this AND gate produces pulses only when a pulse of the limited received information signal $ENS_b$ coincides with the negative going timing pulses (pulse 1). No output signal is given under any other circumstances (pulse 2).

The pulses from the circuit of FIG. 100 also control the integrator IR of FIG. 95, with the result that the circuit is immediately taken out of its incorrect synchronize state, and thus the clock pulse generator at the receiver end is now correctly synchronised.

After synchronizing the transmission and reception of the reference pulses, it is still necessary to synchronize the time grating for the repetition at the receiver end of the information pulses ($T_R$ in FIG. 94c). The positive flanks of the pulses of the repetition sequence must also coincide with the maximum amplitude of the pulse response. In view of the fact that the repetition sequence $T_R$ is obtained by counting down from the pulses having a period $T_s$, the positive flanks are automatically on the lines of the receiver time grating ZRE. It follows that in the correction of this time grating the shifting forwards or backwards must be done only in whole cadence periods. This can very well be done using an analog circuit somewhat similar to that used for synchronising the receiver time grating as shown in FIG. 95. However in this case instead of feeding the frequency $f_{Q1}$, there is fed the cadence frequency $f_S$ into the control circuit. The operation of the control circuit is such that in the uncorrected case the frequency of the repetition sequence is produced. The pulses of the limited received information signal $ENS_b$ and of the repetition sequence $T_R$ are compared with each other for phase position in the AND gates $U_1$ and $U_2$, and by means of the integrator IR there is produced a control value which ensures that the positive flank of the pulse of the repetition sequence coincides with the maximum amplitude of the pulse response.

Figure 101:
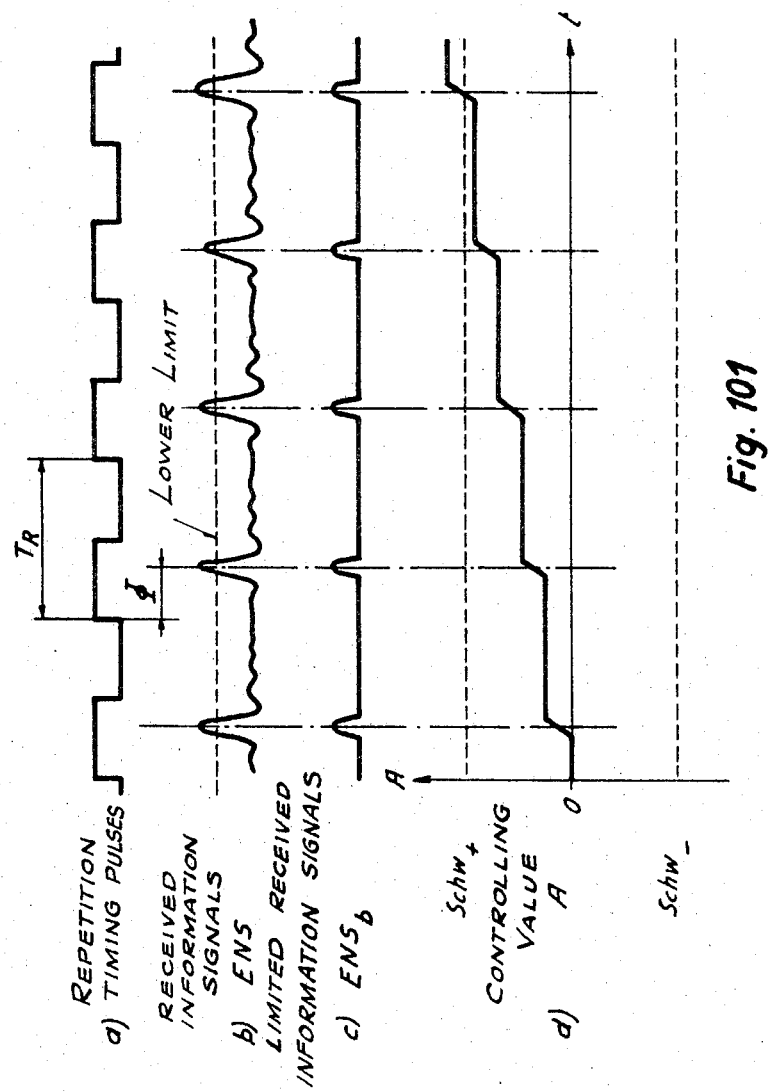
FIG. 101 shows pulse diagrams for clarifying the synchronisation of the clock pulses, for receiving the pulse response function.

FIG. 101 represents the case where the repetition sequence is early. The pulses of the limited received information signal occur in the positive range of the timing pulse. As a result there occurs a positive controlling value A, as was the case in the pulse phase synchronisation. When this positive controlling value A exceeds the threshold value $Schw_+$ one pulse is suppressed, with the result that the repetition frequency $T_R$ is delayed by the period $T_s$. This process is repeated until the maximum amplitudes of the pulse response functions coincides with the positive flanks of the pulses of the repetition frequency, as shown in diagram c of FIG. 94. The suppression is performed in the manner already described with reference to FIG. 98. Moreover what has already been said about the ineffectiveness of the statistically distributed distortion pulses, and about the unstable state at the negative flank of the repetition pulses, also applies here. In this case the unstable state can also be prevented by using the measures represented in FIG. 100. However, instead of feeding the pulses there must now be fed the pulses of the repetition frequency into the differentiator.

The requirements for storing the pulse response function are thus satisfied, that is to say the synchronisation of the pulse phase and of the repetition pulses is ensured. There will now be described the process of storing the pulse response function.

Figure 102:
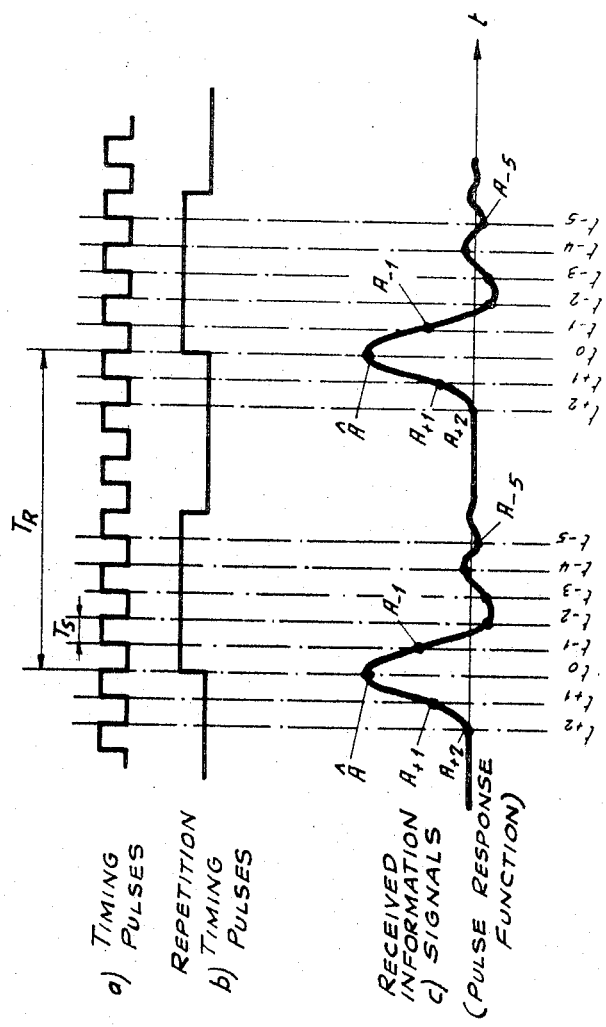
FIG. 102 shows at $a$, $b$ and $c$ pulse diagrams for clarifying the reception of the pulse response function.

In the example of FIG. 102 there are stored two values before the maximum amplitude $\hat{A}$, and five values afterwards, making a total of eight values. These values are the pulse values $A_{+2}, A_{+1}, \hat{A}, A_{-1} \ldots A_{-5}$ at the times $t_{+2}, t_{+1}, t_0$ up to $t_{-5}$. For this there are required practically all the parts of the iteration receiver as represented for example in FIG. 83, with the exception of the pulse multiplicator device IAE. The situation at the start of the process is that the synthesis signal storage unit SSP contains the number 8, corresponding to the reference line for transmission of altogether 16 amplitude steps, while in the pulse value storage unit IWSP the number 0 has been set. At the end of the process the pulse response function is stored in the pulse value storage unit IWSP, and from there it must subsequently be set into the pulse response storage unit IASP.

Figure 103:
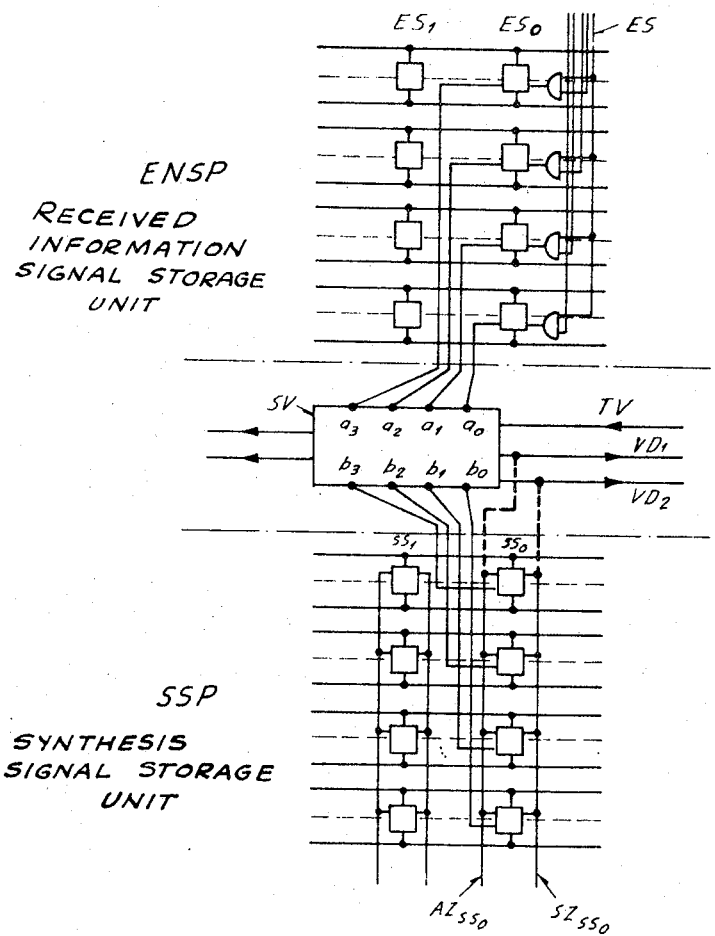
FIGS. 103, 104 show parts of the block circuit of FIG. 87, with the extensions required for receiving the pulse response function.

In what follows there will now be described the process of storing a pulse response function. The analog-to-digital converter A/D of FIG. 83 continuously converts the received information signal ENS into the digital form, and this is supplied by the counter KZA. A pulse on the line ES at the instant $t_{:2}$ (FIG. 102) now causes the chief amplitude value to be stored in the stage $ES_0$ of the received information signal storage unit ENSP. After this, the amplitude value stored in the stage $ES_0$ is compared by the signal comparator SV with the value in the stage $SS_0$, which has been set to represent 8. A pulse is now applied to the outputs $VD_1$ or $VD_2$, according to whether $ES_0$ is greater or smaller than $SS_0$. For this purpose the output $VD_1$ is connected to the addition counter line $AZ_{SS_0}$, and the output $VD_2$ is connected to the subtraction counter line $SZ_{SS_0}$, as shown in FIG. 103 in thick broken lines, whereby FIG. 103 represents a part of FIG. 83. In practice this connection is of course controlled by gates which are themselves controlled by a controlling device. As already mentioned, during the storing of the pulse response function, the pulse multiplicator unit is out of action, and therefore no pulses from here can reach the addition or subtraction counting lines.

The connections are arranged in such a way that pulses are applied to the line $VD_1$ whenever the amplitude value stored in the stage $ES_0$ is greater than 8 (the amplitude value of the reference line), and these pulses are fed to the addition counting line $AZ_{SS_0}$. The number of pulses applied corresponds exactly to the difference, that is to say to the true amplitude value of the pulse response function at this instant. This is because after these pulses have been counted upwards in the counter column $SS_0$, both the stages contain the same number and consequently the signal comparator SV ceases to provide any further pulses to the line $VD_1$. In the opposite case, that is to say if the amplitude value stored in the stage $ES_0$ is less than 8, pulses are applied over the line $VD_2$, and here again the number of pulses applied corresponds to the difference between the two values being compared. However in this case the counting must be done negatively, because the stored amplitude value is less than that of the reference line.

Thus the number of pulses applied to the lines $VD_1$ and $VD_2$ corresponds to the stored amplitude value of the pulse response function, whereby the pulses on the line $VD_1$ represent positive amplitudes and those on the line $VD_2$ represent negative amplitudes.

These pulses are counted together with the stage $IW_0$ of the pulse value storage unit IWSP, and consequently the amplitude at the instant $t_{+2}$ (FIG. 102) is stored in the stage $IW_0$ (FIG. 83). This counting and storing takes place of course extremely rapidly and is finished before the arrival of the next amplitude value for storing. Subsequently a shifting pulse on the line SL shifts the information in the shift register IWSP one step towards the left, leaving the stage $IW_0$ free for storing the second amplitude value (instant $t_{+1}$) of the pulse response function. The first amplitude value is now stored in the stage $IW_1$.

The second and further amplitude values are stored similarly. During the storing of the pulse response function the stages $IW_2$, $IW_1$ to $IW_E$ (altogether 8 stages) of the pulse value storage unit are connected into a ring, to the effect that after the eighth shifting pulse on the line SL the stored value for the instant $t_{+2}$ is now again in the stage $IW_0$. This ring is shown in broken lines in FIG. 104, which is a part of the circuit of FIG. 83.

Subsequently the synthesis signal storage unit SSP is put back again into its initial position, that is to say the amplitude value 8 is set. The previously received pulse response function is now stored only in the pulse value storage unit IWSP.

Figure 104:
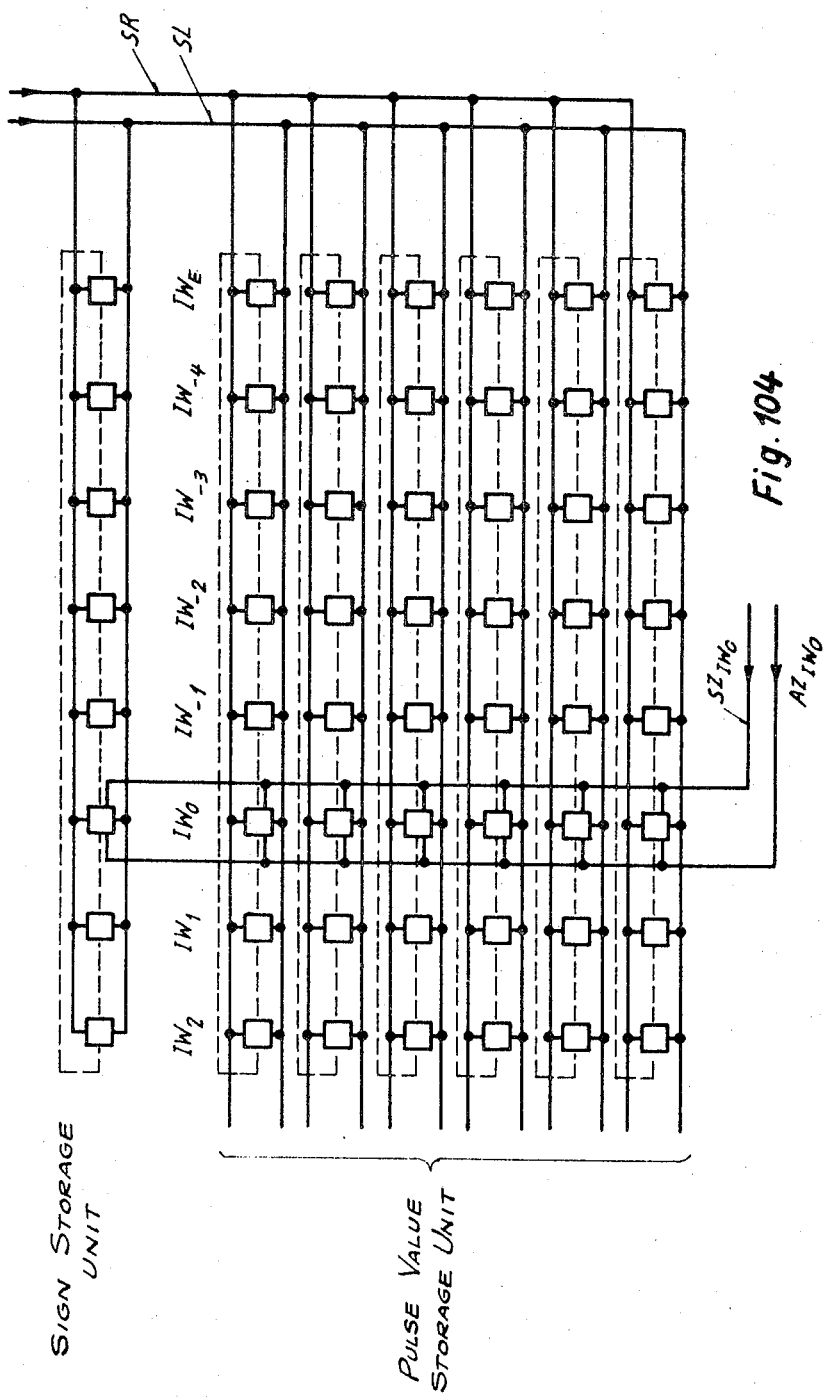

The second pulse response function is stored in the same manner as the first. The newly determined amplitude values of the second pulse response function are simply added into the already stored amplitude values, for the same instant of time, of the previous pulse response functions. The counting capacity of the storage columns of the pulse value storage unit IWSP must therefore be capable of containing eight times the highest amplitude step, in our example $8 \times 8 = 64 = 2^6$, that is to say there must be six binary stages. In order to receive the pulse response functions of the pulse value storage unit of FIG. 83 we must therefore add a further two binary stages (FIG. 104).

After the eighth received pulse response function there are therefore stored in the pulse value storage unit IWSP the sum of eight pulse response functions, and all these must subsequently be transferred into the pulse response storage unit IASP.

Moreover a further storing stage is required in the pulse value storage unit IWSP in order to mark the sign of the stored amplitude values. This storage stage is shown in FIG. 104 as the sign storage unit. The activation of this storage stage is effected directly by the addition counting line $AZ_{IW_0}$ or the subtraction counting line $SZ_{IW_0}$. In the presence of positive amplitudes, that is to say when there are counting pulses on the addition counting line $AZ_{IW_0}$, the sign storage stage is set into the state "1," whereas in the presence of negative amplitudes, that is to say when there is a counting pulse on the subtraction counting line $SZ_{IW_0}$, the sign storage unit is set into the state "0." The sign is shifted along the line in parallel with the amplitude values.

The final phase in the storing of the pulse response function is the transfer of the pulse response function stored in the pulse value storage unit IWSP to the pulse response storage unit IASP. At this point it should be observed that effectively the sum of the 8 pulse response functions is stored. There are now two alternative procedures, either each sum must be divided by 8, which gives the average value of the 8 received pulse response functions, or alternatively, in order to minimise the approximation errors in the operation of the iteration receiver, the pulse response functions can be stored in a finer amplitude grating, for example a grating with 32 or even 64 amplitude steps, instead of only 8. If 64 amplitude steps are used the function stored in the pulse value storage unit could be taken over directly, whereas if 32 amplitude steps one has to divide by two. However, if the synthesis signal is developed using these finer amplitude divisions, the subsequent operation of the iteration receiver would require that the synthesis storage unit SSP must also have more binary stages in each column.

In FIG. 83 the pulse response storage unit IASP is shown in the simplest possible way, in order to facilitate the description of the iteration receiver. In the practical apparatus the pulse programmes are however not stored in storage columns correlated directly to the outputs. All the necessary programmes are stored together and then, by means of suitable circuit devices, for example multipoint commutator switches, each programme can be processed as desired from each output.

Figure 105:
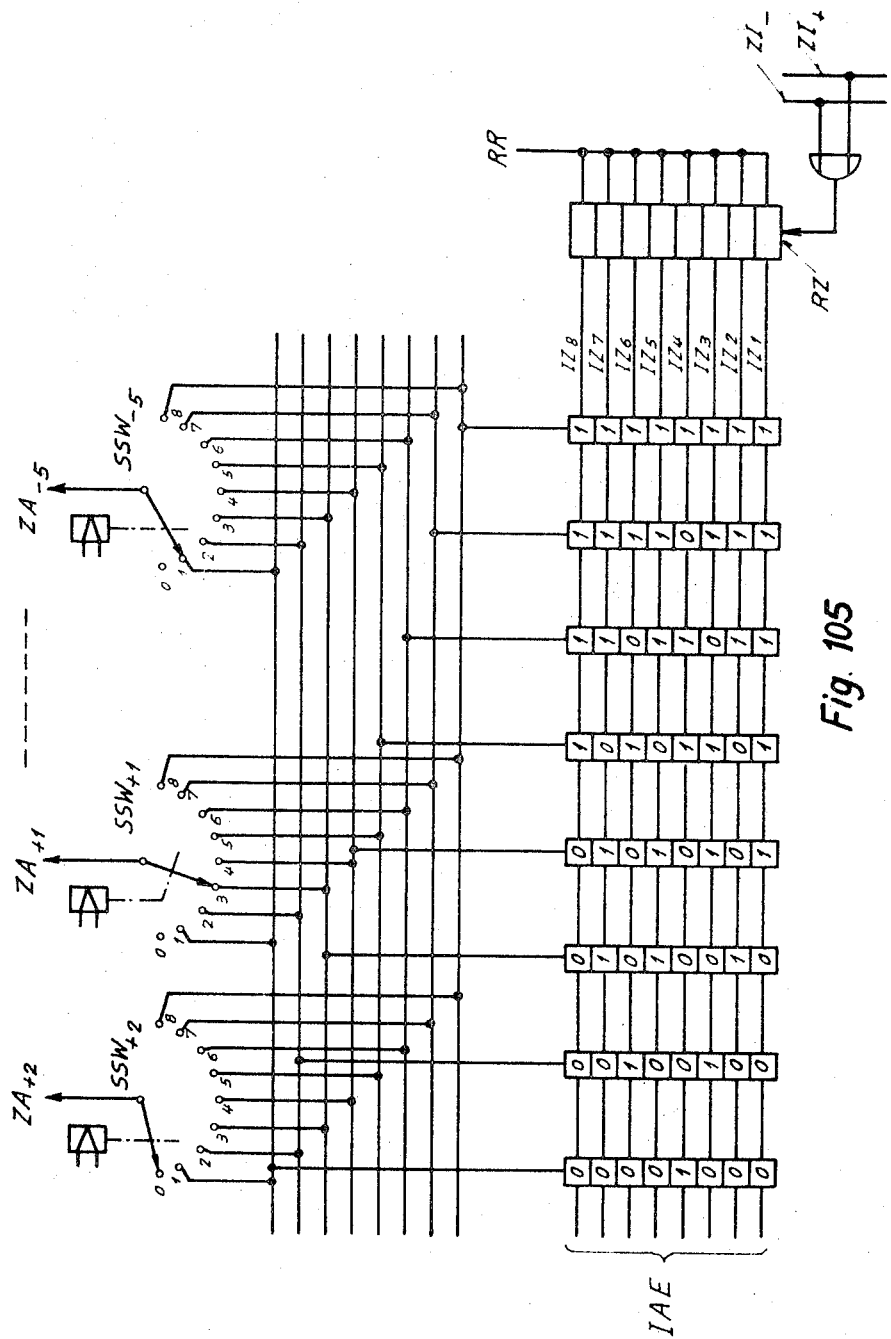
FIG. 105 shows a pulse response function storage unit.

FIG. 105 shows an arrangement for this purpose. All 8 possible programmes, using 8 amplitude steps, are stored in the 8 storage columns and can be activated as desired from each output by means of a multipoint commutator switch SSW. The multipoint commutator switches must be controlled by the 8 stored amplitude values of the pulse response function in such fashion that there are connected to the outputs $ZA_{+2}$, $ZA_{+1}$ ... $ZA_{-5}$ those storage columns which contain the same number of "1's" as the amplitude value. If the storage columns are connected to the inputs of the multipoint switch in the order of increasing numbers, that is to say the storage column containing one 1 is connected to the input 1, the storage column with two "1's" is connected to the input 2 and so forth, then starting out from the zero position each storage column can be connected by means of that number of pulses which corresponds to the number of ones contained in the column, that is to say which corresponds to the value of the amplitude to be stored. The transfer of the stored pulse response function from the pulse value storage unit IWSP into the pulse response storage unit IASP is done by connecting the exciter winding of the magnets of the multipoint switch $SSW_{+2}$ to that pulse value storage unit IW (FIG. 83) in which the amplitude value for the instant $t_{+2}$ is stored, while the exciter winding of the magnet of the multipoint commutator switch $SSW_{+1}$ is conneced to that pulse value storage unit IW in which there is stored the amplitude value for the instant $t_{+1}$, and so forth, whereupon by counting backwards to zero the stored amplitude values of the pulse response function are transferred into the pulse response storage unit IASP.

If the pulses for controlling the multipoint switch magnets are taken directly from the input of the pulse value storage unit IW, the total sum of the stored amplitude values is transferred (in the present example eight times the value of the pulse response proper). If this is done then the storage columns containing the corresponding pulse programmes must of course also be available, and multipoint switches with enough points. In order to divide by two, four, eight and so forth, the pulse programme for controlling the multipoint switch is taken from the first, second, third stage and so forth of the pulse value storage unit.

The expression "counting back" is used here to mean in the case of a positive amplitude value counting downwards to the zero position and in the case of a negative amplitude value counting upwards to the zero position.

In the final operation the stored signs must be set into the bistable stages $B_{+2}$, $B_{+1}$ to $B_{-5}$.

Figure 106:
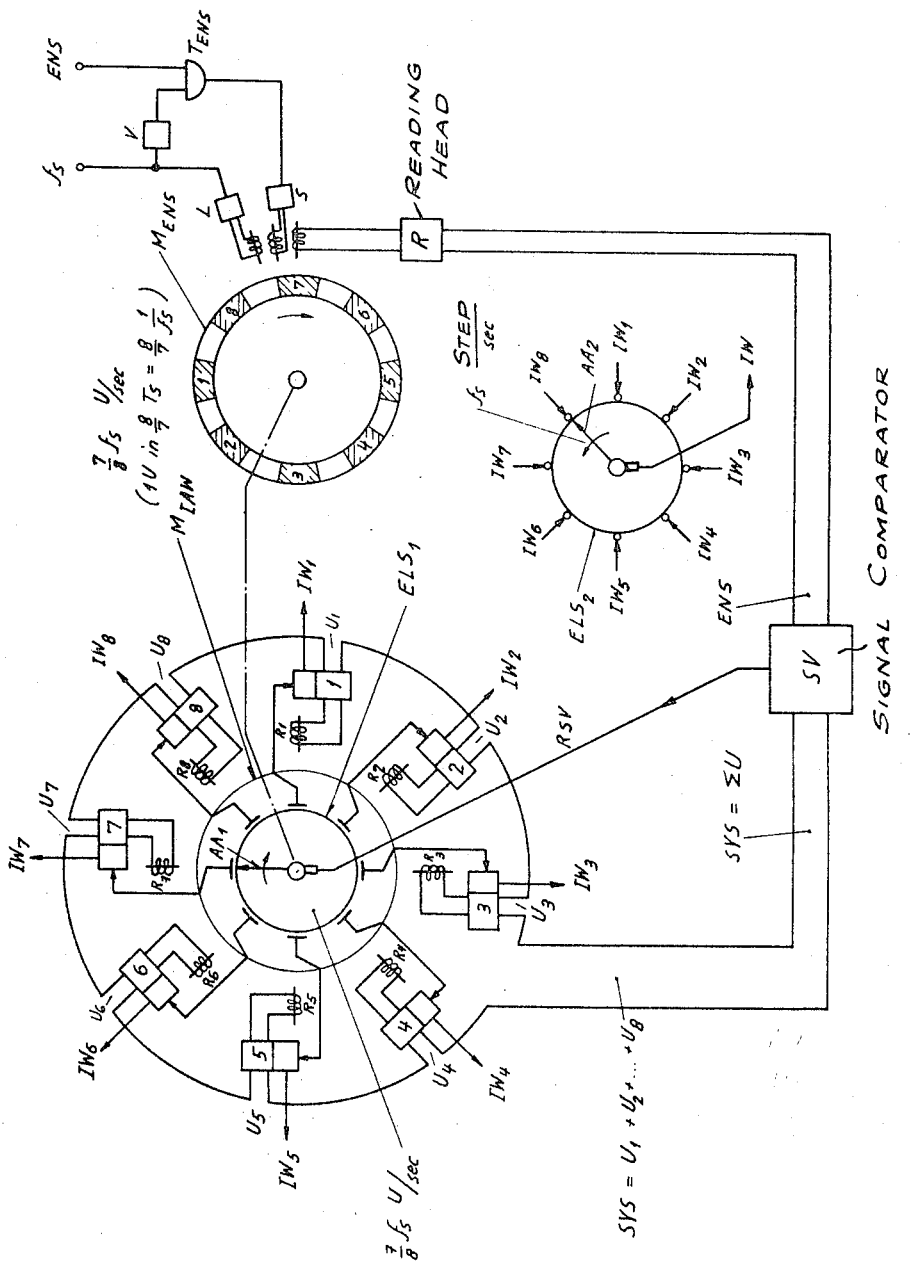
FIG. 106 shows a receiver with analog storage units.

All the apparatuses described up to now for realising the process according to the invention operate digitally. However the invention can of course also be realised by means of an analog or analog-digital apparatus. FIG. 106 shows an example of a receiver of this kind, in which the received information signal and the pulse response function are both stored in magnetic drum memories or magnetic tape memories. This iteration receiver has at least one magnet track $M_{IAW}$ for recording the pulse response function and a second magnet track $M_{ENS}$ for recording the received information signal. For the sake of simplicity both the magnet tracks have been represented in the figure as magnetic drum tracks, whereby the magnetic drum rotates in synchronisation with the timing frequency (rate of rotation=$\frac{7}{8}f_s$). The magnetic drum performs $\frac{7}{8}$ rotations in recording each information element. A section of the received information signal is stored in the drum track $M_{ENS}$. In the present example this drum track stores eight information elements 1 to 8. Let us assume that the last information element received was the information element 1, the information element received before that was the information element 2, before that there was received the information element 3 and so forth. The individual information elements represent the eight amplitude values of the received information signal situated next to each other in the receiver time grating ZRE. For the magnetic drum track $M_{ENS}$ there are provided three separate heads, that is to say an erase head L, a recording head S and a reading head R. The reading head R reads out the stored section of the received information signal at 8 times the speed of the entire received information signal. An erase head L erases one element during each rotation of the magnetic drum $M_{ENS}$ and at the place where the erasure has just been done there is then recorded a new element of the next information signal ENS. As the rate of rotation of the magnetic drum is only ⅞ $f_S$, assuming that the last element was recorded at the position 1 on the magnetic drum $M_{ENS}$, the new element will be recorded at the position 8, the next element after that at the position 7 and so on, with the result that all the elements are successively erased and replaced by new elements. The pulse response function is recorded on the drum track $M_{IAW}$, where it occupies at least enough storage places as are necessary to characterise the function unambiguously. The reading heads $R_1, R_2, R_3 \ldots R_8$ are situated around the circumference and spaced apart in such fashion that if, for example, the maximum value Â of the pulse response function is read off at $R_1$, then the value $A_{+1}$ will be read off at $R_2$, the value $A_{-1}$ at $R_8$, the value $A_{-2}$ at $R_7$ and so forth (FIG. 79). The values thus read off are amplified in the amplifiers 1 to 8, whose gain depends on the stored pulse values $IW_1 \ldots IW_8$. The amplified voltages are then added up to form the synthesis signal SYS ($SYS$=sum of $U_1+U_2+U_3 \ldots +U_8$). The synthesis signal is compared with the received information signal by the signal comparator SV, whose adjustment value RSV adjusts over the rotating arm $AA_1$ that pulse value which represents the maximum of the pulse response function at the comparison position. The arm $AA_1$ rotates synchronously with the drum $M_{IAW}$ and in phase with the maximum of the pulse response function stored on $M_{IAW}$. The adjustment value RSV is distributed to the individual pulse value storage units by means of the distributor switch $ELS_1$. This distributor switch is represented as a collector distributor, but in practice it would be an electronic switch. A second distributor switch $ELS_2$, which in practice is also an electronic switch, allows the pulse values IW to be delivered by means of the rotating arm $AA_2$, which performs one forward shift step in each timing period, that is to say $f_S$ steps per second. One pulse value IW is provided per information element in the received information signal, that is to say one for each timing period $T_S$. This pulse value IW has been derived by iteration by means of the analog storage unit, in a manner similar to that previously described for the digital apparatus. The process is in principle the same as that used in the digital apparatus, with the difference that whereas by the digital method the synthesis signal was built up in a special synthesis signal storage unit, by the analog method it is built up by summing a number of pulse response functions, in the present example 8, spaced apart by the time grating interval and whose amplitudes are determined by the adjustment amplifiers 1 to 8 by means of the pulse values $IW_1$ to $IW_8$. This analog apparatus therefore does not require a synthesis signal storage unit. The new information elements of the received information signal are controlled by the timing frequency $f_S$, whereby the erasure head first of all erases one of the elements on the drum $M_{ENS}$ and then, after the brief delay V, over the gate $T_{ENS}$ the recording head S records the new information element at the place where the erasure was done. However, the solution which has just been described on the basis of the figures would require that the magnetic drums must rotate at the rate of one revolution in each timing period (for example in 0.15 ms.), and in practice it is difficult to achieve such a high rate of rotation. This difficulty is avoided in practice by increasing the number of recording and reading heads, whereby the rate of rotation of the drums can be correspondingly reduced by a factor of ⅒ to ½₀.

Finally a summarising comparison will now be made between the process according to the invention and the hitherto customary method of direct scanning at the receiver end. This comparison is concerned mainly with the information flux attainable within the existing band limits, and with the maximal practicable scanning and coding frequencies, and also with the maximal permissible amplitude steps.

Using the method of direct scanning at the receiver end and assuming that the same scanning frequency and amplitude steps are used for all the channels, and assuming individual transit time distortion correction of the information channel (300 to 3400 c.p.s.) one can expect to obtain approximately a permissible scanning and coding frequency $f_S$ of 5500 to 5600 c.p.s. and a permissible 8 amplitude steps, corresponding to 3 information bits per element, and an information flux of about 16,000 to 17,000 bits per second.

On the other hand, using the iteration process according to the invention one can obtain a permissible scanning frequency $f_S$ of approximately 6,500 c.p.s., a permissible 16 to 32 amplitude steps and an information flux of about 26,000 to 32,000 bits per second.

Moreover using the iteration receiver according to the invention the scanning and coding frequency $f_S$ is much less dependent on the channel characteristics than it is when direct scanning is used.

A quantitative example will now be given on the basis of FIGS. 107 and 108, to provide comparisons between the two methods.

Figure 107:
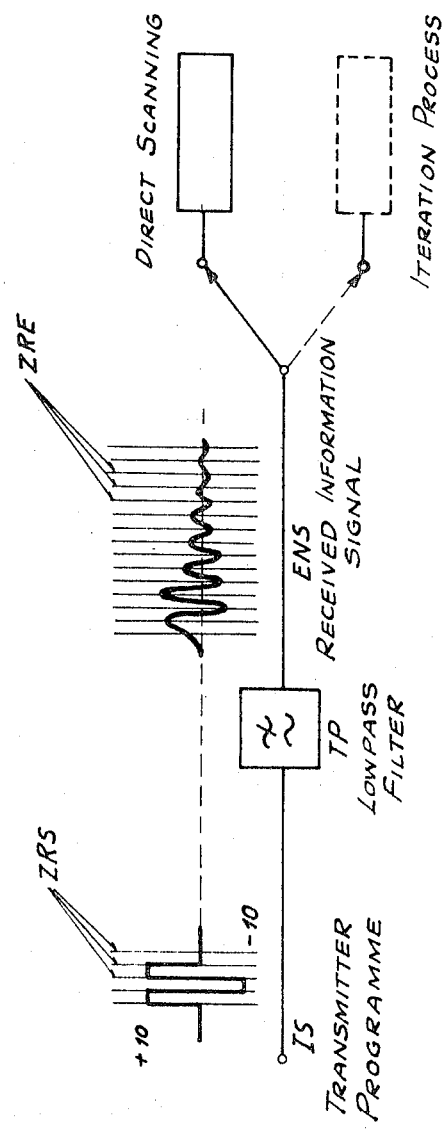
FIG. 107 is a block diagram for the purpose of comparing the process according to the present invention with the hitherto customary method of directly scanning the received information signal.
Figure 108:
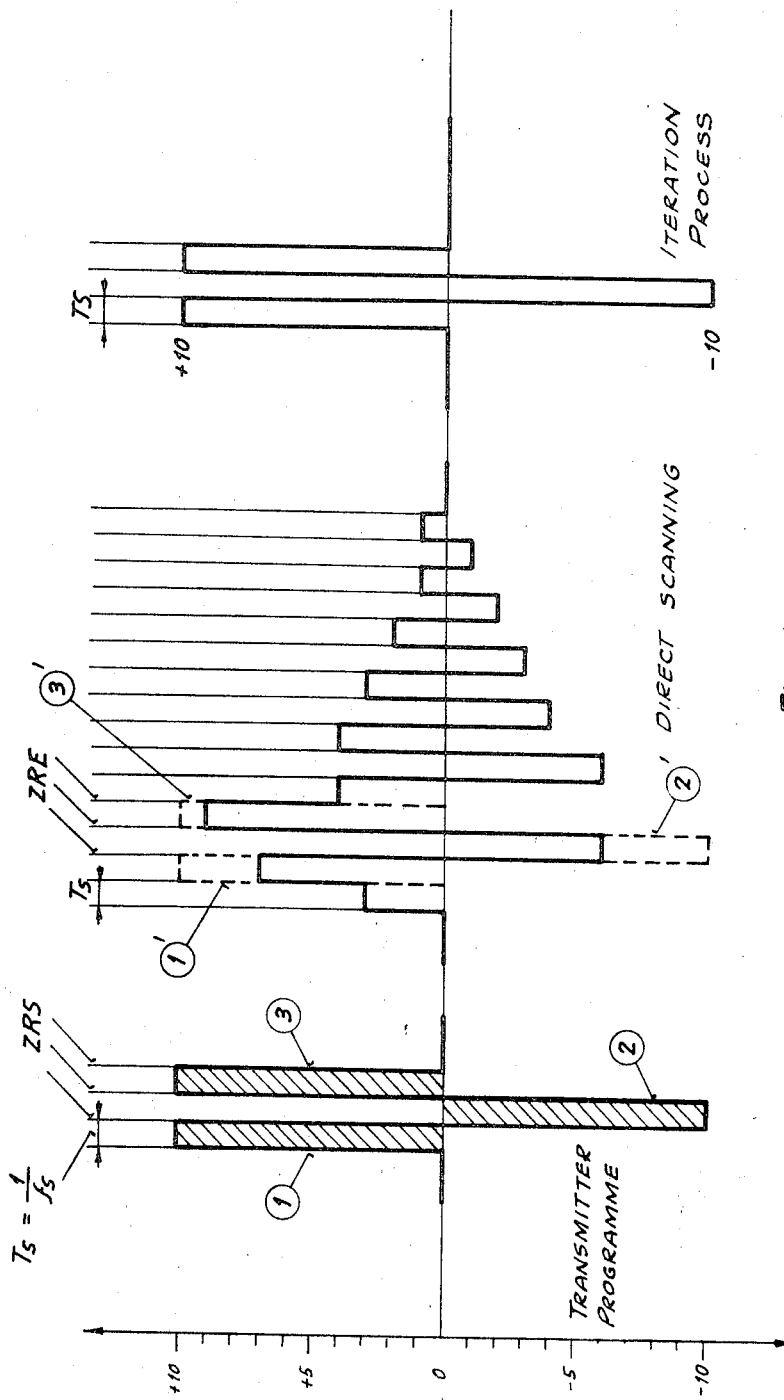
FIG. 108 is a diagram for clarifying the block circuit of FIG. 107.

FIG. 107 represents an information channel consisting of a lowpass filter TP with a limiting frequency $f_G$=3400 c.p.s., the lowpass filter TP not corrected for transit time distortion. To the input there is fed (left-hand diagram in the figure) a programme IS consisting of three pulses. The amplitude of the first pulse is +10, that of the second −10 and that of the third again +10. The total number of amplitude steps is thus 20. The pulse frequency $f_S=1/T_S$ is assumed to be 6500 c.p.s., that is to say a little less than twice the limiting frequency ($2f_G$=6800 c.p.s.). At the output of the lowpass filter there appears the received information signal ENS (FIG. 107), which will be detected on the one hand by the method of direct scanning and, on the other hand, by means of the iteration process according to the invention. Using direct scanning one would obtain the scanned values represented in FIG. 108 in the middle, including a very large number of (false) pulses which did not exist at all at the input end. The maximum error would amount to six amplitude stages. In contrast to this FIG. 108 at the right shows how by the iteration process the signal emerges perfectly correct and is detected without one single amplitude error. These results were obtained in practical experiments.

Using the iteration receiver according to the invention one can in many cases do without an individual channel distortion correction. In other cases it is sufficient to use a few "standard" distortion correction circuits. These advantages are particularly valuable when transmitting over temporary point-to-point connections, and also in telephone exchange communications. A further advantage of the iteration process is that a band transposition in the base position is not necessary.

What is claimed is:

1. Apparatus for receiving information signals transmitted over a transmission channel of limited bandwidth comprising,
   (a) means for storing a transmitted reference pulse as modified by the characteristics of said transmission channel as a reference pulse response function,
   (b) means for storing the transmitted information signal in sections,
   (c) means for forming from the stored reference pulse response function, pulse response functions, each having a maximum value correlated to a different section of the stored information signal and proportional to the stored pulse response function and superimposing the pulse response functions so formed to provide a synthesis signal,
   (d) means for adjusting the maximum values of each of the individually formed pulse response functions to match the synthesis signal to the stored information signal, and (e) means for deriving a series of signal values closely corresponding to those forming the transmitted information signal from the adjustments made to the individually formed pulse response functions.

2. Apparatus for receiving information signals in the form of a series of pulses transmitted at a predetermined repetition frequency over a transmission channel of limited bandwidth comprising:

(a) means for sampling a transmitted reference pulse and the received information signal each as modified by the characteristics of said transmission channel at time intervals provided by the predetermined repetition frequency, (b) means for storing the sampled reference pulse as modified by the characteristics of said transmission channel as a sampled reference pulse response function, (c) means for storing the samples of the information signal at time intervals corresponding to the time intervals provided by said predetermined repetition frequency, (d) means for forming sampled individual pulse response functions each having a maximum value correlated to a different one of the stored sampled information signal and being approximately proportional to the reference pulse response function and superimposing the pulse response functions so formed to provide a sampled synthesis signal, (e) means for adjusting the maximum values of each of the individually formed pulse response functions to match the synthesis signal to the stored information signal, and (f) means for deriving a series of values closely corresponding to the values of the pulses transmitted from the adjustments made to the individually formed pulse response functions.

3. Apparatus for receiving information signals in the form of a series of pulses transmitted at a predetermined repetition frequency over a transmission channel of limited bandwidth comprising:

(a) means for sampling with the predetermined repetition frequency a reference pulse and the information signal each as modified by the characteristics of the transmission channel, (b) a pulse response function storage unit for storing the samples of the reference pulse as modified by the characteristics of the transmission channel, (c) an information signal storage unit for storing the samples of the information signal, each of said samples being stored during different ones of timing intervals corresponding to the timing intervals provided by said predetermined repetition frequency, (d) a synthesis signal storage unit for storing pulse response functions derived from the stored reference pulse response function, (e) a signal comparator coupled to the information signal storage unit and the synthesis signal storage unit for comparing the contents thereof and providing a signal dependent on the difference therebetween to adjust the contents of the synthesis signal storage unit to match the contents of the information signal storage unit, and (f) a pulse value storage unit for storing the signals developed by the signal comparator.

4. Apparatus for receiving an information signal transmitted over a transmission channel of limited bandwidth comprising:

(a) an analogue to digital converter having its input coupled to the output of said transmission channel, (b) a received information signal storage shift register unit having its input coupled to the output of said analogue to digital converter so that a received analogue signal is stored in the shift register stages of said unit in digital form, (c) a reference pulse response function storage having its input coupled to the output of said analogue to digital converter so that a transmitted reference pulse as modified by the characteristics of said transmission channel is stored as a reference pulse response function in digital form, (d) a synthesis signal storage shift register unit for storing in its stages individual values of a pulse response function derived from the stored reference pulse response function, (e) a pulse value storage shift register unit, (f) a signal comparator coupled to a stage of the received information signal storage shift register unit and a stage of said synthesis signal storage shift register unit for comparing the contents thereof, and developing a first signal dependent upon the difference between the compared values for reading out from said reference pulse response function storage means a pulse response function whose individual values are determined by the value of said first signal into the synthesis signal storage unit and developing a second signal proportional to said difference and storing it in said pulse value storage unit, (g) a clock pulse generator for generating shift pulses to simultaneously shift either way the contents of said shift registers so that the values stored in the information signal storage unit and said synthesis signal storage unit can be successively compared by said signal comparator to develop said first and second signals until the second signals stored in the pulse value storage shift register closely correspond in digital form to the corresponding values of the received analogue information signals.

5. Apparatus as claimed in claim 4 in which each of the shift register units comprises a plurality of shift registers with their individual stages arranged in columns, each of the stages in a column having a different binary weighting so that the contents of each column of stages represents the value stored therein in digital form.

6. Apparatus for receiving an information signal in the form of a series of pulses transmitted at a predetermined repetition frequency over a transmission channel of limited bandwidth comprising:

(a) a first shift register for storing in each of its stages different ones of the transmitted pulses forming said information signal, (b) a register for storing a transmitted reference pulse as modified by the characteristics of said transmission channel as a reference pulse response function, said register including a plurality of stages for storing the amplitude values of the reference pulse response function, (c) a second shift register having a plurality of stages for storing therein different values forming a pulse response function derived from the stored reference pulse response function, (d) a signal comparator coupled to the first and second shift registers for comparing the contents thereof to provide a first signal dependent on the difference between the stored values and reading out from the reference pulse response function register values as determined by said first signal to modify the contents of the second shift register so that the compared values correspond, said signal comparator also providing a second signal proportional to said difference between compared values in the first and second shift registers, (e) a third shift register for storing each of the second signals provided upon comparison by the signal comparator of the contents of the first and second shift registers, and (f) a clock pulse generator for shifting either way the contents of the first, second and third shift registers so that successive comparisons of the values stored in the first and second shift registers can be effected by said signal comparator.

7. Apparatus as claimed in claim 6 in which each of the shift register units comprises a plurality of shift registers with their individual stages arranged in columns, each of the stages in a column having a different binary weighting so that the contents of each column of stages represents the value stored therein in digital form; and including count up and count down means coupled to each of said columns to increase or decrease the values stored therein in dependence upon whether the value stored in a stage in the first shift register is greater or less than the value stored in the corresponding stage of the second shift register.

8. Apparatus for receiving information signals transmitted over a transmission channel of limited bandwidth comprising:
 (a) a magnetic drum,
 (b) first means for recording in sections on a first track on said drum an information signal received over said transmission line,
 (c) second means for recording in sections on a second track on said drum a transmitted reference pulse as modified by the characteristics of said transmission channel as a reference pulse response function,
 (d) means for comparing the recorded reference pulse response function with the recorded information signal and producing an output signal dependent on the differences therebetween,
 (e) means responsive to said output signal for adjusting the pulse response function so that it matches the recorded information signal, and
 (f) means for deriving from the adjustments made to said pulse response function signal values closely corresponding to those comprising the transmitted information signal.

References Cited

UNITED STATES PATENTS 3,293,361  12/1966  Hopner et al. _____ 178—69
3,314,015  4/1967   Simone _____ 328—42 X

FOREIGN PATENTS 844,228  8/1960  Great Britain.

MALCOLM A. MORRISON, *Primary Examiner.*

CHARLES E. ATKINSON, *Assistant Examiner.*

U.S. Cl. X.R.

328—165; 325—42, 323